US010521604B2

(12) United States Patent
Miller

(10) Patent No.: US 10,521,604 B2
(45) Date of Patent: Dec. 31, 2019

(54) UNIFIED CONTROL OF PRIVACY-IMPACTING DEVICES

(71) Applicant: Labyrinth Research LLC, Gainesville, FL (US)

(72) Inventor: Kevin L. Miller, Gainesville, FL (US)

(73) Assignee: Labyrinth Research LLC, Gainesville, FL (US)

( * ) Notice: Subject to any disclaimer, the term of this patent is extended or adjusted under 35 U.S.C. 154(b) by 0 days.

(21) Appl. No.: 16/090,918

(22) PCT Filed: Mar. 19, 2018

(86) PCT No.: PCT/US2018/023114
§ 371 (c)(1),
(2) Date: Oct. 3, 2018

(87) PCT Pub. No.: WO2018/170504
PCT Pub. Date: Sep. 20, 2018

(65) Prior Publication Data

US 2019/0108362 A1 Apr. 11, 2019

Related U.S. Application Data

(60) Provisional application No. 62/553,875, filed on Sep. 3, 2017, provisional application No. 62/472,915, filed on Mar. 17, 2017.

(51) Int. Cl.
*H04W 12/02* (2009.01)
*H04L 29/06* (2006.01)
(Continued)

(52) U.S. Cl.
CPC ...... *G06F 21/6245* (2013.01); *G06F 16/1805* (2019.01); *G06F 21/60* (2013.01);
(Continued)

(58) Field of Classification Search
CPC ....... H04W 12/02; H04W 76/14; H04W 4/80; H04L 29/06; H04L 29/08; H04L 9/32;
(Continued)

(56) References Cited

U.S. PATENT DOCUMENTS 7,478,152 B2 1/2009 Bohrer
8,594,632 B1 11/2013 Azizi
(Continued)

*Primary Examiner* — Jayesh M Jhaveri
(74) *Attorney, Agent, or Firm* — Labyrinth Law PLLC; Kevin Miller

(57) ABSTRACT

Systems, techniques, and apparatuses facilitate selecting, defining, controlling, verifying, and auditing privacy-impacting behaviors of devices in alignment with the privacy behavior expectations of individuals and other entities. Techniques and systems, including apparatuses, are presented to facilitate controlling and verifying the privacy behaviors of privacy-impacting devices. Privacy enunciator apparatuses announce the presence of entities in a devices range of action or influence. Techniques and systems for defining and sharing individualized privacy behavior preferences are shown. Techniques and systems are disclosed for privacy preference resolution protocols that allow for the automated or interactive resolution of conflicts that arise between individuals in multi-actor environments or ambiguous contexts. Accountability and audit mechanisms verify the control state of devices with respect to their privacy behavior preference inputs. A trust-enhancing and technically transparent system architecture includes a distributed application network, distributed ledger technology, smart contracts, and/or blockchain technology.

9 Claims, 15 Drawing Sheets

(51) Int. Cl.

| | |
|---|---|
| ***H04L 29/08*** | (2006.01) |
| ***H04L 9/32*** | (2006.01) |
| ***G06F 16/18*** | (2019.01) |
| ***G06F 21/62*** | (2013.01) |
| ***H04L 9/08*** | (2006.01) |
| ***G06Q 20/38*** | (2012.01) |
| ***G06F 21/60*** | (2013.01) |
| ***H04W 4/80*** | (2018.01) |
| ***G07C 9/00*** | (2006.01) |

(52) U.S. Cl.

CPC ........... *G06F 21/62* (2013.01); *G06Q 20/382* (2013.01); *G07C 9/00007* (2013.01); *H04L 9/0861* (2013.01); *H04L 9/3213* (2013.01); *H04L 63/0407* (2013.01); *H04L 63/104* (2013.01); *H04L 67/12* (2013.01); *H04W 4/80* (2018.02); *H04W 12/02* (2013.01); *H04L 2209/38* (2013.01)

(58) Field of Classification Search

CPC ... H04L 63/0407; H04L 9/0861; H04L 67/12; H04L 2209/38; G06F 16/18; G06F 21/60; G06F 21/62; G06F 16/27; G06F 16/182; G06F 16/1805; G06F 21/6245; G06Q 20/06; G06Q 20/382; G07C 9/00

See application file for complete search history.

(56) References Cited

U.S. PATENT DOCUMENTS

| | | | | |
|---|---|---|---|---|
| 2012/0110680 | A1* | 5/2012 | Oliver | H04L 63/102 726/30 |
| 2015/0031335 | A1* | 1/2015 | Dong | H04W 4/70 455/411 |
| 2015/0379510 | A1 | 12/2015 | Smith | |
| 2016/0292672 | A1 | 10/2016 | Fay et al. | |
| 2016/0342994 | A1 | 11/2016 | Davis | |
| 2017/0046652 | A1* | 2/2017 | Haldenby | G06Q 20/0655 |

* cited by examiner

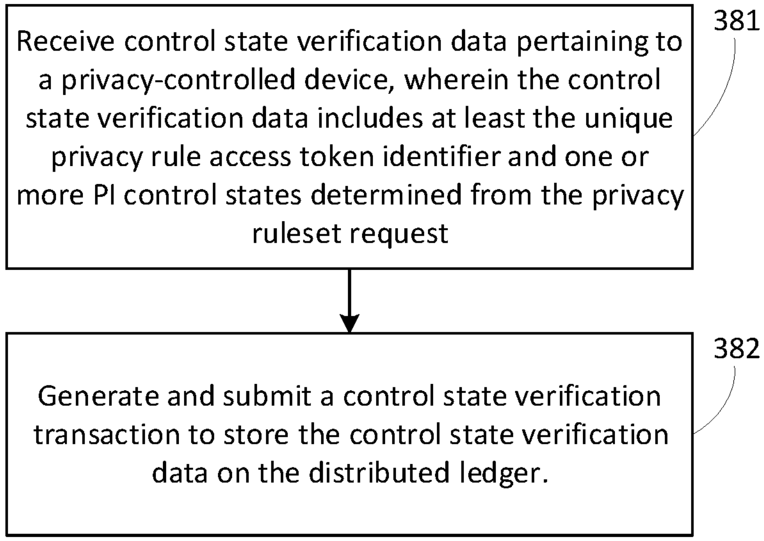

FIG. 3D

```
401 <Rules Owner_Identity="7AFD876A0291">
402     <Rule ID="41903009-081d-45d6-8da1-f3caef9ffa18">
403         activity="VIDEO"
404         constraint="RECORD PERMANENT"
405         role="DOCTOR"
406         context="HOSPITAL" />
407     <Rule ID="042429d5-3c93-43b3-8f30-6f07f2f3fde9">
408         activity="VIDEO"
409         constraint="ORIENT-ONLY"
410         role="PATIENT"
411         context="HOSPITAL" />
412     <Rule ID="c8e528d4-d422-4b7c-baad-d3308f9efe36">
413         activity="LOCATION"
414         constraint="SHARE OFF"
415         role=""
416         context="WEBSITES" />
417 </Rules>
```

FIG. 4

UNIFIED CONTROL OF PRIVACY-IMPACTING DEVICES

CROSS-REFERENCE TO RELATED APPLICATION(S)

This application claims the benefit of U.S. provisional application Ser. No. 62/472,915, filed on Mar. 17, 2017, which is incorporated herein by reference in its entirety, and U.S. provisional application Ser. No. 62/553,875, filed on Sep. 3, 2017, which is incorporated herein by reference in its entirety.

BACKGROUND

Internet of Things (IoT) devices, robots, autonomous agents and "bots", smart home devices and appliances, mobile devices, conversational agents, drones, cameras, and other sensor-laden devices have increasingly come to populate (and intrude upon) the physical space in which humans live and work—perceiving our presence, observing and interpreting what we say and do, recording video, audio, location, and other sensor data, physically interacting with us by touch or approach, and communicating or notifying us in potentially interruptive or intrusive ways.

Privacy concerns stemming from the presence of these privacy-impacting devices are qualitatively different from those encountered in conventional website and mobile device apps. The current paradigm of website and mobile app data privacy is incentivized by the lack of a viable economic model to monetize most web services and content publication. Thus, website and mobile app privacy tends to be defined by "notice and consent" modalities that are primarily concerned with obtaining broad permissions from consumers to sell their personal information or behavioral data to third parties for marketing purposes. Participants in this system have allowed this notion of information privacy and its associated notice and consent modality to define most aspects of the data privacy conversation, from its regulatory motifs to the design of the privacy setting user interfaces for giving or denying consent. Compounding this issue is the fact that, in privacy jurisprudence, people tend to be protected against privacy violations only when the intrusion is unreasonable or unexpected. The interplay of the notice and consent modality with the amorphousness of the "reasonableness" doctrine means that, over time, our "reasonable expectation" of privacy becomes inexorably eroded as individuals give blanket permission for web service providers to freely use our personal information in return for "free" use of their services and apps.

These privacy-impacting devices present much harder and more nuanced privacy problems than web privacy. Privacy, when considered from the viewpoint of these devices, certainly include some classic information privacy concerns like those in website data sharing, but it must also account for physical privacy. "Physical privacy," as understood here, includes concepts such as whether a device may measure and record a person's physical characteristics with sensors (e.g., audio recording or heart rate monitoring); a device's physical proximity when interacting with a person in certain contexts; and whether, and in what manner, a device such as a robot can touch a person. These kinds of physical privacy are much more closely related to those protected by classic privacy torts such as "intrusion upon seclusion" and battery. Traditional notice and consent mechanisms, considered by many to be largely ineffective even within their own purview, are likely to be completely insufficient when applied to privacy concerns of these devices.

Despite rapid advancement in the capabilities of these privacy-impacting devices, techniques for solving their associated privacy challenges have remained without effective solutions.

BRIEF SUMMARY

Unlike in web-based privacy models, people, robots, and the devices they carry are mobile, meaning that privacy behavior expectations become dynamic and contextual—for example, robots can move into different physical spaces inhabited by different people, and different people can enter or exit a robot's functional proximity at any time. Privacy behavior expectations are also based on cultural norms, shared group values, and even on physical location. Sometimes, situational contexts such as an emergency will override all other concerns. Further complicating matters, privacy behavior expectation management becomes exponentially more difficult in real-world scenarios where devices must select appropriate governance actions to accommodate the potentially conflicting privacy needs of multiple people simultaneously occupying a home, workplace, or public space. Many of these individuals may be encountering a particular device for the first time. Devices will be required to dynamically navigate a matrix of complex privacy settings, customs, culture, and personal needs and, in some cases, a device may need to ask people nearby for clarification or mediate compromise positions in order to take effective action.

Recognizing these deficiencies and nuances, systems, system architectures, techniques, and apparatuses are described for selecting, defining, controlling, verifying, and auditing privacy behaviors of devices in alignment with the privacy behavior preferences and expectations of individuals and other entities. Techniques and systems are presented to govern the observation, movement, and recording activities of a privacy-impacting device in accordance with the privacy behavior expectations of the humans with which it interacts. Disclosed solutions facilitate a common consistent standard that assists privacy-impacting devices in acting in alignment with our contextually-informed values, which require granular and scenario-specific restrictions on the range of actions a robot can take in a wide variety of environments, from assisting an elderly man to handing out brochures at a shopping mall.

More specifically, presented herein are systems, system architectures, and techniques for enabling devices' control functions—namely, sensor activation and recording, movement and action, communication modalities, data persistence, and data sharing behaviors—to meet the contextually sensitive privacy behavior expectations of individuals co-inhabiting a device's zone of influence. The following explores the system architecture and characteristics of a technical framework for making available, fusing and reconciling the privacy behavior expectation data of multiple actors across every contextual level (cultural, societal, group, locational, individual, and situational) and transforming them into concrete instructions usable by a device as behavioral controls.

Characteristics of this technical framework include, but are not limited to, techniques, systems, and apparatuses for a "privacy enunciator device" to announce the presence of entities in a device's range of action or influence; techniques and systems for sharing individualized privacy behavior preferences using a trusted interchange mechanism that can be accessed by devices to inform their sensor activation and recording, movement and action, communication modalities, data persistence, and data sharing behaviors of a device based on individualized, context-sensitive, and role-sensitive privacy preference rules; techniques, systems, and apparatuses for assisting privacy-impacting devices to interact with other members of a privacy trust system in a trust-enhancing and technically transparent manner; privacy preference resolution protocols and merger techniques that allow for the automated or interactive resolution of rule conflicts that arise between individuals in multi-actor environments or ambiguous contexts. Accountability and audit mechanisms are also discussed to encourage responsible adoption, including the use of distributed applications of distributed application networks, distributed ledgers, and blockchain architectures. Participants in this interchange are presented as interacting members of a "privacy trust system."

This Brief Summary is provided to introduce a selection of concepts in a simplified form that are further described below in the Detailed Description. This Brief Summary is not intended to identify key features or essential features of the claimed subject matter, nor is it intended to be used to limit the scope of the claimed subject matter.

BRIEF DESCRIPTION OF THE DRAWINGS

FIG. 3D shows an example process flow for storing a permanent record of control state verification data associated with a privacy ruleset request.

FIG. 4 shows an example representation of a privacy ruleset for a given identity.

DETAILED DESCRIPTION

Figure 1A:
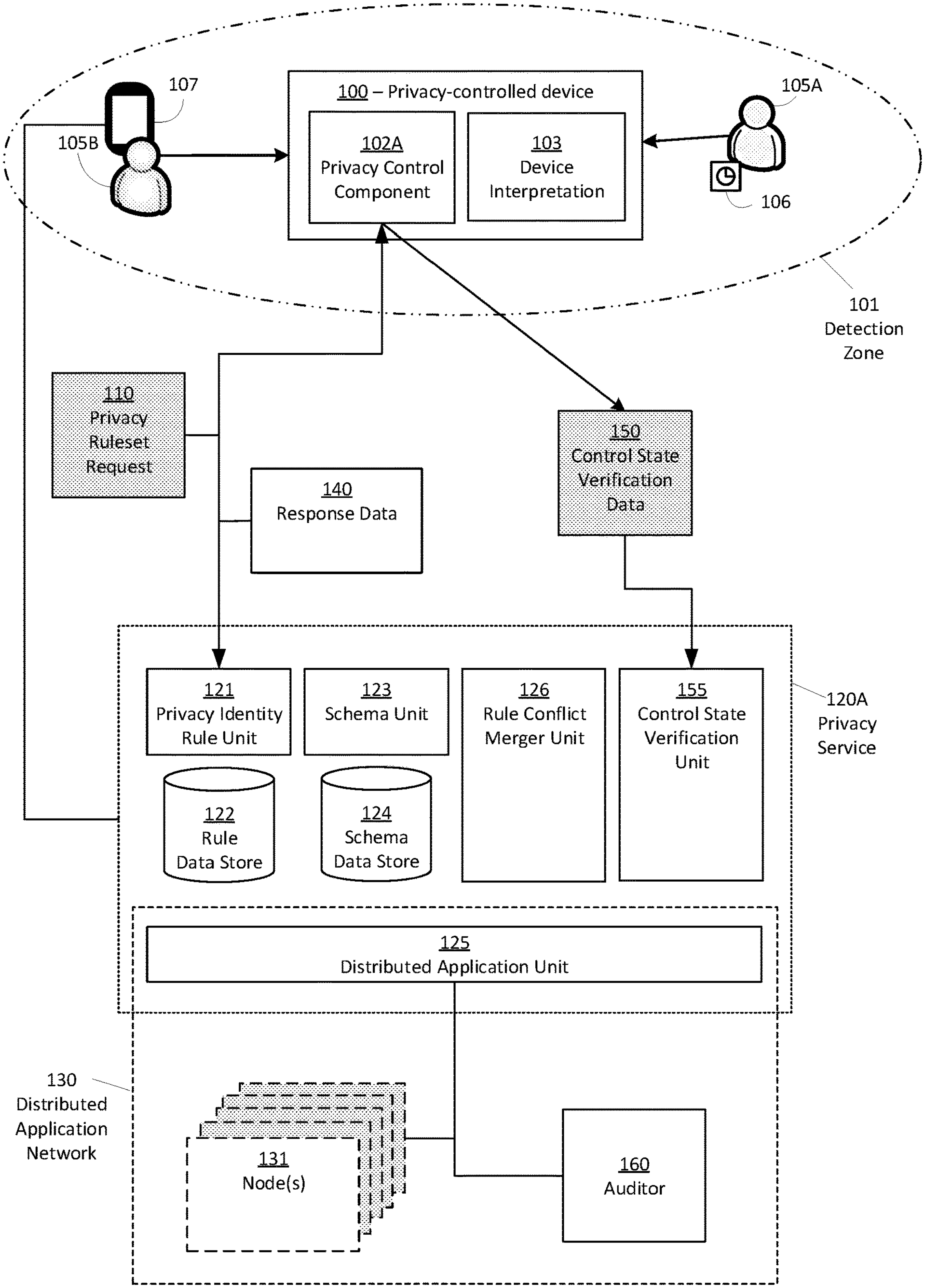
FIG. 1A shows an example system/component environment in which some implementations of systems and techniques for selecting, defining, controlling, verifying, and auditing privacy behaviors of devices can be carried out.

Accordingly, systems, system architectures, techniques, and apparatuses are described for selecting, defining, controlling, verifying, and auditing privacy behaviors of devices in alignment with the privacy behavior preferences and expectations of individuals and other entities. In embodiments, techniques and systems are presented for controlling and verifying the behavior of privacy-impacting devices. Apparatuses for a "privacy enunciator device" announce the presence of entities in a device's range of action or influence. Techniques and systems for defining and sharing individualized privacy behavior preferences are disclosed. Apparatuses for controlling privacy-impacting devices are presented. Techniques and systems are disclosed for privacy preference resolution protocols and merger techniques that allow for the automated or interactive resolution of conflicts that arise between individuals in multi-actor environments or ambiguous contexts. Accountability and audit mechanisms are also discussed for verifying the control state of devices with respect to their privacy behavior preference inputs. Variant embodiments may use a distributed application network, distributed ledger technology, smart contracts, and/or blockchain technology to perform certain aspects of systems and techniques. In addition, many detailed embodiments of these techniques and systems are further disclosed within.

Participants in this interchange are presented as interacting members of a "privacy trust system." Trust is the belief by one party in an interaction that other parties will act in an expected way. Participants in this privacy trust system include devices being controlled by the described technical methods, entities expressing a privacy identity with privacy behavior preferences, a centralized or decentralized service for assisting entities to define their privacy behavior preferences and for disseminating privacy preferences to devices, auditors that verify devices enact the proper control functions in response to a set of privacy behavior preferences, and other participants who define and verify critical infrastructure.

The advantageous technical effects of these technical features are many and varied: First, users are able to define privacy behavior preferences that are applicable to a wide variety of privacy-impacting devices simply and easily, instead of having to individually configure each device (or website) they have or use. Second, devices control their privacy-impacting behaviors in accordance with standardized, autonomous control models, making standard device interaction and control mechanism more efficient and generalized. Third, a technical model is facilitated for cultural and contextual sensitivity, which is a current technical goal in system design. Fourth, system transparency and accountability, a current watchword in design of systems with complex autonomous processes, is provided via auditable transaction telemetry. Fifth, device security is enhanced through the presence of auditable control features that constantly validate actual control state vs. expected control state, which can assist in the detection of spyware and other malware. Many other advantageous technical effects are described below with respect to detailed embodiments.

Before the discussion of specific embodiments, the introduction of useful terminology may be helpful. However, these descriptions are not intended to be limiting, and additional information about any terminology may be elucidated in detailed embodiments.

A "privacy-controlled device," or PCD, as used herein, is a device that actually or potentially has the capability to impinge on the privacy rights, interests, or expectations of an entity. It may also be referred to as a "privacy-impacting device." With respect to techniques and systems for controlling and verifying privacy behaviors, embodiments pertain to devices of varied capabilities and morphologies. Specific examples of devices will be described in various example scenarios herein; however, several device classifications are contemplated, such as robots, Internet of Things (IoT) devices, autonomous agents and "bots", smart home devices and appliances, mobile devices, conversational agents, drones, cameras, and other sensor-laden devices.

For instance, a robot of any sophistication has dozens of sensors for a wide variety of purposes: to orient the robot in its environment, identify important objects or people, attenuate the force they apply when performing movements or other actions (e.g., grasping), determine the operating state of a machine or device they are controlling, and record the movements, actions, sounds, or other telemetry data of people or other entities for historical, accounting, behavioral analysis, and pure surveillance purposes. Depending on how and when a sensor is used and the duration for which it saves its sensor data, any sensor has the potential to violate a privacy preference. Sometimes components have a combined sensor and actuator function.

For example, robotic vacuums may have the capability to map and record the floorplan of rooms or homes, as well as possessing the capability to interrupt individuals in the household while accomplishing their tasks (e.g., a person with dementia may be disturbed by a robotic vacuum entering a room). Drones can not only fly over yards and homes to surveil private spaces from above, they can also disrupt or interrupt residents' enjoyment of their space.

IoT devices are generally physical devices that include a communication module (for connecting with the Internet either on its own or via other paired devices) and, often, sensors and actuators. IoT devices can divulge private information related to the nature of the activities they control. For example, a smart door lock could reveal telemetry data associated with the actuator that moves the door lock mechanism, indicating when people in a building come and go. A smart refrigerator can indicate when people eat or drink via a door sensor, and cameras inside the refrigerator can divulge food-shopping and eating habits and other data. Other kinds of IoT devices, such as conversational agents or command centers (e.g., Amazon Echo® and Google Home®) are able to interpret, and therefore record, human speech; such devices may also interrupt nearby individuals with intrusive or inopportune notifications or questions.

PCDs can also include other data-gathering or telemetric devices. For example, a standard computer or mobile device with a webcam capable of recording an unrelated person passing nearby can be a privacy-impacting device. A computer or mobile device can also transmit location data, movement data, or any other behavior its sensors can record. A device with a web browser can record the information access activities associated with a user.

A "privacy behavior" of a device (or PCD) includes those activities of the device that may impinge upon or impact the privacy rights, interests, or expectations of a human entity or other entity. These rights, interests, or expectations may be conferred by, e.g., constitution, statute, common law, declaration of rights, regulation, policy, a cultural norm, group norm, economic norm, psychologically-based expectation, or any other framework. A device's privacy behavior can be categorized into five broad groupings: (1) its sensor activity, including, e.g., state, positioning, detection precision or intensity, and the coordinated activity of sensors supporting both granular and generalized sensor actions; (2) its movements, motions, and activities, including the purposive intent and the one or more coordinated actuator states supporting them; (3) the persistence of its stored sensor and actuator data, including, e.g., sensor telemetry and actuator positions stored in singular and composite form as well as any data storing the final outcomes of higher level processing by the device, such as the outputs of algorithms or neural networks; (4) its data sharing activities with other devices or systems (for example, the sharing of geolocation data with advertisers, or the ability of a Roomba® robotic vacuum to share its home map with the Nest® smart thermostat); and (5) in the case of devices that communicate in human language, the communication modality, such as the types, nature, and timing of solicited and unsolicited statements, interrogatories, notifications, and exclamations, the tone of a question, level of respect in addressing a person, etc. A device component that has the capability to impact privacy may be called a "privacy-impacting module" or "PI module" herein. Examples of different privacy behaviors are shown in various example scenarios herein.

An "entity" includes living things, including human beings. It may also include a deceased being, to the extent that a privacy behavior impacts a privacy right or expectation that survives the death of that being, including the privacy rights/expectations of both the deceased being and of any living beings (e.g., heirs) whose privacy rights/expectations depend on the privacy of data about the deceased being. The term "entity" also encompasses legal entities, businesses, corporations, organizations, non-profits, governmental bodies, and places such as private homes, automobiles and other moving transportation spaces, stores, offices, and facilities, hospitals, airports, or any other group or collective, any of which may have a privacy right/expectation associated with their entity status (e.g., the U.S. Transportation Safety Authority's expectations about the privacy rights of travelers in an airport, the rights of a business to record customers in its store on closed-circuit cameras, and the rights of a company to keep information private to maintain trade secrecy status). The privacy rights/expectations of more than one entity may be impacted by (and may conflict) in the detection zone of any given device.

FIG. 1A shows an example system/component environment in which some implementations of systems and techniques for selecting, defining, controlling, verifying, and auditing privacy behaviors of devices can be carried out. FIG. 1A may depict one representation or embodiment of a privacy trust system. In brief, but explored below in more detail, the example component environment includes a privacy-controlled device ("PCD") 100 which houses a privacy control component ("PCC") 102A that detects within its detection zone 101 the privacy identity of one or more entities (e.g., 105A, 105B). PCC 102A interacts with a privacy service 120A by sending a privacy ruleset request 110 (e.g., over a network) to the privacy service 120A.

Privacy service 120A may include components/units or data stores (e.g., 121-126 and 155).

Privacy service 120A performs various processing tasks to determine a suitable privacy-control ruleset for responding to the privacy ruleset request (explored in detail with respect to FIGS. 3A-3D and elsewhere). The privacy service 120A submits, via its own distributed application unit 125 belonging to distributed application network 130, a privacy rule access token-storing transaction to record the privacy ruleset request data and associated processing outcomes on a distributed ledger of the distributed application network 130. The privacy rule access token-storing transaction may be distributed to, processed by, and verified by external nodes 131 that are members of the distributed application network 130. The privacy service 120A returns the response data 140 including the privacy-control ruleset and a privacy rule access token (or unique identifier thereof) to the PCC 102A, which enacts the privacy behaviors delineated by the privacy-control rules. Device interpretation component 103 may perform processing to match the privacy-control rules to local device capabilities on the PCD 100. After applying the privacy-control rules to the PCD 100, PCC 102A sends control state verification data 150 to privacy service 120A (e.g., via control state verification unit 155), which interacts with distributed application unit 125 to submit the data in a control state verification transaction on the distributed ledger of the distributed application network 130.

Reviewing aspects of FIG. 1A in more detail, a PCD 100 is situated in some given environment, such as a home, office, place of recreation, store, or hospital. When the PCD 100 is generally stationary, various entities (e.g., 105A-B) are present within the detection zone 101 of sensors or networking capabilities of the PCD 100. These entities 105A-B may change dynamically both in number and identity, as when different people move into and out of the PCD's detection zone 101. Entities may also be present in the detection zone 101 that are static, such as when a legal or collective entity associated with the place in which the PCD 100 is situated defines its own privacy behaviors. When the PCD 100 is highly mobile (e.g., a drone, or a device that travels on a transportation vehicle or with a person), entities may come into and out of the PCD's detection zone 101 because the PCD's detection zone is moving relative to stationary or passing entities. A PCD 100 may be a device or system of a type described in FIG. 10 and the associated discussion.

The detection zone 101 of a PCD 100 can be generally understood as the effective range at which the device can detect the presence and identity of an entity. The detection zone therefore varies with the effective sensor and networking capabilities of the PCD 100. Different devices will have different kinds of sensor and networking hardware with different intrinsic ranges as well as different firmware and software capacities to process entity identities from the hardware. Particular detection zones will be affected by these capability-dependent factors, as well as by static (e.g., walls, electrical interference) and transient (e.g., cloud-cover) environmental conditions.

One way that individuals may make their presence and desire for controlled privacy behaviors known to a device is by using a privacy enunciator device, also called here a personal privacy device (PPD). Thus, in some embodiments, the range of the detection zone is derived from the PCD's (100) capabilities for detecting a privacy enunciator device (e.g., 106) in the possession of the entity. A variety of form factors may be imbued with capabilities in order to serve as a privacy enunciator device, ranging from specialized wearable devices with certain signal-generating capacities (e.g., a "smart" ring or other jewelry, "smart" clothing) to RFID stickers, to no-power Bluetooth Low Energy films that may be impressed on surfaces of objects carried with the entity, to more generalized devices such as mobile devices, laptops, tablets, smart watches, or fitness bands running enabling software. Example embodiments of PPD devices with various system components are described in reference to FIGS. 6A-6D.

Some privacy enunciator devices/PPDs may use Bluetooth Low Energy (BLE) to emit a signal that can be detected by a PCD 100. BLE is a device-to-device networking technology which is supported on major mobile and desktop operating systems, and which is present on many specialized device peripherals such as phone headsets. BLE uses a variant of the classic Bluetooth wireless technology to broadcast a constant, low power enunciation signal to any receiving devices in the nearby vicinity. PCDs can detect the PPD's enunciation signal when the PPD is in their detection zone 101. The enunciation signal is branded with an identifier (UUID) unique to the sender of the signal. BLE has a typical maximum range of approximately 100 m and consumes very little battery power or processing resources on the device sending the enunciation signal. The physical proximity of the sender can also be approximated by using the received signal strength indicator (RSSI) of the received radio signal. These characteristics (proximity sensing within the relevant distances for most robot activities, identity services, distance estimation, low resource use, and widespread OS support) make BLE an exemplary implementation option for a detecting a privacy enunciator device.

Sometimes, the presence of an entity (e.g., 105B) can be detected because it carries a device (e.g., 107), such as a mobile device or tablet, on which is installed a code component (such as an application or mobile "app") that connects to the privacy service (e.g., 120A). Such a configuration can also effectively form a privacy enunciator device/PPD, though the means of detecting the PPD differs from the BLE example. The code component can determine or access the geolocation of the device 107 on which it resides and communicates the location of the device 107 via networking capabilities of the device to the privacy service 120A. In some embodiments, this code component may be part of an application that allows the entity 105B to configure privacy rules (see FIG. 8A and associated discussion). As the PCD 100 also communicates with the same privacy service 120A, PCD 100 can periodically query privacy service 120A to obtain identifiers for the entities that have devices 107 known to be within its detection zone 101.

As previously noted, some privacy entities are associated with, e.g., places or collectives of other entities. In some cases, "collective" privacy enunciator devices may be used to indicate that the privacy rules associated with the privacy identity data of the collective applies to every entity present in a particular group, organization, or location. Collective PPDs may be valuable when the context (location or membership in a group) impacts the desired privacy behaviors such that collective privacy expectations (as indicated by a collective privacy ruleset) should be considered along with the privacy rules of individual entities when governing localized privacy behaviors. For example, in a courthouse or substance abuse support group meeting, a collective enunciator might instruct devices to stop all long-term sensor recording, regardless of the privacy behavior expectations of the individuals nearby.

In some embodiments, entities may be detected via the PCD 100's capability to gather identifying biometric data about an entity from the PCD sensors. Sensors usable for gathering biometric data include camera sensors, audio sensors, movement or accelerometer sensors, GPS sensors, chemical or olfactory sensors, fingerprint sensors, as well as any other sensor type that is capable of detecting data that can be used to uniquely identify an individual by their physical characteristics. Different kinds of representations of physical characteristics obtainable from such sensors that can be matched uniquely to an individual include (but are not limited to): a photo/video of the individual, representation of a facial pattern, representation of an iris pattern, retina pattern, voice, movement characteristics or gait. Sensor data gathered from sensors in this way can be sent as privacy identity data in the privacy ruleset request and used by the privacy service to locate a matching privacy identity with a rule-base from which a set of privacy rules can be derived.

In addition to detecting privacy identity data of entities within its detection zone 101, PCD 100 further gathers operating context data. A detailed description of the aspects of the operating context and the methods of determining it is to be found in the text associated with FIG. 2. Together, the privacy identity data and the operating context data comprise at least two elements of the privacy ruleset request 110, which is sent to privacy service 120A to request the relevant privacy ruleset for the operating context and the entities currently present in the detection zone.

One or more aspects of detecting privacy identity data, determining operating context data, and sending a privacy ruleset request to the privacy service—as well as other processing involving privacy behavior-related activities of the PCD 100—may be implemented by a privacy control component ("PCC") 102A installed on the PCD 100. The PCC 102A may be implemented as software or firmware, or a combination thereof, or as a combination of either software or firmware with one or more hardware modules installed on the PCD 100.

Figure 10:
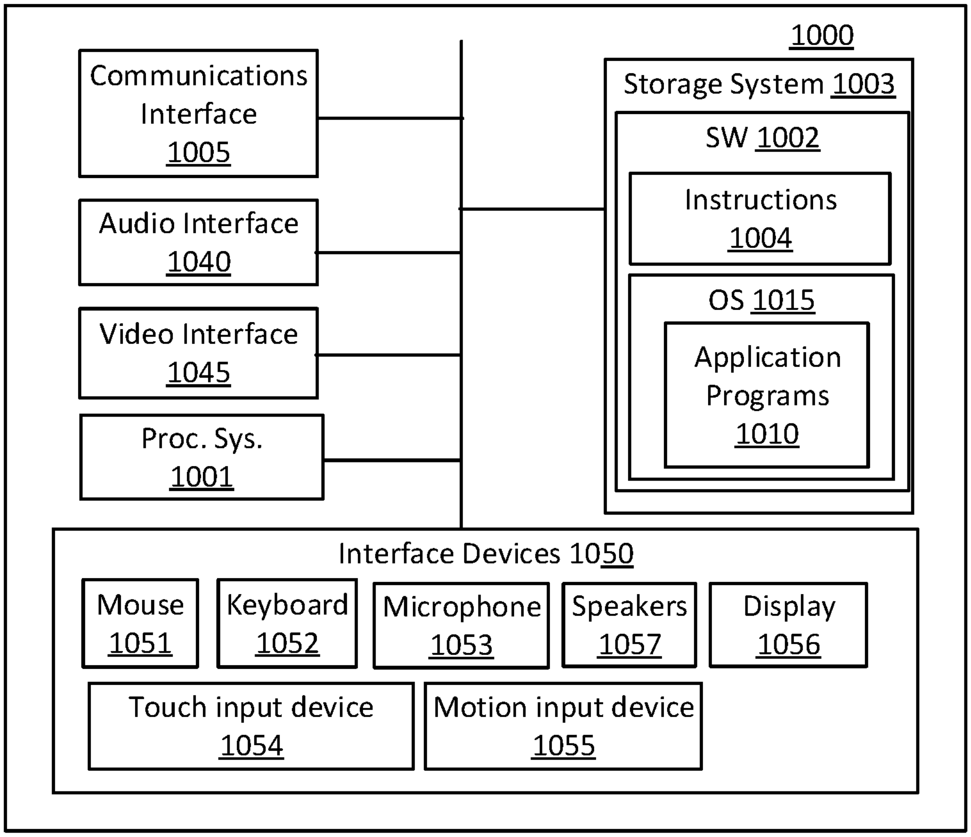
FIG. 10 shows a block diagram illustrating components of a computing device or system used in some embodiments of techniques, systems, and apparatuses for facilitating the selection, definition, control, verification, and auditing of privacy behaviors of devices in alignment with privacy identities' expectations.

Certainly, a PCC 102A may be software module, such as an application, "app," device driver, framework, component, or other software layer (or combination thereof) that can be resident on a device and stored on the PCD 100 on computer-readable media as program instructions for the device's processing system (see FIG. 10). Such instructions may be installed on the PCD 100 after the device is built via an installer program or other installation process, or they may be incorporated into existing control software (such as an operating system). Program instructions may take the form of programming language code, object code, statically or dynamically linked libraries, or any other form familiar to practitioners in the art.

Figure 5A:
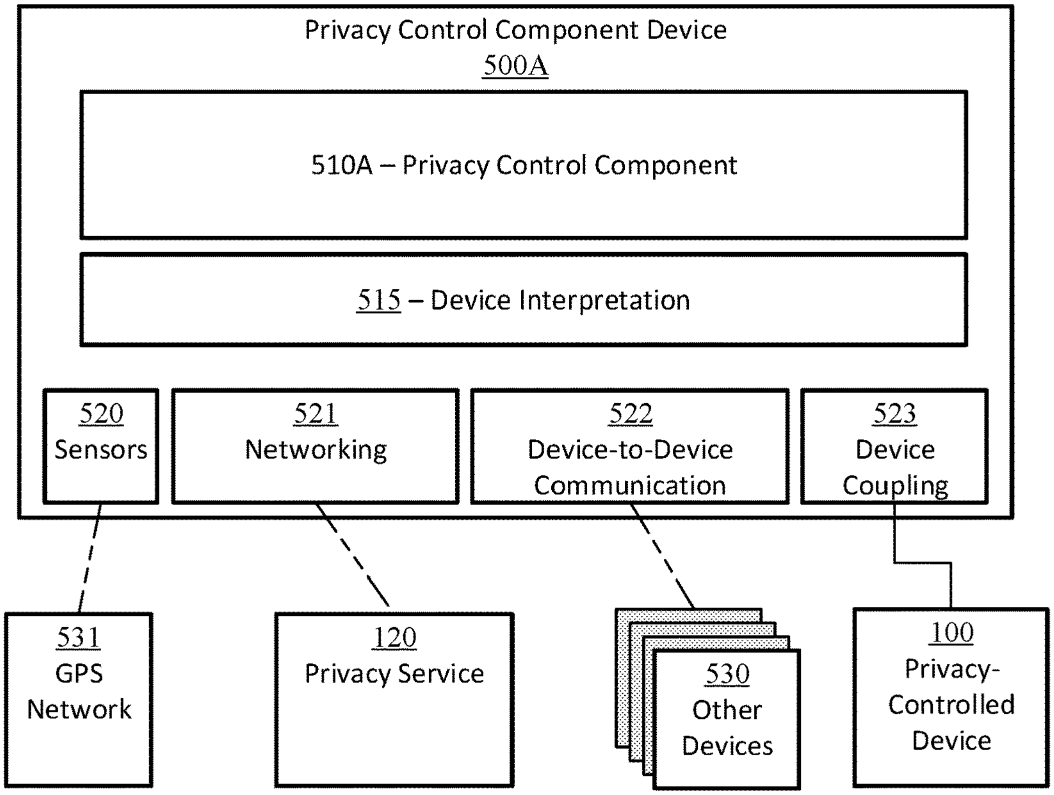
FIGS. 5A-5B show block diagrams illustrating privacy control component devices that implement methods for controlling and verifying privacy behaviors in PCDs.
Figure 5B:
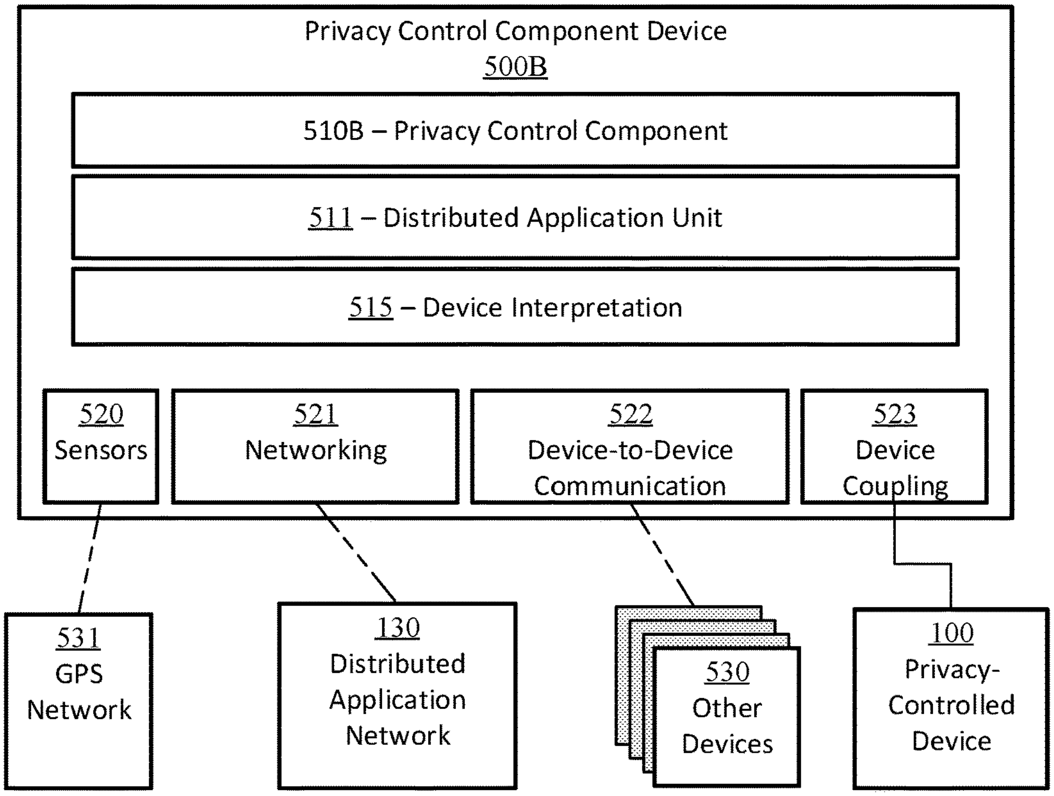

A PCC 102A may be an apparatus constructed based on a device such as described in FIGS. 5A-5B. When the PCC 102A comprises hardware components or modules that are installed in or otherwise coupled to the PCD 100 (e.g., via an interface technology such as USB), such program instructions may also be incorporated as part of the firmware of that hardware device. In some cases, a PCC 102A apparatus having hardware may comprise sensors such as cameras, microphones, or other sensors capable of detecting privacy identity data using biometric detection. Such an apparatus may also or alternatively provide networking capabilities, such as a BLE networking receiver and associated software for detecting a PPD's BLE beacon. A PCC 102A having apparatus form (e.g., embodied in or comprising hardware components) may be installed, for example, on PCD(s) 100 that lack certain sensors or networking capabilities intrinsically, or because a hardware-embodied privacy control component/apparatus is more resistant to malicious tampering.

Privacy control component may communicate with a privacy service 120A to send the privacy ruleset request 110 over a network (e.g., available on the PCD 100 or intrinsic to the privacy control component apparatus) as described in FIG. 10 and FIGS. 5A-5B. Privacy control component 102A facilitates the interaction between PCD 100 and privacy service 120A, for example, by utilizing an application programming interface (API) of the privacy service 120A accessible over the network. An "API" is generally a set of programming instructions and standards for enabling two or more applications to communicate with each other. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component. The API and related components may be stored in one or more computer readable storage media. An API is commonly implemented as a set of Hypertext Transfer Protocol (HTTP) request messages and a specified format or structure for response messages according to a REST (Representational State Transfer) or SOAP (Simple Object Access Protocol) architecture. In some cases, an API may send response messages formatted in, e.g., XML (Extensible Markup Language) or JSON (JavaScript Object Notation).

The network can include, but is not limited to, a cellular network (e.g., wireless phone), a point-to-point dial up connection, a satellite network, the Internet, a local area network (LAN), a wide area network (WAN), a Wi-Fi network, an ad hoc network or a combination thereof. Such networks are widely used to connect various types of network elements, such as hubs, bridges, routers, switches, servers, and gateways. The network may include one or more connected networks (e.g., a multi-network environment) including public networks, such as the Internet, and/or private networks such as a secure enterprise private network. Access to the network may be provided via one or more wired or wireless access networks as will be understood by those skilled in the art.

Generally, but non-limitingly, a privacy service 120A receives the privacy ruleset request 110 (and other data from privacy control component 102A, such as control state verification data 150), performs various processing activities to determine an appropriate collection of privacy-control rules, records details about the activity on a distributed ledger of the distributed application network 130, and sends back response data (e.g., 140) to the privacy control component 102A. Processing activities of a privacy service 120A are discussed in detail in the text relating to FIGS. 3A-3D. However, an architectural view of a privacy service 120A and its associated distributed application network 130 architecture is salient here. FIG. 10 describes a system that may be used in some environments to implement a privacy service 120A using various types of physical and virtual computing systems and associated components.

To perform its various processing activities, privacy service 120A may be considered as one or more units or modules that perform specific processing activities, such as privacy identity rule unit 121, schema unit 123, distributed application unit 125, rule conflict merger unit 126, and control state verification unit 155. These units may be segmented into separate, discrete codebases running on different systems, or they may reside on the same system and have a logical/conceptual separation. In the example of FIG. 1A, dotted line 120A shows a virtual system boundary surrounding components within the privacy service.

The privacy service 120A may also have one or more associated data repositories, such as rule data store 122 and schema data store (or "privacy trust schema store") 124. A rule data store 122 is collectively composed of the data structures and data content that describe privacy-control rules for the participants in the privacy trust system (e.g., entities and PCDs having privacy identities in the system). A schema data store 124 is collectively composed of data structures and data content describing system parameters and information used in processing activities such as determining the privacy-control ruleset and performing merger of conflicting rulesets.

Regarding a rule data store 122, a privacy-control rule defines a specific privacy behavior in relation to a specific entity in a given context. Each privacy-control rule, when processed by the PCD, can be translated into specific hardware and software states within a PCD. A privacy-control rule (and the ordering structures thereof) may take a variety of forms depending, firstly, on the nature of the privacy behavior being described and, secondly, on the different implementation structures chosen for efficient processing. These forms, in turn, influence the type of storage system used for the rule data store 122.

To illustrate the possibilities of a privacy-control rule structure, consider an example scenario that might inform a PCD of an entity's privacy behavior preference in a given situation: Alice prefers not to be recorded by the devices of others, so a privacy behavior preference might be "For Alice, turn off audio recording when at a friend's house." This rule relates to sensor module states and describes a specific sensor state for a specific person in a location-determinant context. This preference has a recognizable structural form that may be generalized to the wider category of privacy preference settings relating to sensor control: SENSOR-SENSOR STATE-ROLE-CONTEXT. The rule relates to sensors that "record audio", the sensor state should be "off", the role is "as friend" and the generalized location context is "home of another." ("Context" may occasionally be referred to as "privacy context" herein.)

Various kinds of PCDs, such as robots, drones, IoT devices, mobile devices, and even standard laptop or desktop computers have sensors for a variety of reasons: to orient themselves in their environment, to identify important objects or people, to attenuate the force they apply when performing movements or other actions (e.g., grasping), to determine the operating state of a machine or device they are controlling, and to record the movements, actions, sounds, or other telemetry data of people or other entities for historical, accounting, behavioral analysis, and pure surveillance purposes. A device of any sophistication, such as a robot, may have dozens of sensors representing almost every one of these categories. Depending on how and when a sensor is used and the duration for which it saves its sensor data, any sensor has the potential to impact privacy behavior preferences.

With respect to the sensor entity itself, each model of sensor being used in devices collectively can be represented as a sensor taxon in a taxonomy of available devices, which may be stored on a schema data store 124 of the privacy service 120A. Each sensor model may have a set of specifications that describe, e.g., its capabilities, operative ranges, and potential operating states. For example, the "Waveshare Obstacle Detection Laser Sensor [RB-Wav-23]," available from Robotshop.com, is used in some devices to detect obstacles in the ambient environment or count objects moving by it. This laser sensor has an effective detection range of 0.8 m and a maximum range of 1.5 m. A different category of sensor, the "BlackBird2 3D FPV Camera," has two cameras for stereovision (3D) capability. Many models of sensor with varying capabilities exist across the sensor parts supplier market.

For representational efficiency and compactness, in some instances of the sensor rule structure the SENSOR attribute may indicate an overall sensor capability. A sensor capability is a higher-level descriptor indicating what a sensor can do, such as "Video", "Audio", "Detect Motion", etc. Each sensor model may be grouped into one or more sensor capability categories. In this manner, when a privacy-control rule instance such as "Video recording off for Alice in bathroom" is encountered, it is known to apply to all sensor models having the "Video recording" capability. In this manner, any robot that encounters a privacy-control rule in operating mode will be able to process the rule with reference to its own sensor capabilities irrespective of the exact sensor model the robot is using.

The SENSOR STATE rule structure attribute represents an additional category of taxa for potential operating states of a sensor. The most simple and basic SENSOR STATE might be ON or OFF. Depending on the sensor model/capability category, more granular states can be described. For example, a video sensor capability could have the sensor states: ORIENT-ONLY (camera is only used for the device's own orientation purposes), RECORD PERMANENT (a permanent video record is stored on the device's storage), RECORD TRANSIENT [TIME] (the video record is kept for the designated time value, then disposed of), and RECORD OFF. As with SENSOR, SENSOR STATE can be represented by higher-level descriptors that encompass more than one category.

The CONTEXT attribute/aspect of the privacy-control rule structure reflects the reality that privacy behavior expectations are often context-dependent at a very granular level. For example, whether a person would want to be recorded by a nearby device may differ depending on whether she is having lunch at a busy restaurant or is conversing with her family in her living room. Several conceptual layers of context are potentially important: cultural (cultural background of a region, religious affiliation, ethnic group), societal (economic system or political structure), group (voluntary or involuntary affiliation with a societal segment or group, such as charity, church, advocacy group, support group, political affiliation), locational (home, place of employment, private meeting, friend's house, medical facility, region, country, state, city), individual, situational (ad hoc situations, emergencies or when security or safety of self/others is impacted), legal (constitutional, statutory, or regulatory constraint, e.g., compliance with a privacy law), and trust relationship (explicit or implicit interaction relationship with the PCD, such as a robot one owns or that inhabits a place of employment; functional relationship, e.g., a personal care robot).

These layers may be organized hierarchically such that some layers are more generalized than others. Lower layers in the hierarchy can override the higher layers when rules are processed to determine control behaviors. This enables the creation of powerful generalized default behaviors that can be used to apply sensible privacy behavior controls to large groups with conceptual and representational efficiency. Meanwhile, the descending layers of hierarchy maintain the capability of the privacy trust system to adapt to more granular choices at any arbitrary level of the context hierarchy. For instance, if culture is organized highest in the hierarchy of context layers, locational context rules, if present, may override cultural rules.

A ROLE component of a privacy-control rule structure allows rules to be representable in role-based forms, not merely identity-based forms. While a privacy identity's rules in totality represent the collective privacy behavior expectations of the privacy identity (e.g., a person or group), a rule itself pertains to the privacy expectations of a privacy identity's particular role in an identified context. This suggests a rule structure or hierarchy that can enumerate a privacy identity's roles, and the time, location, or other context in which those roles apply. This mechanism advantageously allows for a more granular and real-world description of privacy behavior preferences.

A short example illuminates roles: Cathy is a medical doctor. She works in a large hospital that uses numerous robots for a wide variety of purposes, including assisting in surgery and medical procedures, administrative functions, maintenance, and counseling. When Cathy enters the hospital as an employee, she expects that audio and video of her activities will be recorded by any and all robots under the hospital's ownership or control. These recordings are required by hospital policy and maintained for medical malpractice accountability. A possible rule defining a recording rule for her "doctor" role might be: "FOR CATHY|VIDEO|RECORD PERMANENT|DOCTOR|HOSPITAL". On the other hand, if Cathy enters the hospital as a patient, she is subject to various legal and ethical constraints on patient privacy that entail different privacy preference rules. A possible rule for her "patient" role might be: "FOR CATHY|VIDEO|ORIENT-ONLY|PATIENT|HOSPITAL".

In addition to accurately reflecting real-world scenarios, a privacy-control rule form with the capability to accommodate roles has the additional advantage of enabling very generalized privacy behavior preference categories. This allows some privacy-control rules to efficiently and compactly represent privacy behavior preferences applicable to large numbers of privacy identities. In fact, some rules may be generalized to such an extent that they encode valid "default" rules for certain contexts that largely apply to every privacy identity in that role and context. The doctor and patient rules above, for example, are fair representations of default video recording rules for physician-employees of hospitals, and for all patients of hospitals, respectively (in the United States, at least). A default rule capability may be valuable both during the initial populating of a privacy rule store and also in easing the administrative burden of individuals to configure their own preferences.

In addition to sensor states and recording levels, the physical proximity of a device (e.g., a robot) may be another factor in humans' perception of their own privacy; e.g., when a robot passes a human too closely, the person might anthropomorphize this behavior as rude or dismissive, concluding that it is a creepy violation of personal space. Naturally, context governs what is perceived as "too close"—city-dwellers and some cultures have a higher tolerance for close living than others. As this example shows, some privacy behavior expectations are met only when control can be exercised over a device's proximity, motility, location, limb movements, functions, gestures and other actions.

To accommodate these concerns, similar privacy-control rule structures may be developed for movements, gestures, and other actions in robotic devices, as well as for communication styles (e.g., conversation topics, amenability to interruptions or notifications, tonality of speech), data persistence of recorded telemetry, and data sharing with other devices or systems. A few examples include: Gestural (robot)—"Do not make thumbs-up sign in Italy, Greece, Iran, or Afghanistan" (a rude gesture); Interruptive communication (conversational agent)—"For Juan, do not converse or notify in study"; Recording persistence (smart home camera)—"For Mary, record video permanently when practicing Tai Chi"; Data sharing (personal computer)—"For Naomi, do not share location information with websites".

With respect to these additional categories, a taxonomy of functional device activities similar to the sensor taxa may be developed. Like sensor attributes, these taxa may represent higher-level forms that become interpreted and enacted in actuator module states or other software or hardware directives at the device level. Similar to the "sensor state" qualifier, a taxonomy of "activity constraints" (i.e., limitations on the activities that are relevant to privacy) may be associated with each functional activity descriptor. Thus, an activity rule may take the form: ACTION CONSTRAINT ROLE CONTEXT. Considering that context and role remain relevant qualifiers in these other kinds of rule structures, just as they were on sensor control rules, in some implementations a generalized rule structure may be used that encompasses predicates not only for sensor/sensor state actions, but also for all forms of activity control, including movements, communication, data persistence, and data sharing.

In terms of implementation, extensibility is a design characteristic of the privacy rule taxonomy or schema of the rule store. For example, as robots and IoT devices begin to be used more frequently, new types will be developed to meet a wider-range of applications, purposes, and usage contexts. Manufacturers of robot components will develop new sensor devices and even new categories of sensor measurement. As people begin to understand the subtleties of aligning privacy expectations with increasingly complex device interactions, the schema may need to reflect and specify those nuances on a very granular and adaptive level. Therefore, a characteristic of the rule store schema is that it should avoid requiring upgrade or conversion of devices in order to codify new taxa or even to introduce new subdivisions of taxa. The schema should also be self-describing to the extent possible so that the meta-structure of the schema itself can be processed according to automated methods and self-validate. Existing data representation technologies, such as XML and XML Schemas (XSD), are capable of satisfying both the extensibility and self-describing design preferences.

In some embodiments, a collection of privacy-control rules may be represented as XML tags/elements and content in accordance with a schema. An XML representation may be nested or hierarchical. FIG. 4 shows an example representation of a privacy ruleset for a given identity. FIG. 4 contains hierarchical XML tags and elements appropriate for storing rule content. A privacy identity's ruleset is contained within the "Rules" tag beginning on line 401 and ending on line 417. The opening tag on line 401 also contains an identifier ("Owner_Identity") of the privacy identity to which the rules belong. Nested within the "Rules" tag are three separate privacy-control rule tags shown on lines 402-406, 407-411, and 412-416. The rules have a generalized rule structure appropriate to all privacy behavior predicates, as described above. Each rule opens (lines 402, 407, and 412) with the tag name "Rule" and contains a unique rule identifier for the rule. Properties of the tag show the "activity" (lines 403, 408, and 413), the constraint (lines 404, 409, and 414), the role (lines 405, 410, and 415), and the context along with a signifier "/" to close the rule tag (lines 406, 411, 416).

Practitioners in the art will appreciate that an XML-based privacy ruleset may be implemented in multiple ways, and that the example in FIG. 4 is not intended to be limiting to a particular content or arrangement of tags and elements. For example, a privacy identity's ruleset may be stored in XML with a nested element hierarchy, where activity, constraint, role, and context are themselves hierarchical element tags within a "Rule" tag. Further, these are not the only forms or representations privacy-control rules can take, and alternative representations may suggest themselves to skilled practitioners. Other structural forms may be used to represent hierarchies of contexts, roles, or sensor types.

It should be noted that, in addition to storing privacy-control rules specifically assigned to particular privacy identities, a rule data store 122 may also store a set of hierarchically-arranged "default" rules that depict default privacy-control choices at a variety of contextual levels. These default rules may be used, for example, to provide default privacy-control rules when a privacy identity has not defined a particular privacy-control rule for a particular combination of attributes.

A schema data store 124 is collectively composed of data structures and data content describing system parameters and information used in processing activities such as determining the privacy-control ruleset and performing merger of conflicting rulesets. The use of such information stored in the schema data store 124 will be discussed with respect to processing methods for determining privacy-control rules (e.g., FIGS. 3A-3C). In brief, however, the schema data store 124 can include data structures for storing information about registration information for PCDs that have joined the privacy trust system as participants, device capabilities of standard sensor and actuator devices, primary/secondary purpose and objective description and rule-mapping data, normative priority taxa, rule weighting factors, clarification questions and mediation policies for performing mediated merger protocols when privacy-control rules conflict, or any other data or information needed to perform the activities of a privacy trust system herein. In some embodiments, information that is stored in the schema data store 124 may be selected or modified by a participant in the privacy trust system; such selection or modification activity may be guaranteed with a stake of cryptographic token that is surrendered to an auditing device if the selection or modification activity is determined to be invalid (see FIGS. 3B-3C).

Such information may be stored in separate data stores or in a single data store. Information contained in a schema store may be structured similarly to a rule data store above (e.g., XML) or in any other way foreseeable to a reasonably skilled practitioner. In general, structuring techniques for data stores 122, 124 can range from highly-ordered organizations of information—where each data element has a place in a rigidly defined structure—to loose collections of unstructured data. Highly-ordered information collections may be managed by relational database management systems (RDBMS), which have the advantages of fast indexing and transactional integrity on changes to data. In some cases, flexible collections of unstructured data can be advantageous because they lack a centralized indexing hierarchy that may become a processing bottleneck in an RDBMS. These more unstructured methods of repository management are sometimes referred to as non-relational, or "NoSQL" databases. One of the simplest forms of a non-relational database uses "documents" or files in the file system to serve as a data store. The "database" merely consists of a collection of such store files, many of which may refer to binary objects. A document or file loosely corresponds to a record in an RDBMS table, but contains data which is far less structured in many cases. It should be noted that examples are not intended to limit the amount or varieties of data that may be stored by data stores 122, 124. Data stores 122,124 may be implemented as databases, tables, and records in a database management system or relational database management system, examples of which are Microsoft SQL Server® and Oracle®. Data stores 122, 124 may also be implemented using NoSQL techniques, XML file structures, or other file structures, as will be appreciated by practitioners in the art.

Figure 1B:
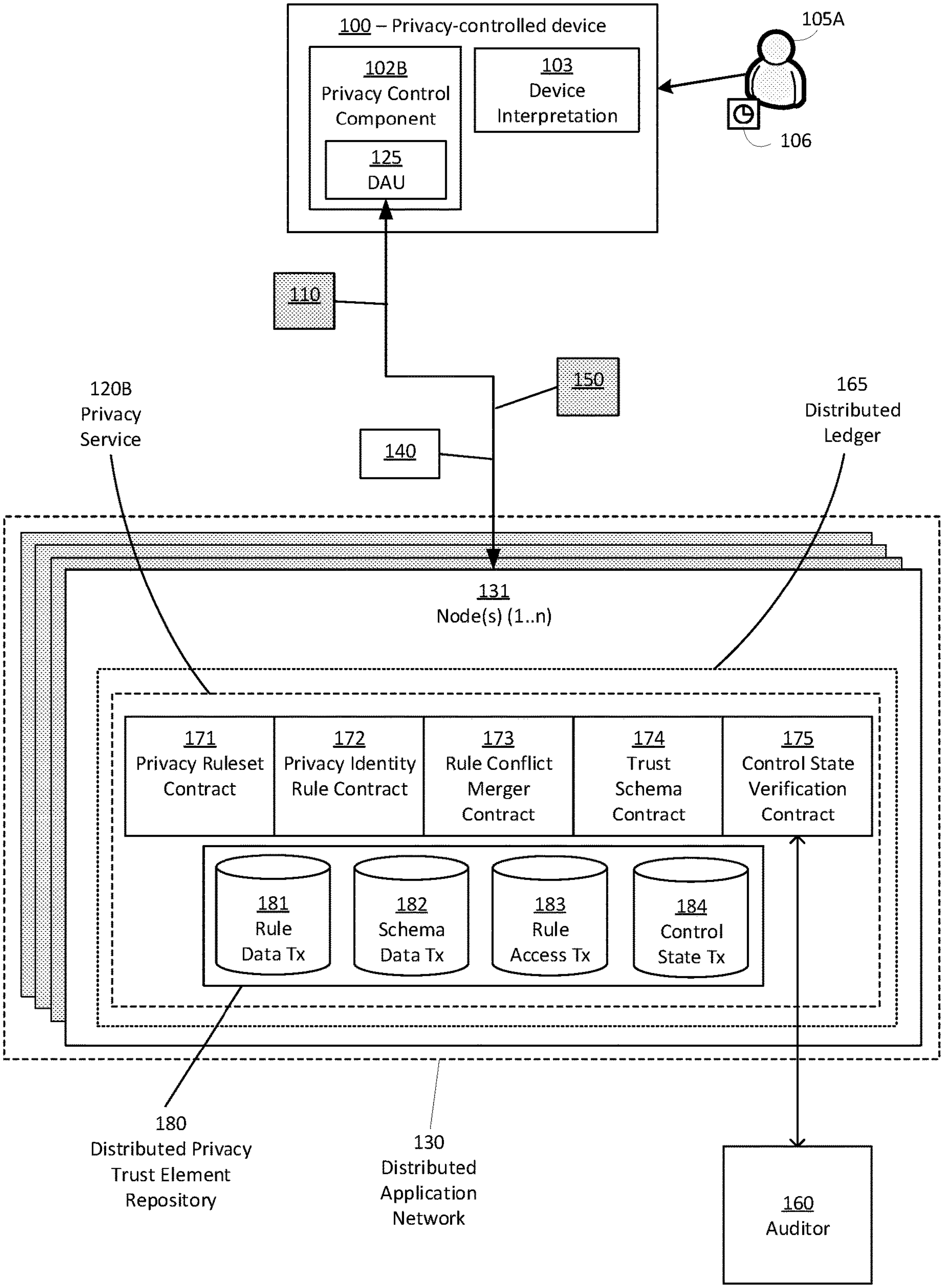
FIG. 1B shows an example system/component environment in which some implementations of systems and techniques for selecting, defining, controlling, verifying, and auditing privacy behaviors of devices can be carried out using components in a distributed application network.

Data stores 122, 124 can be implemented in whatever structural form may reside on computer-readable media of the privacy service. In some embodiments, one or both data stores 122, 124 may reside on the distributed ledger on the distributed application network 130. In certain embodiments, one or both data stores 122, 124 may reside on or utilize state or data storage services such as a decentralized file system, decentralized database, key/value store, or other state storage mechanism accessible through, integrated with, or residing on the distributed application network 130. Such services may be accessible through a smart contract or distributed application (also known as a "DApp") of the distributed application network 130. Examples of such services that are available from third parties and integrated into existing distributed application networks such as Ethereum include Namecoin, Filecoin, BigChainDB, and Swarm. FIG. 1B shows an example system component configuration illustrating rule data and schema data in one or more of these additional configurations involving storage on the distributed application network 130.

In some embodiments, one or both data stores 122, 124 may be provided through an "oracle" service accessible through, but not necessarily residing on, the distributed application network 130. An oracle service provides supplemental feeds or streams of data that have been "trusted" by the distributed application network to provide reliable supplementary data that may be required for certain activities. For example, an oracle may store the parts of the schema data store 124 that stores a taxonomy of sensor hardware types and configurations.

Furthermore, it is contemplated that, in all variations of storage configurations, all of data store (e.g., rule data store 122 and schema data store 124) may reside on a single storage type or the data store may be arranged across more than one storage type (e.g., some data structures or data segments of the rule data store 122 may reside on computer-readable media provided by the privacy service and some may reside on a decentralized database, oracle, or on the distributed ledger itself).

In some cases, an application that configures privacy-control rules for a privacy identity (e.g., running on a user device or PPD 107) connects to the privacy service 120A to modify the privacy rules associated with the privacy identity of an entity. Such an application is described with respect to FIG. 8A.

To record the privacy rule access token-storing transaction in a persistent and trusted manner, the privacy service 120A may store the records on a decentralized distributed ledger (in which records are unchangeable and undeletable) that is housed on the distributed application network 130. The privacy service 120A may use a distributed application unit 125 that is connected to a distributed application network 130 to access the network and the ledger.

A distributed application network 130 typically includes several nodes 131, which may be, e.g., one or more systems, machines, computers, databases, data stores, or the like, operably connected with one another. Computing systems can become nodes in a distributed application network 130 by running node software that is particular to the type of distributed application network 130, such as node software for participating in a blockchain network (e.g., Bitcoin, Ethereum, a private blockchain implementation, etc.). In some cases, each of the nodes or multiple nodes are maintained by different entities. The node software interconnects with other nodes/peers in the distributed application network via a network (e.g., the Internet) and maintains a complete or partial copy/replica of the distributed ledger database. Privacy service 120A can include a node via distributed application unit 125, which participates in a distributed application network 130 at least by running node software.

In some embodiments, the distributed ledger may be a blockchain-based data platform. The blockchain is a reliable distributed database system collectively maintained by all participating nodes in a decentralized and trustless way and is characterized by its unchangeability. A blockchain typically works without a central repository or single administrator. One well-known application of a blockchain is the public ledger of transactions for cryptocurrencies such as used in Bitcoin.

A blockchain provides numerous advantages over traditional databases. A large number of nodes of a blockchain may reach a consensus regarding the validity or a transaction contained on the transaction ledger. Similarly, when multiple versions of a transaction exist on the ledger, multiple nodes can converge on the most up-to-date version of the transaction. For example, in the case of a virtual currency transaction, a node within the blockchain that creates a transaction can determine within a level of certainty whether the transaction can take place and become final by confirming that no conflicting currency transactions have been confirmed by the blockchain elsewhere.

Data records recorded in the blockchain are enforced cryptographically and stored on the nodes of the blockchain in a chained sequence in which each subsequent block maintains a pointer to the previous block in the chain. A blockchain typically has two primary types of records. The first type is the transaction type, consisting of the actual data stored in the blockchain. The second type is the block type, which are records that confirm when and in what sequence certain transactions became recorded as part of the blockchain. Transactions are created by participating nodes, one of which is the distributed application unit 125 of privacy service 120A, to describe information that should be permanently recorded on the blockchain. Users of the blockchain (i.e., participating nodes 131 of the distributed application network 130 of which privacy service 120A is one) create transactions that are passed around to various nodes of the blockchain through a peer-to-peer (P2P) sharing network. Block type transactions are created by nodes known as "miners" who use specialized software/equipment to create blocks that comprise one or more sequenced transactions that have been proven to be valid. A "valid" transaction is one that can be validated based on a set of rules that are defined by the particular system implementing the blockchain. For example, in the case of cryptocurrency blockchain (e.g., Bitcoin), a valid transaction is one that is digitally signed, spent from a valid digital wallet and, in some cases, one that meets other criteria. In some blockchain systems, miners are incentivized to create blocks by a rewards structure that offers a pre-defined per-block reward and/or fees offered within the transactions validated themselves. Thus, when a miner successfully validates a transaction on the blockchain, the miner may receive rewards and/or fees as an incentive to continue performing the processing work of creating new blocks. A miner may run blockchain node software and blockchain mining software, or combined blockchain node/mining software.

In some cases, a blockchain or distributed ledger may be "sharded" in order to improve processing efficiency or storage. In sharding, the "state" of the blockchain as represented by the current state of its transactions is split into a number of partitions called "shards". For example, a sharding scheme on Ethereum (a well-known distributed application network) might put all addresses starting with 0x00 into one shard, all addresses starting with 0x01 into another shard, and so on. In the simplest form of sharding, each shard also has its own transaction history, and the effect of transactions in a given shard k are limited to the state of shard k. One simple example would be a multi-asset blockchain, where there are K shards and each shard stores the balances and processes the transactions associated with one particular asset. In more advanced forms of sharding, some form of cross-shard communication capability, where transactions on one shard can trigger events on other shards, is also included. Sharding enables several different types of nodes to be run as participants in the distributed application network, such as a super-full node, which processes all transactions in all collations and maintains the full state for all shards; a top-level node, which processes all top-level blocks, but does not process or try to download the transactions in each collation (instead, it accepts it on faith that a collation is valid if two thirds of the collators in that shard say that it is valid); a single-shard node, which acts as a top-level node, but also processes all transactions and maintains the full state for some specific shard; and a light node, which downloads and verifies the block headers of the top-level blocks only (it does not process any collation headers or transactions unless it needs to read some specific entry in the state of some specific shard, in which case it downloads the Merkle branch to the most recent collation header for that shard and from there downloads the Merkle proof of the desired value in the state).

Any one node may have a complete or partial copy of the entire ledger or set of transactions and/or blocks on the blockchain. Generally, devices with more limited processing systems and storage capability may run partial nodes or "light clients". Devices described in the privacy trust system that have a distributed application unit 125 may be nodes that have either a complete or a partial copy as described above, and the nodes may or may not be miners, depending on implementation.

In various embodiments, the distributed ledger or blockchain may be permission-less, permissioned/private, or a combination thereof. A permission-less blockchain includes, for example, a Bitcoin blockchain in which any device can download and participate in the operation and maintenance of the blockchain by joining as a node. A permissioned blockchain refers to a blockchain in which joining as a node is limited to a particular organization. In a combination permission-less and permissioned blockchain, the consensus process is controlled by a pre-selected (permissioned) node. In various embodiments, certain data stores may reside on a permissioned distributed ledger, while others reside on a permission-less distributed ledger. In embodiments where a permissioned or permission-less distributed ledger is dedicated to storing transactions exclusively related to the disclosed privacy trust system may be referred to as a "privacy trust system distributed ledger" or "privacy trust system blockchain".

For example, Hyperledger is a technology for building permissioned DApps. Hyperledger "fabric" is an implementation of the Hyperledger project. Other implementations include Intel® Sawtooth and R3 Corda. Fabric is a permissioned decentralized platform that allows permissioned DApps (called chaincodes) to be run of it. To utilize Hyperledger, an instance of "fabric" is deployed and then permissioned DApps relating to privacy trust system functions are deployed on the instance. Every node in the network runs an instance of fabric. Fabric allows the selection of various consensus protocols and features. Hyperledger uses the blockchain data structure. Hyperledger-based blockchains can currently choose to have no consensus protocols (that is, the NoOps protocol) or else use the PBFT (Practical Byzantine Fault Tolerance) consensus protocol. Hyperledger fabric has a special node called the certificate authority, which controls which entities/nodes can join the network and their access rights.

Nodes can typically read information recorded in a transaction record without restriction. In some cases, transaction data is stored in a cryptographically encrypted or otherwise obfuscated form accessible only to those with a cryptographic key to decrypt the transaction data. In some cases, obfuscated information may be verified by miners and/or auditors 160 using zkSNARKS.

In addition, although an example in which the data platform system is blockchain-based is described here, any existing or future data platform system can be used so long as it contains a decentralized distributed database and data records in the data platform system are unchangeable and undeletable.

A PCD 100, upon receiving the response data 140 from privacy service 120A, applies the privacy-control ruleset, in some cases with assistance from device interpretation component 103. To verify the alignment of the privacy-control ruleset with the PCD control state, the PCD 100 may also send control state verification data 150 to the privacy service 120A, in some cases via controls state verification unit 155. Control state verification data is discussed with respect to FIG. 2 subsequently. Control state verification unit 155, via distributed application unit 125 (i.e., a node on the distributed application network 130) submits control state verification transaction to the distributed ledger as described in FIG. 3D.

An auditor 160 is generally an instance of computing device 1000 that implements a node on the distributed ledger so that it can access and verify distributed ledger transactions. In some embodiments, an auditor system or service 160 may review control state verification data 150 stored on the blockchain for variances between the PCD's expected and final control state. In other cases, an auditor 160 may review updates to the schema data store submitted by privacy trust system participants. Techniques implemented by auditors are discussed in regard to FIG. 9.

FIG. 1B shows an example system/component environment in which some implementations of systems and techniques for selecting, defining, controlling, verifying, and auditing privacy behaviors of devices can be carried out using components in a distributed application network. In FIG. 1B, in general, shows an example embodiment of a privacy trust system in which the privacy service 120B is a distributed app (or "DApp") constituted of one or more smart contracts and a distributed privacy trust element repository published to a distributed ledger of a distributed application network.

In FIG. 1B, certain components and structures remain consistent with identically numbered elements of FIG. 1A; that is, a PCD 100 detects a privacy identity 105A, perhaps using PPD 106, and sends a privacy ruleset request 110 and receives response data 140 in return. PCD 100 enacts control states indicated in the response data 140, perhaps with the assistance of device interpretation component 103, and PCD 100 then sends control state verification data 150 to privacy service 120B. Auditor 160 may verify control state data submitted by PCD 100 as in FIG. 1A.

However, in FIG. 1B, functions and data stores supporting privacy service 120B exist on a distributed application network 130, which was discussed extensively with respect to FIG. 1A. Node(s) 131, of which there can be any number (1-n), are peer-to-peer members of the distributed application network 130 and provide distributed storage for the distributed ledger database 165 which forms the storage backbone for storing the ledger data and program instructions for function logic. A node 131 may store all, or part, of the distributed ledger database 165. A subset of nodes called "miners" may provide processing systems for executing the function logic (in return for a reward and/or transaction fee).

In FIG. 1B, logical system boundaries are indicated by dashed lines enclosing certain components. The entirety of the distributed application network 130 is extant on peer-to-peer nodes 131. The distributed ledger 165 comprises all the stored data from transactions on the ledger, as well as the program instructions for function logic to execute transactions on the distributed ledger 165. A distributed ledger may take the form of a blockchain.

Privacy service 120B exists as a subset of the data/transactions and program instructions on the distributed ledger 165. The subset of data/transactions in the privacy service 120B include a distributed privacy trust element repository 180, potentially with several kinds of data stores and/or transactions. The subset of program instructions of privacy service 120B includes functions for executing transactions on the distributed ledger related to the privacy trust system (e.g., functions for creating privacy rules, retrieving privacy rules, resolving conflicts between privacy rules, storing control state verification data, and modifying the trust schema). These functions may be grouped into one or more smart contracts (e.g., 171-175).

In some implementations, privacy service 120B may be on its own "private" or permissioned distributed ledger, in which case the distributed ledger 165 may store exclusively privacy service 120B data and program instructions. In some cases, the privacy service 120B may exist on a shared distributed ledger, in which the data and program instructions of privacy service 120B are only a subset of the data and program instructions stored there. In still other cases, the privacy service 120B may exist as a "shard" of data and/or program instructions on a shared distributed ledger.

As privacy service 120B data and functions are generally accessible to other nodes in the distributed application network 130, PCC 102B may have a distributed application unit (DAU) module 125. DAU 125 provides program instructions and data structures to allow a computing device to function as a node on the distributed application network 130 (as described in FIG. 1A). Having a DAU 125 on the PCC 102B enables it to communicate with the other nodes in order to read data, execute transactions to create or modify data, or execute other functions and smart contracts of the privacy service 120B.

A smart contract is a set of program instructions for automating certain processing of a distributed application. A smart contract is written in a Turing-complete language. To deploy a smart contract, it is compiled and submitted to a distributed application network 130 as a transaction. When the contract generation transaction is processed by nodes 131 of the distributed application network 130 and committed permanently to the distributed ledger 165, the smart contract becomes a set of functions that can be invoked by calling processes to do various kinds of work on the distributed application network 130. The invocation of the smart contract (e.g., by calling its one or more functions) causes the program instructions embedded in the smart contract to be executed on the processing systems of one or more nodes 131. One or more smart contracts may be called a distributed application or DApp on some distributed application networks (e.g., Ethereum). Smart contracts constituting privacy service 120B may be implemented as a DApp on Ethereum or other distributed application network. Once committed to the distributed ledger 165, smart contracts run exactly as programmed without any possibility of downtime, censorship, fraud, and third-party interference.

In a distributed application network with smart contracts, cryptographic tokens may represent the smart contract. In Ethereum, for example, a cryptographic token is nothing more than a smart contract running on top of the Ethereum network as a DApp. A token smart contract, then, is a set of code (functions) with an associated database. The code describes the behavior of the token, and the database is a list tracking who owns how many tokens.

On Ethereum, for example, specialized cryptographic tokens can be created using a token-creation smart contract that adheres to standards defined in ERC-20. Some embodiments herein may employ specialized cryptographic tokens that confer a tradeable "right" within the privacy trust system. For example, a privacy identity may receive cryptographic token in a token repository when one of its privacy-control rules are suppressed in favor of another privacy-control rule. This may accumulate in the privacy identity's token repository until, on another occasion, the privacy identity can use the cryptographic token to gain priority for its own privacy-control rules. This mechanism may provide the capability for a tradeable "right to have one's privacy behavior expectations met" that can be selectively used.

In some embodiments, cryptographic tokens may be various kinds of cryptocurrencies, such as BTC (Bitcoin) or ETH (Ether). Specialized cryptographic tokens, if used, may have a tradeable valuation measured in another cryptocurrency, and such tokens may be traded for other cryptocurrencies on an exchange.

In embodiments, the privacy control and verification services provided by the privacy trust system may be performed by invoking one or more smart contracts published to the distributed ledger 165. Various process flows described herein may be implemented as smart contracts or functions thereof. Smart contracts may interact with the distributed ledger 165 to access, create, or modify data relating to the privacy trust system, collectively called the distributed privacy trust element repository 180. The distributed privacy trust element repository may include different types of transaction data, including rule data transactions 181 (e.g., which store the raw privacy-control rule data of different privacy identities), schema data transactions 182 (e.g., which store the schema data and information that guides certain processing activities of the privacy service), rule access transactions 183 (e.g., which store the privacy rule access token data to record data elements related to privacy ruleset requests and results), and control state verification transactions 184 (e.g., which link privacy rule access token data to end control states submitted by PCDs).

Figure 3A:
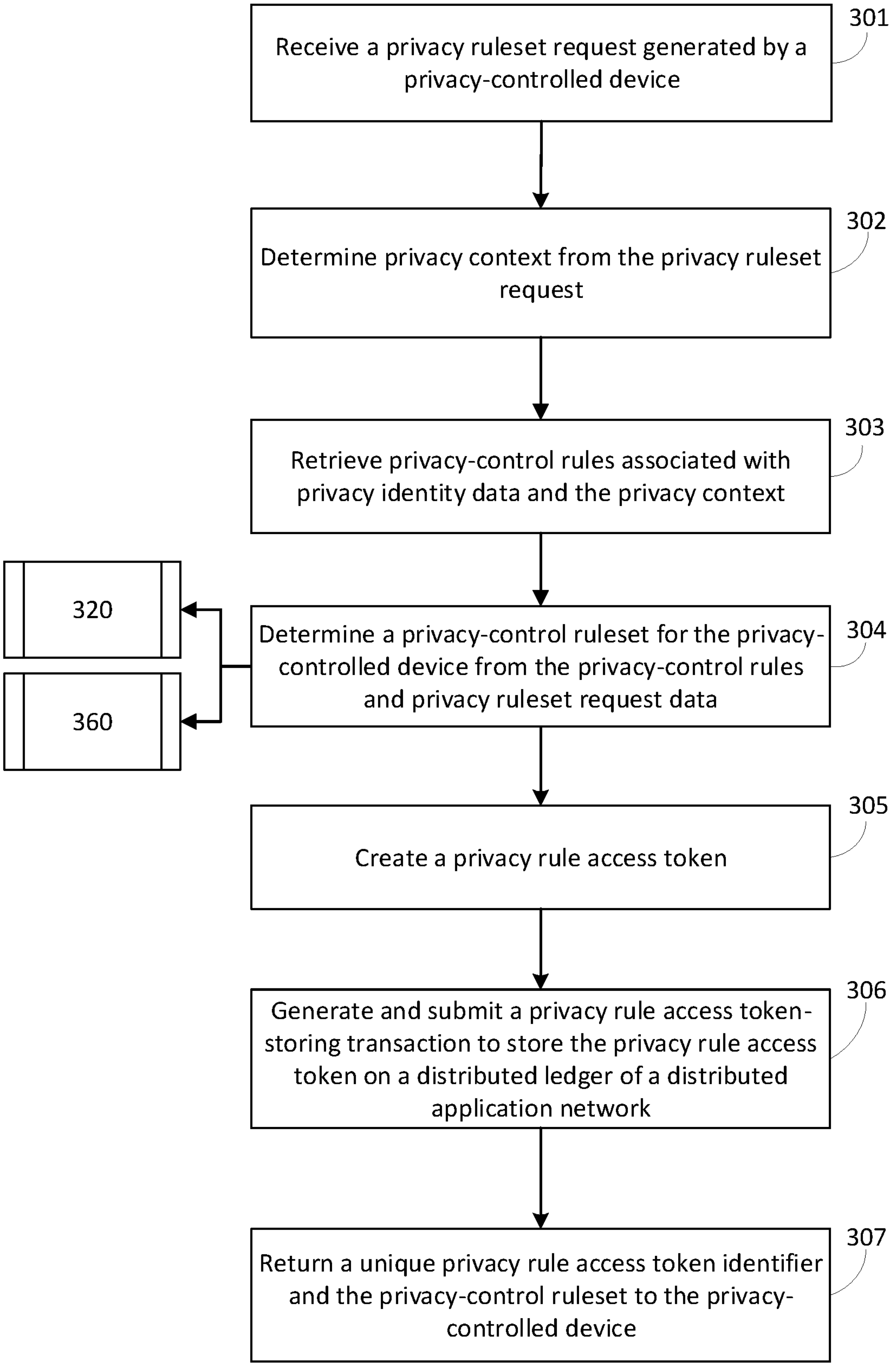
FIG. 3A illustrates an example process flow for facilitating control and verification of privacy behaviors in privacy-controlled devices.

A privacy ruleset contract 171 may implement functions relating to the retrieval of privacy-control rule data from the rule data element repository 181 and the committing of that data to rule access transactions 183, as described in FIG. 3A. A rule data element repository may contain rules in a form similar to that described in regard to rule data store 122 of FIG. 1A.

A privacy identity rule contract 172 may implement functions used by privacy identities to create or modify their privacy-control rules on the rule data element repository 181. Functions may also be provided that enable an entity to register a new privacy identity, associate metadata and privacy identity identifier information with the privacy identity, etc., as described in respect to FIG. 8A-8B.

Figure 3B:
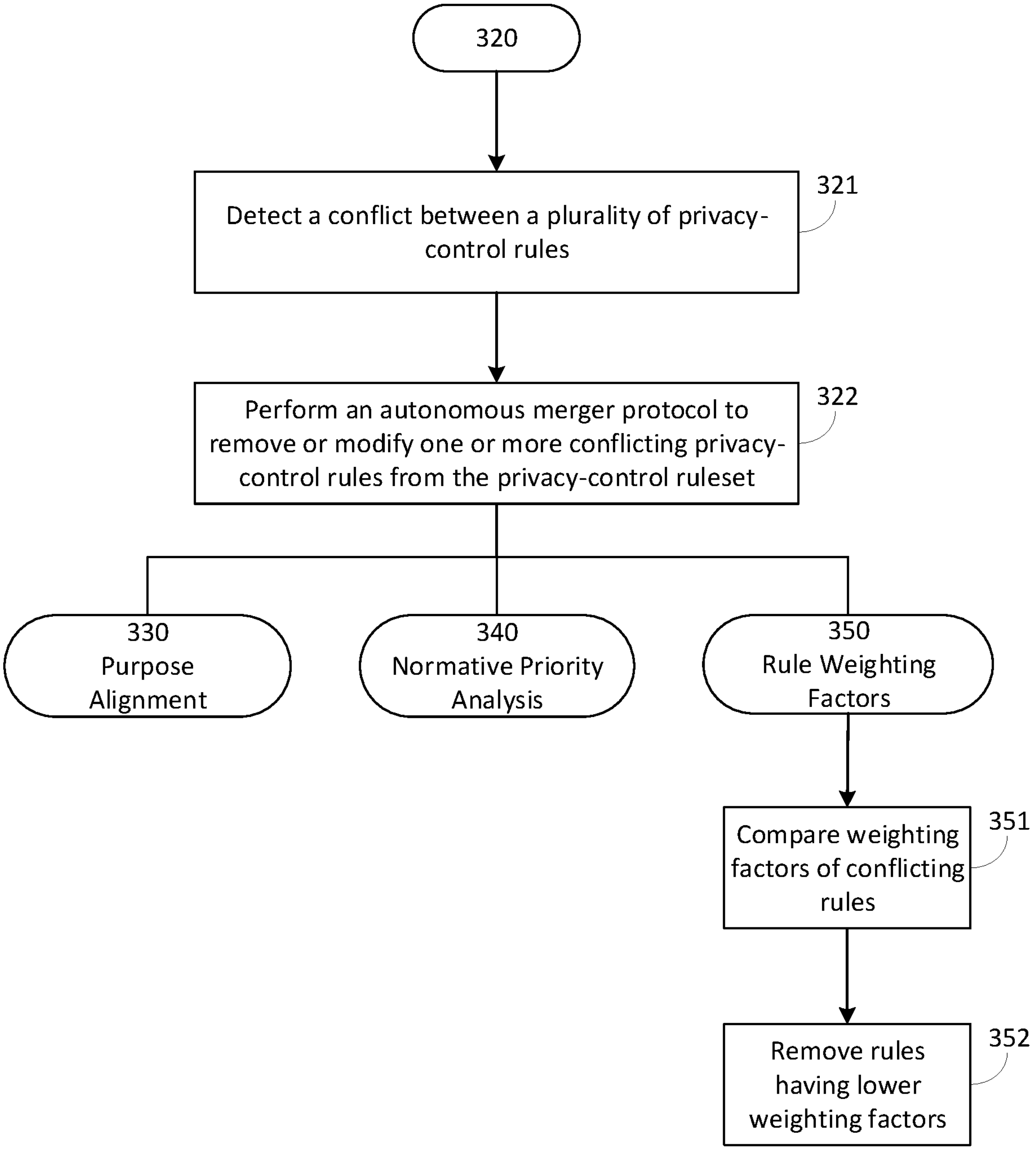
FIG. 3B shows an example process flow used in some embodiments to detect and resolve conflicts between a plurality of privacy-control rules using an automated merger protocol.
Figure 3C:
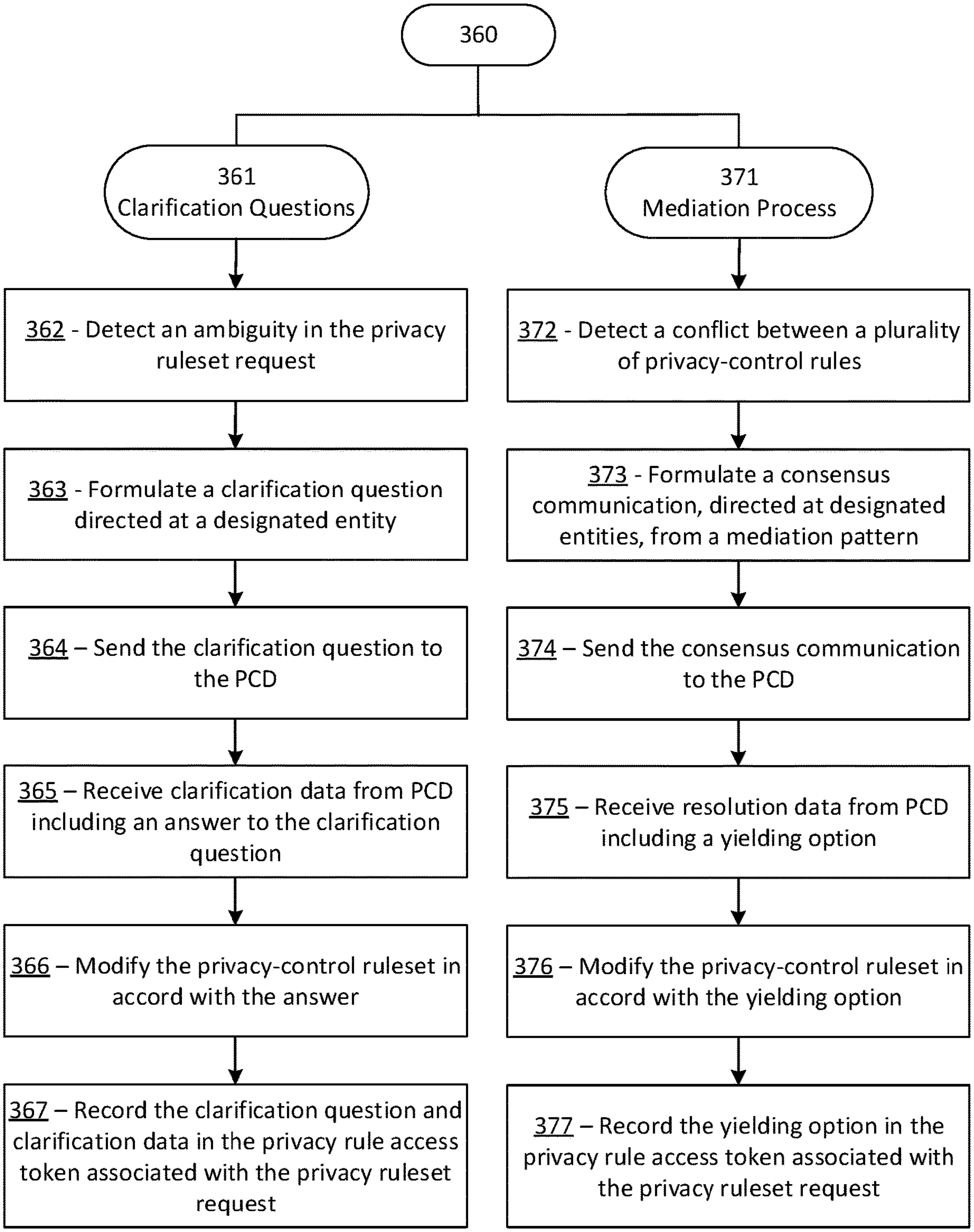
FIG. 3C shows an example process flow used in some embodiments to perform a facilitated merger process.

A rule conflict merger contract 173 may act in accordance with a schema data element repository 182 to retrieve schema data such as normative priorities, clarification questions, and other information of relevance to privacy-control ruleset determination (see, e.g., FIGS. 3B-3C). It should be noted that one contract may call other contracts as part of their processing functions. For example, a privacy ruleset contract 171 may call rule conflict merger contract 173, and a rule conflict merger contract may call trust schema contract 174.

A trust schema contract 174 may provide functions for privacy trust system participants to access the schema data element repository 182 to access or modify schema data (see, e.g., FIGS. 3B-3C).

A control state verification contract 175 may provide functions for committing control state verification data to the distributed ledger 165 as control state transactions 184. The control state verification contract may also provide functions that auditor 160 can call to verify the consistency of privacy ruleset-control state pairs, receive or release cryptographic tokens that were staked when the control state verification transaction was committed, and other functions (see, e.g., FIG. 3D).

It should be noted that the particular arrangement of functions into smart contracts shown in FIG. 1B is exemplary only, and that functions may be grouped together into any number of smart contracts.

Figure 2:
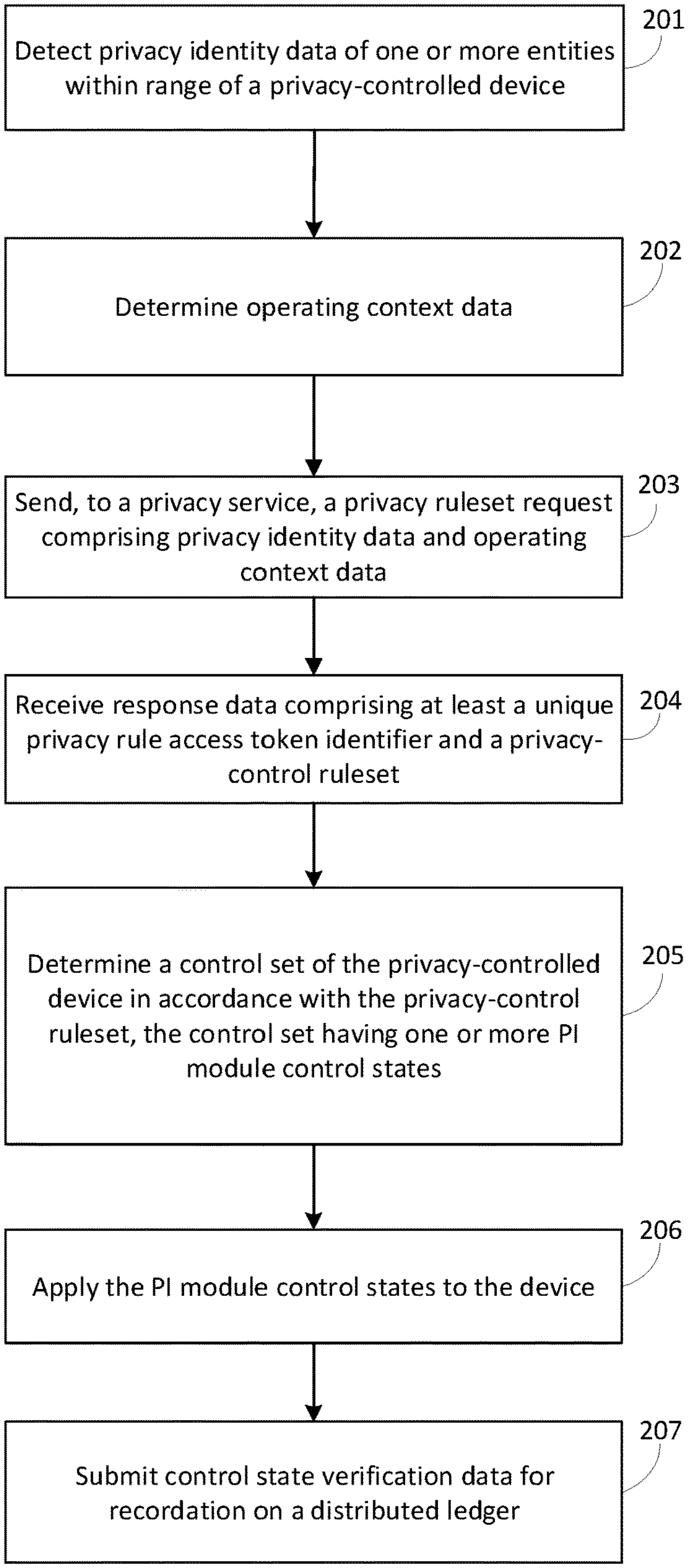
FIG. 2 illustrates an example process flow for controlling and verifying privacy behaviors in PCDs.

FIG. 2 illustrates an example process flow for controlling and verifying privacy behaviors in PCDs. A process flow such as the example in FIG. 2 may be implemented by a privacy-controlled device (PCD) such as the example PCD 100 (FIG. 1A), by a PCC 102A-B (FIGS. 1A-1B) thereon, or by a PCC device (e.g., FIGS. 5A-5B) coupled to PCD 100, any of which are in communication with a privacy service (e.g., 120A-B of FIGS. 1A and 1B). In some embodiments (see, e.g., FIG. 6D), the process flow described in FIG. 2 may be shared between a PPD device 600D having privacy control component part "A" 610 communicating with a PCD 500C having privacy control component part "B" 611.

In FIG. 2, privacy identity data of one or more entities that have moved within a PCD's range or detection zone (201) is detected. Specific system components for detecting privacy identity data of entities were discussed with respect to FIG. 1; however, more detail on the methods of detecting privacy identity data and using it to request a privacy ruleset is appropriate here.

Privacy identity data includes (but is not limited to, depending on implementation) identification data that is sufficient to match an entity to its privacy identity (which comprises privacy rules for the entity). This may be a unique identifier of a privacy enunciator device in the possession of the entity that associates the entity to its privacy identity. In some cases, a device associated with the entity may possess a unique identifier, or it may possess a set of composite data from the device that can be used to match the device with a privacy identity with a significant degree of confidence. An entity may associate identifiers of many devices to the same privacy identity (e.g., a mobile device and smart watch) so that the entity has many options for advertising its privacy identity.

As previously noted, a mobile entity can be carrying a privacy enunciator device (or PPD) that emits a broadcast signal capable of local detection by a PCD. Alternatively, an entity can place a privacy enunciator device fixedly within a space that emits a broadcast signal. The signal could be emitted by a Bluetooth device on the privacy enunciator that emits BLE broadcast signals. Other categories of broadcast signals emitted include mesh networking technologies such as Zigbee. Because the privacy enunciator is periodically advertising its presence via these broadcast signals, the PCD can detect them (when they are within the detection zone) by having installed a matching device-to-device communication technology (e.g., networking hardware and device software) capable of detecting and ranging the distance and direction of the enunciator's broadcast signal. One key datum of this broadcast signal includes a unique device identifier of the device that sends the signal (e.g., a UUID in BLE). Since each device has its own unique device identifier, and a unique device identifier can be assigned to at most one privacy identity, the associated unique device identifier is sufficient to uniquely (and pseudonymously) match the entity to its privacy identity rule-base (see FIGS. 8A-8B for detail on how an entity associates privacy identity data with a privacy identity rule-base).

Depending on implementation parameters of the privacy service, and the choices of individual entities, privacy identity data can also take the form of biometric data detected by sensors of the PCD. As noted in FIG. 1A, these can include: camera sensors, audio sensors, movement or accelerometer sensors, GPS sensors, chemical or olfactory sensors, fingerprint sensors, as well as any other sensor type that is capable of detecting data that can be used to uniquely identify an individual by their physical characteristics. Different kinds of representations of physical characteristics obtainable from such sensors that can be matched uniquely to an individual include (but are not limited to): a photo/video of the individual, representation of a facial pattern, representation of an iris pattern, retina pattern, voice, movement characteristics or gait. Biometric data of this nature, because they uniquely identify the entity, can be associated with a unique privacy identity from which its associated rule-base can be found.

In some operating environments for some PPDs, it is possible or even likely that more than one entity will be present within the detection zone of a given PPD at any given time. It is also possible that the entities include one or more individuals and one or more "collective" entities associated with the place itself or with one or more subgroups of entities (e.g., a company might have a collective privacy identity associated with its office building and the company's board of directors may compose a subgroup within that group). Any or all of these may have a privacy identity with privacy-control rules assigned.

It should be noted that an embodiment may use multiple modes (e.g., beacons, biometric identification, common communication with the privacy service) of detecting privacy identity data. Indeed, any given device within a privacy trust system may use more than one mode, as it is contemplated that different entities may choose to be connected with their privacy identities using differing (or even multiple) techniques.

Some kinds of privacy behaviors impact entities at different ranges than others. For example, a camera sensor may, due to its longer range, be more impactful to the privacy of an entity than an audio recording device; or, privacy behaviors that are dependent on physical proximity to an entity happen at a much shorter range than a camera sensor. To accommodate for these variances, privacy identity data also can include the distance and/or direction of the entity from the PCD. Distance and/or direction data can inform the selection of privacy rules from privacy identities that are pertinent to the sensor capabilities of the PCD. For example, if an entity is within the detection zone at a distance where it is possible to record visual information but not audio information, it may not be necessary to retrieve privacy-control rules related to audio recording for that entity. Especially when multiple entities are inhabiting the detection zone, privacy-control rule selection based on distance and/or direction data can assist in reducing the number of conflicts between the privacy-control rules of the different entities. Several methods are possible. For example, when BLE or a similar device-to-device communication modality is used, the physical proximity of the privacy enunciator can be approximated by using the received signal strength indicator (RSSI) of the received radio signal. Alternatively, ranging sensors may be available on some PCDs that use laser range-finding to estimate distance and directionality very accurately.

Entities' expectations about the privacy behaviors of PCDs are dynamic and contextual. Entities and devices can be mobile; they can move into different physical spaces inhabited by different people, and different people can enter or exit a device's zone of effect at any time. Privacy behavior expectations are also impacted by cultural norms, shared group values, physical location and, sometimes, situational contexts such as an emergency will override all other concerns. For example, whether a person would want to be recorded by a robot may differ depending on whether she is having lunch at a busy restaurant or is conversing with her family in her living room. Thus, it is reasonable for devices to accommodate and align privacy behaviors with our contextually-informed values by including operating context data when requesting a privacy ruleset. Operating context data may then be used to locate privacy rules that match the context (e.g., see FIG. 3A).

Additionally, the roles of entities may vary by context or within the same context. Roles and their impact on the selection of privacy behavior constraints were discussed at length in reference to privacy-control rules and the rule data store (122 of FIG. 1A). In some embodiments, information about the role an entity is taking is communicated via the entity's PPD, which may be set explicitly to a certain role. In some cases, the PPD (or the PCD) may have a geolocation sensor that determines the place the entity is, and the place may be sufficient to determine the role.

To help account for certain of these variances, operating context data of the PCD is determined (202). Operating context data may include, but is not limited to, several elements that describe operating conditions, environment, capabilities, purpose, or other state variables/properties of the PCD. One element of operating context data may be geolocation data describing the three-dimensional position of the PCD. This information can be assistive in determining the nature of the place the PCD is in, e.g., private home or office, public space, university or school, medical facility, airport, hotel, governmental building, etc. Generally, geolocation information can be obtained from geolocation sensor of the PCD, such as a GPS. Another element of operating context data is date and time of day, which may be assistive in determining context when a PCD's role, or the likely nature of entities' presence in the detection zone, might vary depending on the time of day or date and thus imply different privacy-control rules.

In some cases, environmental conditions can be elements of operating context data. Environmental condition elements include additional local conditions information that may assist components of a privacy trust system to determine a set of privacy-control rules that is related to context. Environmental condition elements can include (but are not limited to), whether the device is inside or outside, temperature and other weather conditions, effective size of the room or other space the device is in; and a floorplan and/or object map of the immediate environment inside the detection zone.

A privacy-controlled device identifier of the PCD can be included via the operating context data or generally as part of the privacy ruleset request. A PCD (e.g., 100) registers with the privacy service or in the privacy trust system to become a participant. Registration may happen, for example, as part of an installation process that occurs when a privacy control component (e.g., 102A) is installed on the PCD (e.g., through a software installation process occurring when code libraries are installed) or when a privacy control component device is installed into or otherwise coupled with the device (see, e.g., 500A and 500B of FIGS. 5A-5B). Registration may also occur when the PCD first makes an API call to the service, through the user interface of a registration application run by the owner or administrator of the device, or through other well-known methods.

The effect of registration is at least that the PCD is assigned a unique PCD identifier. Registration of the PCD may also gather information about the PCD's capabilities, such as its model number and manufacturer; registration may also record a software inventory showing types and versions of software, firmware, and operating system information present on the device. Registration may also record an inventory of hardware types, versions, and models, including types of sensors and actuators and other hardware. This inventory or manifest conveys an understanding of privacy-impacting (PI) modules on the PCD. Some or all of this information may be associated with the PCD identifier and stored by the privacy service so that additional operating context information is available, if useful, for determining the PCD's context for rule evaluation. In some cases, operating context data can include changes to the PCD's characteristics, such as new software and hardware or new versions of hardware and software that have been updated since registration.

Sometimes, a PCD may have its own privacy identity and thus have the dual roles of a PCD that is subject to privacy behavior control and an "entity" that has its own privacy identity requirements. Such a dual role device may serve as a collective entity in a given environment. For example, a robot that is tasked to search for explosive devices may have its own privacy identity rule-base, indicating that it prefers wide latitude to record and interact with entities and may also possess an elevated authority in the context hierarchy to do so. When a PCD also has a privacy identity, its privacy identity is also transmitted in the operating context data (or in the privacy identity data).

Registration of PCDs with the privacy trust system means that PCDs have a known identity within the privacy trust ecosystem. In some cases, a PCD may broadcast its unique PCD identifier so that other PCDs in the detection zone can detect its presence. Technologies for broadcasting and receiving PCD identifiers from nearby devices may be similar to that used to detect privacy enunciator devices of entities. Thus, in some cases, a PCD may convey the PCD identifiers of nearby devices as part of the operating context data. The privacy service may use this information to further refine the operating context for privacy-control ruleset selection.

Other informative context information that may have been conveyed during registration of the PCD is the device's primary purpose and supplementary purposes. For example, is a PCD in a given environment to perform a small range of tasks (such as bringing tea or vacuuming), to provide personal services like home health care, to provide companionship, to greet the public, to look for explosive devices, to open a door lock? Primary/supplementary purpose information may be implied by the PCD type or model, or, in the case of more general-use environments or devices, it may be described by the PCD's owner or administrator during the registration process (see above)—for example, via a user interface with a series of questions the owner answers to describe the PCD's usage scenarios.

In addition to the PCD "purpose" data that might be associated implicitly with the unique PCD identifier, certain local or transient goal/objective data might be conveyed in the operating context data about the PCD's immediate goal/objective in a given environment. For example, when general-purpose robot technology becomes advanced such that the robot can be given instructions like "make me some tea," it can convey this instant goal/objective information as part of the operating context data. Both primary and supplementary purpose data and instant goal/objective data may be used by the privacy service or other components of the privacy trust system to resolve conflicts that may arise between privacy rules (see, e.g., sub-process flow 330 of FIG. 3B).

In some embodiments, any of the operating context data that may be used to describe properties of the current operating context may also be confirmatory data. As discussed below with respect to FIG. 3A, confirmatory data (e.g., specific sensor data as well as other elements of the operating context data) may be used in some embodiments by a privacy service or privacy trust system to improve trust by ensuring that confirmatory data aligns with the operating context data submitted in the privacy ruleset request. Examples of confirmatory sensor data may include images, video, or audio recordings, temperature readings, or other information taken nearly concurrently with the privacy ruleset request. In some embodiments, the amount or nature of confirmatory data required to validate an operating context as part of a privacy ruleset request may be related to the individual PCD's "trust score."

In some cases, an element of the operating context data may be a unique identifier of the PCD's immediately prior privacy ruleset request that was returned by the privacy service. In some cases, this may be called a "unique privacy rule access token identifier" of the prior privacy ruleset request and is described in more detail below. Components of the privacy trust system (or privacy service) may use information from the prior privacy ruleset request for a variety of purposes, including: improving processing efficiency by selectively determining whether differences exist between entity privacy identities or operating context data in the current privacy ruleset request versus the prior request; and validating or interpreting the operating context.

Having detected privacy identity data and determined operating context data, a privacy ruleset request can be constructed and sent (203). Both the privacy identity data and the device's operating context data is communicated via a data structure of the privacy ruleset request. In some embodiments, distinct elements of the request may be structured using Extensible Markup Language (XML) descriptors in accordance with an agreed-upon XML Schema Definition (XSD). In XML, elements describe both the type of information being transferred and the content of the information; XML is flexible, extensible, self-describing, and hierarchical, and thus is suitable here since any particular instance of privacy identity data and operating context data may contain any or all of the types of elements described, as well as multiple instances of some elements.

A common XML schema used across the privacy trust system may be defined in XSD and accessible via a URL of the privacy service. Of course, besides XML, other suitable and equally capable techniques for transmitting privacy identity data and operating context data in a data structure of a privacy ruleset request may be apparent to skilled practitioners. In some cases, binary data relevant to the privacy ruleset request, such as image data or other sensor data, may be sent in separate binary streams or files outside of an XML data structure, or they may be encapsulated as a binary data structure therein. Data structures, such as those formatted in XML or other methods, may be sent to the privacy service or between components in the privacy trust system using, e.g., an API of the service or system. Any privacy ruleset request may be sent via one or multiple calls to functions of the API, and a request may be divided into separate chunks, as, for example, when binary sensor data is sent separately from structured data.

In some implementations, a privacy ruleset request can have one or more request types, which may be used by the privacy service or components of the privacy trust system to differently or more efficiently process the request. For example, a request can be a "FULL-UPDATE" type, indicating that the request data (e.g., operating context and privacy identity data) are meant to be a complete update to the data sent in a prior request; or, they can be a "CHANGE-ONLY" type, indicating that only differences between the prior request data and the current request data are being transmitted in the data structure. In some cases, the type of privacy ruleset request is indicated by a difference in the function call (or a difference to a parameter of a function call) made in the API request. Of course, the examples of request types are not intended to be limiting.

After processing is complete at the privacy service or component of the privacy trust system (see, e.g., FIG. 3A), response data comprising at least a unique privacy rule access token identifier and a privacy-control ruleset is received in return from the privacy service or other component of the privacy trust system (204). As noted, a privacy rule access token is a data structure generated by the privacy service to describe various aspects of the privacy ruleset request sent by the device and the results of consequent processing by the privacy service. (Element 306 of FIG. 3A describes the structure and methods of generating a privacy rule access token in more detail.) The response data returns at least a unique identifier of this privacy rule access token, although in some implementations the response data may return the entire privacy rule access token data structure (which also includes the unique identifier). The unique privacy rule access token identifier may be used by the PCD or other components for various purposes, such as to chain privacy ruleset requests together to indicate prior states, as well as to identify the privacy ruleset request associated with the control state verification data as discussed below.

As previously described, a privacy-control rule defines a specific privacy behavior in relation to a specific entity in a given context. Each privacy-control rule, when processed by the PCD, can be translated into specific hardware and software states within the device. Collectively, privacy-control rules returned from the privacy service as a "privacy-control ruleset" describe one or several privacy behaviors. Depending on the nature of the privacy ruleset request—for example, whether the request was a FULL-UPDATE type or a CHANGE-ONLY type—the privacy-control ruleset being returned may indicate a complete privacy behavior state or a change in one or more privacy behaviors from the prior state. The privacy-control ruleset may be returned as a collection of individual privacy-control rules in a data structure transmitted in the response data of an API.

Privacy-control rulesets may describe privacy behaviors in a PCD at a less granular level than the individual control states needed to enact those behaviors in the hardware or software of the device. Accordingly, a PCD determines how to translate the privacy-control ruleset into a control set describing the specific control states that software and hardware on the device need to modify to enact the privacy behavior.

As previously indicated, PI (privacy-impacting) modules are components or capabilities of devices that may impact a privacy behavior expectation of an entity. They can include sensors, actuators, communication modalities, module data persistence, and sharing behaviors. PI modules have control states (e.g., sensor module states, actuator module states, communication modality states, module data persistence states, and data sharing behavior states). For any given PCD, its control set of PI module control states might include: Sensor module states describing current operating parameters (e.g., on, off, etc.) of the sensor modules in the sensor module manifest of the PCD; Actuator module states describing current operating parameters (e.g., 3-axis positions, force readings, movement speeds, etc.) of the actuator modules in the actuator module manifest of the PCD; Communication modality states describing current communication meta-states of the communication capabilities of the PCD, such as tonality, sentiment, emotion, gender of voice, and notification or interruption settings such as source, nature, priority, time, and place constraints (the nature of the PCD may determine its communication modality capabilities such as personal assistant device with voice capability, mobile device running Google Android®); Module data persistence states describing current data persistence parameters of components of the PCD (e.g., sensor data or telemetry storage periods, web browser cache), such as length of time data is stored, period after which data is transferred to persistent storage or off-site storage, and form of data storage (RAM, ROM, magnetic media); and data sharing behavior states describing current data sharing parameters (e.g., permitted, permitted only to certain parties, not permitted, etc.) of data sharing components of the PCD (e.g., sensor data, geolocation data, movement data, biometric data, web browser browsing data such as pages browsed, content, usage habits, language, and so on). Manifests or inventories of sensor modules, actuator modules, and communication, module data persistence, and data sharing behavior capabilities may have been indexed during registration of the PCD and/or updated periodically, based on the nature of the PCD, as noted above.

Thus, a control set of PI module control states in accordance with the privacy-control ruleset (205) is determined. Recalling that the operating context data transmitted information relating to the PCD identity, the PCD's PI module manifest is known to the privacy service when the privacy-control ruleset is generated. Therefore, as described in FIG. 3A, each privacy-control rule in the privacy-control ruleset maps to a definite category of (or a particular) PI module extant in the PCD's inventory. Therefore, privacy control rules in the privacy-control ruleset are generally relevant and specifically applicable to a given PCD. Determining the control set then is a matter of determining any differences between the current PI module control states and ones entailed by the new privacy-control ruleset.

The one or more PI module control states in the control set may then be applied to the PCD (206). In general, this means that each PI module control state is translated into an instruction that can be applied to the PI module's software, firmware, device driver, or some other layer. Usually this involves converting the command for the new state into one or more lower-level command functions. In some embodiments, applying a control set of PI module control states may be assisted by a device interpretation component (e.g., 103, 515) that provides a meta-layer of interfaces (software commands that can translated into commands at one level of abstraction to another, usually lower, level of abstraction). The interfaces of a device interpretation component may include simpler commands to set PI module states or query PI modules for their state or other parameters. For example, a privacy control component (102A-B, 510A-B, 611) installable on the PCD may be able to process a privacy-control ruleset directly into device interpretation component interface commands, wherein the device interpretation component, which may have lower level interfaces to operating system software or device driver software of the PCD, translates the interface commands into PI module instructions.

Control states of the device having been modified in accordance with the control set derived from the privacy-control rules, control state verification data may be submitted for recordation on a distributed ledger (207). Control state verification data at least includes: (1) a referent to a prior privacy ruleset request, such as a unique privacy rule access token identifier, a complete privacy ruleset access token, or an address of a privacy rule access token-storing transaction on a distributed ledger or blockchain (note that control state verification data can contain more than one referent to a prior privacy ruleset request); and (2) a set of control states of the PCD, which may contain a complete accounting of control states for all PI modules, or a partial accounting of control states describing PI modules that changed state from a prior control state, such as may be the case when receiving a privacy-control ruleset for incremental-type requests (e.g., CHANGE-ONLY). A set of control states of the PCD may be determined in some instances by querying current PI module control states using a device interpretation component, or by accessing the device state using higher-level interfaces of the operating system of the PCD (e.g., querying the geolocation sensor sharing state of an Android® device).

In some embodiments, submitting control state verification data may include staking the accuracy of the control state verification data with a quantity of cryptographic token, as described in FIG. 3D.

In many cases, autonomous processing techniques by the privacy service will fail to completely resolve conflicts between privacy identities' conflicting privacy-control rules either because ambiguities exist in certain information in the privacy ruleset request (such as the operating context data or privacy identity data), or because the privacy-rule conflict is unresolvable without additional input from the conflicting entities. Therefore, some embodiments may include techniques by which a privacy service can request that a PCD interact with one or more designated entities in the PCD's detection zone. Two techniques support a facilitated merger process: Clarifying questions, which involve interactive communication between the PCD and at least one entity, and mediation processes, which involve the use of consensus communications provided by the privacy service and performed by the PCD to bring about consensus between the conflicting entities.

These techniques are described, in part, with respect to sub-process flows 361 and 371 in regard to FIG. 3C, and, in part, here. With respect to 364, the privacy service determines at least one clarification question directed at a designated entity, which is then received in response to a privacy ruleset request at the PCD (PCC coupled to the PCD) as described here. The PCD then conveys the clarification question to the designated entity via a user interface of the PCD. A PCD may use any of the primary user interface components described with respect to device 1000 of FIG. 10 to convey and accept the user indication of an answer to, a clarification question.

Of course, user interface components and associated user interface modalities can include user interface elements on GUI screens. However, facilitated merger processes using interactive methods (i.e., clarification questions and mediation processes) are bolstered by the availability of robust and dynamic methods of ad hoc information exchange on some kinds of PCDs, such as robots and conversational agents (e.g., Amazon Echo®, Apple Snit, and Google Home®). Some PCDs, for example, may have primary natural language interpretation and speech capability, as basic capabilities for natural language processing are becoming more frequent features of robotic devices and will likely become routine features within a few years. PCDs with these capabilities may be able to provide rich and natural interactive communication with entities to clarify or resolve conflicts. In some cases, these capabilities may be available to some PCDs by virtue of their being coupled with conversational agents which can provide a natural language interface to their capabilities (for example, as Amazon Echo® provides to many smart home IoT devices).

Upon receiving an answer to the clarification question from the designated entity via the user interface (whatever its form), clarification data including the answer to the clarification question can be returned to the privacy service for further processing.

Mediation processes are a more complex type of facilitated merger process, in which the privacy service provides a script of one or more statements or questions as part of a consensus communication (see 374 of FIG. 3C) directed typically at more than one designated entity. The consensus communication is intended to get the conflicting entities to recognize their own difference in perspective on the conflicting privacy behavior expectations. Ultimately, the goal is to drive the designated entities toward a yielding option that the designated entities can assent to.

The PCD facilitates this consensus communication, like above, by conveying it via a user interface of the PCD. The consensus communication may have multiple aspects, including statements and questions embodying various mediation techniques. Ultimately, an assent to a yielding option is received from the one or more designated entities, and resolution data including the yielding option can be returned to the privacy service for further processing.

FIG. 3A illustrates an example process flow for facilitating control and verification of privacy behaviors in privacy-controlled devices. A process flow such as the example in FIG. 3A may be implemented by a privacy service (e.g., 120A, 120B) or component thereof (e.g., 121, 123, 125, 126, 155) or privacy trust system, or as one or more distributed applications ("DApps") or smart contracts (171-175) stored and processed on a distributed application network, any of which may be in communication with a PCD (e.g., 100, 500C), privacy enunciator device (e.g., 106), or privacy control component (e.g., 102A-B, 610-611) or PCC device (e.g., 500A, B).

In FIG. 3A, a privacy ruleset request generated by a PCD is received (301). The privacy ruleset request may be received in various ways depending on the nature of the implementation as noted in reference to FIGS. 1A-1B, e.g., via an API of a privacy service, and a transaction on a smart contract. As noted with respect to FIG. 2, the privacy ruleset request includes operating context data of the PCD and privacy identity data of at least one entity within the detection zone of the PCD.

A privacy context is determined using data from the privacy ruleset request (302). The privacy context is an interpreted result based on operating context data and privacy identity data, including the roles of entities. Determining the privacy context from the privacy ruleset request may involve a processing flow (though not necessarily in the order shown) such as:

S1: Examine geolocation data sent in the operating context data. Access an information feed or coordinate mapping database (e.g., third party service available over API or "oracle" service) to understand specific place or category of place where the encounter between PCD and entities is happening.

S2: Look up standardized schema hierarchy based on place or category of place in schema store. Location can give a range of layers of the hierarchy. (For example, location tells us country, economic system, legal system, etc.

S3: Consider privacy identity metadata—such as roles, nationality data, age (if a person), type of entity—that may have been associated with privacy identities, for example via the privacy identity registration process.

S4: Review the registration data or other metadata about other PCD identities in the vicinity transmitted in the operating context data.

S5: Review PCD designated context and declared primary/secondary purpose, as well as objective/goal information transmitted in the operating context data. The presence of declared purpose in the operating privacy identity data can help to identify the privacy context (e.g., a nursing robot will be present in a medical privacy context, which entails a variety of privacy behavior controls due to HIPAA and other privacy laws).

S6: Review time of day data, environmental conditions, and other image or sensor data transmitted with the operating context data.

These characteristics may be matched to context taxa in the schema data store associated with known patterning characteristics using pattern matching, fuzzy search, and other techniques. In some embodiments, AI-based matching algorithms, such as trained multi-level artificial neural networks, may be used to match a wide variety of operating context data to privacy contexts and can improve with ongoing learning.

An outcome of privacy context determination is a set of one or more privacy contexts, which may be arranged as a hierarchy of contexts from most general to most specific. The members of the set of privacy contexts align with members of a taxonomy of contexts in a standardized schema, which may reside on a schema data store. The set of privacy contexts can be used, in part, to formulate queries to be sent to the rule store to find privacy rules that match the current privacy context.

In some embodiments, operating context data can be verified using confirmatory data that was sent with the privacy ruleset request. Examples of confirmatory data may include images, video, or audio recordings, temperature readings, GPS readings, or other information taken nearly concurrently with the privacy ruleset request. For example, confirmatory data showing a still image of the PCD inside a room would not confirm an operating context "place" showing the device as in a parking lot. In some cases, machine learning algorithms, such as image classifiers (trained to recognize people, objects, and/or localities depicted in images) or audio/speech interpretation agents, may be used to interpret certain kinds of confirmatory data.

In some embodiments, the amount or nature of the confirmatory data required to be sent, or to validate, an operating context as part of a privacy ruleset request may be related to an individual PCD's "trust score," which may be computed from one or more characteristics. These characteristics may be derived from any of several factors, such as: duration of participation in the privacy trust system; reviewed or audited outcomes of prior privacy ruleset requests and/or control verification data submissions; the amount of "stake" of cryptographic token that is sent in conjunction with the privacy ruleset request ("staking" of information submissions is described extensively with respect to autonomous and mediated merger processes in relation to FIGS. 3B-3C).

Privacy control rules are retrieved from a collection of privacy rules (e.g., as reposed on a rule data store) that are relevant to the privacy identity data, privacy context, and information from the operating context data (303). Retrieval can be performed by directing a query constructed from search terms interrelated by search operators (e.g., Boolean logic and specific search engine directives). Search terms for the query can include: the set of privacy contexts previously determined in element 302 of the process flow; privacy identity data that uniquely identifies an entity's privacy identity in the privacy trust system; and the "role" of an entity in the privacy context.

In some cases, the PCD identifier, along with privacy identity distance and direction information transmitted with the privacy ruleset request, can be used to determine the specific PI modules of the PCD that might impact a privacy behavior preference of an entity. As noted in the text describing FIG. 2 and elsewhere, a PCD registers with the privacy trust system during an initialization phase; this registration process informs the privacy trust system of the range of PI modules the PCD possesses by providing a manifest of hardware and software for sensors, actuators, and other capability information. The PCD identifier can be used to retrieve that device's manifest from, e.g., a repository in the schema store or PCD registration data store; the PI module types shown in the PCD's manifest can then be matched to a standardized taxonomy of PI modules (e.g., stored on a schema store or oracle) to determine their effective ranges. This information can be used to selectively query privacy rules for the entity: for instance, when an entity falls within the effective range of present PI module of the PCD, privacy-control rules related to that capability can be requested from the privacy ruleset for that entity. As an example, if entity A is 100 meters from the PCD, but the PCD only has an audio sensor capable of detecting sounds within a range of 50 meters, then privacy rules in entity A's privacy identity rule-base related to audio recording for can be effectively ignored. Various query semantics can be used to deselect (or exclusively select) certain rules with particular capabilities in the retrieved ruleset.

In some cases, multiple queries may be sent to the rule store. For instance, in any given combination of entities and context under an operational embodiment, an entity may not have privacy-control rules defined that pertain to the particular privacy context, or an entity may not have a privacy identity configured at all. In such instances, additional queries may need to be constructed to determine if privacy-control rules are specified for higher hierarchical levels of the privacy context. For example, if no privacy-control rules are found pertaining to an entity's preferences in "a shopping mall," applicable privacy-control rules may be retrieved for "public shopping places" by conducting additional queries of the rule store for the higher-level context taxon. As another example, if an entity has no privacy identity configured or the entity's privacy identity is indeterminate, additional queries may be constructed which retrieve default privacy-control rules reasonably chosen to be applicable to entities in broader privacy contexts, such as "shoppers in public shopping places in the United States." Multiple queries may be directed at the rule store and can be directed at the rule store sequentially (i.e., separate requests are made after reviewing the results of each request before sending the next request), in parallel (i.e., queries are sent separately, but simultaneously, to retrieve several separate result sets), or in joined form (i.e., queries are sent together but represent logically separate searches that can be unified or joined with, e.g., Boolean "OR" operators or "UNION" operators).

Upon receiving the privacy-control rules from the rule store query, a privacy-control ruleset applicable to the PCD is determined by processing tasks utilizing the retrieved privacy-control rules and privacy ruleset request data (304).

A taxonomic schema for privacy rules, as well as the broad notion of hierarchies in rule attribute taxa, has been discussed with respect to privacy-control rules and the rule store 124 (see FIG. 1A). In any given situation, numerous privacy-control rules associated with a specific privacy identity may be applicable to the current privacy context owing to the hierarchical nature of context attributes assigned to the privacy-control rules. One of the design goals for a privacy trust system as described herein is that PCDs have an available and reasonable resolution path for applying privacy behavior preferences to their functions and activities. In simple design terms, a goal is that PCDs can almost always take some action, and not freeze, crash, act erratically, or choose such a poor course of action that they disappoint the expectations of all the entities in the detection zone. More formally, an important aspect of the processing framework around privacy rules is that the control function outcome of any arbitrary collection of privacy-control rules associated with the currently applicable privacy context be computable and decidable. For instance, rules for a "situational" context may apply to the current privacy context at the same time as rules for a "group" context; which privacy-control rules have priority based on their context is a decision to be made. Decidability, as understood here, means that all control state processing paths in a single privacy identity's privacy ruleset lead to exactly one outcome, even if that outcome is a "default" rule at a very high level in the privacy context hierarchy. To summarize the high-level device control-privacy behavior dynamic in the privacy trust system, the basic activity in determining and applying behavioral controls is to decide the most correct control state for the device given the current operating context and the privacy rules associated with the localized privacy identities. The condition of decidability implies that all rule attribute taxa hierarchies (e.g., for role, context, and activity group, such as sensor, activity, communication, data sharing) are internally consistent. This means that there is a clear hierarchy of priority between taxa hierarchy levels wherein lower levels (i.e., more granular levels) of taxa have higher priority than higher levels. This constraint also implies that a privacy identity's rule-base contain or delegate to at least a single master default rule for each activity/function group so that if a given rule set does not have any lower level rules for that function, some control state is determinable. A further corollary to this is that privacy rules set only a single constraint for any activity group in a given privacy context/role combination.

In practice, it may be true that the current privacy context is ambiguous or difficult for the privacy service to determine. In these situations, the process flow should have valid resolution paths for the ambiguity, one of which involves applying the associated rule at the next higher level of the context taxa hierarchy. For example, if a robot cannot determine if it is in a public place or private parking lot, apply the "city" rule. On the other hand, practically speaking, an ambiguity will only require resolution if rules exist for each of the ambiguous options, otherwise the device would already be applying the higher-level rule.

In light of the query processes described with respect to step 303 for selectively querying privacy identity rule-bases based on device capability, role, context, activity grouping (and a hierarchical implementation of these separate attributes as taxa within privacy rules), and the existence of default rule-bases, as well as in light of the aforementioned schema constraints on privacy rule-bases, subsets of privacy-control rules pertaining to a single privacy identity already have a degree of consistency in that they depict a definitive state, for that privacy identity, for any activity constraint applicable to the current device in consideration of its capability profile and operating context.

While these processing aspects are sufficient in many cases to determine any privacy-behavior controls relevant to a single privacy identity, a further concern arises when multiple privacy identities happen to exist in the current detection zone. How should privacy-control rules from multiple privacy identities that direct or constrain the same device control functions be checked for conflicts and consistency, merged, and, if necessary, reconciled according to some principle? In some embodiments, additional processing, such as an autonomous or mediated merger protocol may be performed to determine a privacy-control ruleset when privacy-control rules conflict or are otherwise ambiguous.

FIG. 3B shows an example process flow used in some embodiments to detect and resolve conflicts between a plurality of privacy-control rules using an automated merger protocol or process. This process flow may be a sub-process flow 320 of step 304 (FIG. 3A) in some embodiments. Some or all of the process flow in FIG. 3B may be implemented, for example, by rule conflict merger unit 126 (e.g., FIG. 1A).

Initially, the selection of privacy rules retrieved from the rule data store (e.g., step 303) are checked for conflicts via a detection process to detect conflict between a plurality of privacy-control rules (321). Forming a union set of privacy-control rules from a plurality of privacy identities may have two types of result: a subset of privacy-control instructions that are in conflict (i.e., the rules direct opposing control states, such as that audio recording be "ON" to satisfy one privacy identity and "OFF" to satisfy another privacy identity) and a subset of privacy-control instructions that are not in conflict (i.e., the resolved rules indicate the same control state for all privacy identities); either subset may be empty or possess the totality of the selection of privacy rules retrieved from the rule data store.

Given a "decidable" privacy rule schema such as described previously, privacy rules are representable symbolically using formal grammars (such as context-free grammars). Thus, using notations derived from formal grammars, two or more privacy rules can be combined with operators that can quickly determine computationally whether the rules are conflicting. The privacy rule schema can be described in a formal notation that allows for validity checking both within and across rule sets. In single actor rule sets, validity checking would expose internal inconsistencies, such as duplicate rules, conflicting rules, and invalid hierarchy chains. In composite rule sets from multiple privacy identities, validity checking functions would quickly expose potentially or actually conflicting control sets. Supporting functions allow a system to efficiently compute whether a conflict exists in privacy-control directives given a context, role, sensor, and simple or compound rule set. The formal notation would also provide the corollary capability of enabling basic logical operations on rules so that they can be combined into complex statements with single truth values.

It is foreseeable that conflicts between privacy-control rules will occur, perhaps frequently. However, a privacy-control device is expected to take some action, even if it has to engage in a process of conflict reconciliation that includes dialogue, negotiation, and consensus-seeking with or between the relevant persons.

In some embodiments, an autonomous merger protocol may be performed to remove or modify one or more conflicting privacy-control rules (322). An autonomous merger protocol functions automatically (i.e., without real-time intervention by entities in the detection zone or elsewhere) to remove conflicts. It functions autonomously in some cases by utilizing additional information such as hierarchies, weighting factors, or supplemental classifications provided by participants in the privacy trust system and, in some cases, guaranteed to be trustworthy by those participants or by consensus or auditing activities within the privacy trust system. An autonomous merger protocol can include any one of, all of, or any combination of purpose alignment (330), normative priority analysis (340), and rule weighting factors (350). More than one type may be applied to resolve any specific instance of a privacy-control rule conflict.

In certain embodiments, a type of autonomous merger protocol includes techniques for purpose alignment to resolve conflicts between privacy control-rules. FIG. 3B shows an example sub-process flow 330 for purpose alignment. Recall, from FIG. 2, that PCDs may provide information (directly in the privacy ruleset request or indirectly via metadata associated with the unique PCD identifier) pertaining to the primary and secondary purposes of the device, as well as to the instant goal/objective of an operating context. Primary and secondary purpose information may be used by an autonomous merger protocol to better understand the privacy context for determining appropriate privacy-control rules and, potentially, to resolve conflicts that might arise between privacy-control rules of different entities. For instance, some conflicts between rules can be resolved by eliminating conflicting rules that so clearly subvert the primary purpose that they may be safely ignored. As an example, if a robot's primary purpose is to perform home health care services, then the robot will need to perform specific tasks like undressing the patient for a bath; thus, privacy-control directives from the patient's spouse forbidding the robot to enter the master bathroom would, in this hypothetical, be contradictory to the robot's primary purpose. The conflicting privacy control directives from the patient's spouse could then be reasonably disregarded in order to resolve the conflict.

Purpose alignment may be assisted in some embodiments by techniques and systems for mapping specific privacy behaviors with primary/secondary purpose and/or goal/objective categories. In this way, the mapped privacy behaviors (as delineated by particular sets of privacy-control rules) are classified as "trusted" implementations of the purpose/objective type. These mappings assist the privacy trust system in identifying conflicting privacy-control rules that can be autonomously removed in favor of the trusted rules which will remain in the privacy-control ruleset.

These techniques may be supported in some embodiments by data structures in the privacy trust system, such as schema store 124 (FIG. 1A) or a privacy trust system element repository. These purpose-supporting data structures can contain a "purpose taxonomy" containing primary/secondary purposes and instant objectives relevant to a wide range of PCDs, as well as "purpose-rule mapping" data structures that associate "trusted" privacy behaviors to the taxa in the purpose taxonomy. For example, if a robot has been designated the purpose "home health care assistant," from the purpose taxonomy, it is trusted to engage in a wide variety of potentially privacy-invading behaviors, and so one example purpose-to-rule mapping might associate that purpose with the rule "ENTER TOILET PERMIT OCCUPIED PATIENT HOME". These purpose-supporting data structures may be hierarchical.

When a PCD has defined, selected, or transmitted purpose/objective information in any given operating scenario, the privacy-control rules mapped to those purposes in the purpose mapping data structures are autonomously added to any selection of privacy-control rules that are retrieved from the rule data store. These trusted rules may have metadata or other indicators (e.g., additional XML tags or attributes) that indicate that they possess a purpose-derived priority which may make them preferred over other conflicting rules.

In some embodiments, data elements contained in the purpose taxonomy and purpose-rule mapping data structures may be arranged on a data platform that provides transparency and/or other guarantees to increase trust among participants in the privacy trust system. For instance, in some implementations, the data elements may be reposed in purpose-supporting data structures on a distributed database of the distributed application network or as structured transaction data committed to a distributed ledger of the distributed application network.

Purpose taxa and purpose-rule mapping structures may be written in markup language, script, code, or any processing instruction language able to act on a set of entities, including in a Turing-complete language. In embodiments, the definition of a new purpose taxon and its related purpose-rule mappings may be performed in conjunction with the creation and deployment of a smart contract of the distributed application network. Deploying the smart contract may include transferring of a quantity of cryptographic token from the definer's token repository to a receiver's token repository. The transfer of cryptographic token may be used as a "stake" used to guarantee the validity of the purpose-rule mapping in the privacy trust system. The definer can be, for example, a manufacturer of a type of PCD, or the owner or administrator of a particular PCD. The receiver's token repository can be, for example, a repository used to hold "stakes" in escrow until the new definition of purpose taxon and purpose-rule mappings can be verified by an auditor. If the auditor approves the new definition, the definer receives the cryptographic token "stake" back (perhaps minus a small transaction fee to the auditor); but, if the auditor finds a flaw in the new definition, the definer loses the stake and it is not returned. All or part of the cryptographic token stake may instead be transferred to the auditor (or others). The amount of stake required to be posted by the definer may be fixed or dynamically calculated system-wide for all definers, or it may vary according to the type of the definer (e.g., manufacturer, non-profit, university, a government, the owner), the prior record of the definer (for example, the number of successful definitions previously completed by the definer or the ratio of successful definitions to total attempted), the nature of the purpose (e.g., it's position in the overall purpose taxa hierarchy), or the number or type of privacy behaviors being defined. Any or all of these operations may be supported by a smart contract executing one or more transactions.

In some cases, selection of an already-defined purpose by a PCD (e.g., during registration of the device by its owner/administrator, or dynamically in the privacy ruleset request) may be performed in conjunction with the execution of a smart contract of the distributed application network. Executing the smart contract may include transferring of a quantity of cryptographic token from the selector's token repository to a receiver's token repository. The entity that executes the smart contract can execute the contract on behalf of the selector, for example by generating the transaction and applying the selector's signature or having the transaction signed by the guarantor. All or part of the transfer of cryptographic token may be used as a fee that is payable, for example, to a receiver repository belonging to the definer of the purpose or to another participant in the privacy trust system. Any portion of the transferred cryptographic token may also be used as a "stake" used to guarantee that the device is being used as indicated by the purpose.

The receiver's token repository can be, for example, a repository used to hold "stakes" in escrow until the device's selected purpose can be verified against its "actual" purpose (e.g., by the operating context data and other information actually sent by the device over the course of many privacy ruleset requests). The selected vs. actual purpose can be verified by an auditor. Over time, as an auditor reviews data submitted in relation to actual privacy ruleset requests and verifies them in respect to the selected purpose, the selector may receive all or part of the cryptographic token "stake" back (perhaps minus a small transaction fee to the auditor), or it may receive portions of the stake back incrementally as trust milestones are met. The selector may also lose all or part of the stake if the actual and selected purposes do not align, and all or part of the cryptographic token stake may instead be transferred to the auditor (or others). In some implementations, when a conflict arises between a trusted rule mapped to the purpose/objective and a rule belonging to privacy identity, the stake may be used as a deposit against cryptographic token to be transferred from the selector to a receiver repository associated with a privacy identity having a suppressed privacy-control rule when the trusted rule is preferentially chosen in order to resolve a privacy conflict. Any or all of these operations may be supported by a smart contract executing one or more transactions.

The amount of stake required to be posted by purpose selectors may be fixed or dynamically calculated system-wide for all selectors, or it may vary according to the type (or sub-type) of the selector (e.g., manufacturer, non-profit, university, a government, the owner), the prior record of the selector (for example, the number of successful selections previously completed or the ratio of successful selections to total attempted), the nature of the purpose (e.g., it's position in the overall purpose taxa hierarchy), or the number or type of privacy behaviors attributed to the purpose.

Continuing with FIG. 3B, in certain embodiments, a type of autonomous merger protocol includes techniques for normative priority analysis to resolve conflicts between privacy-control rules. FIG. 3B shows an example sub-process flow 340 for normative priority analysis.

It is contemplated that some privacy-control rule conflicts may be simplified by or completely automatable with the assistance of normative priority analysis. Normative statements generally take the form of a rule of conduct phrased as an imperative; for example, the "Golden Rule" ("Treat others as you would like to be treated.") is a normative statement. Normative statements claim how things "ought" to be and, by doing so, can serve as shortcuts when ambiguities arise in moral/ethical evaluation. Similarly, normative statements can sometimes be applied to rule conflicts to simplify processing and cut through ambiguities so that rule conflicts can be resolved. Normative rules, as contemplated here, advantageously remain contextually sensitive because, while a few normative statements may posit "universal" beliefs of humankind, most normative statements are likely to be based on cultural, national, or religious worldviews.

Examples of the kinds of normative statements that may be useful for automating the resolution of privacy rule conflicts in the privacy trust system are shown in Table 1. Consider these rules in action using a "robot"-type PCD: a robot is in a busy public space with twelve privacy identities currently in its detection range. On average, ten of the identities direct robot control state A, a lower privacy state, while the other two direct robot control state B, a higher-privacy state. However, the privacy identities are generally only in the space temporarily and seldom engage in twelve-way interactive negotiation and consensus. What should the privacy service do to make a decision about the proper privacy-control rules to send to the robot? It can apply the normative rule "the majority state is controlling" and indicate a control state of A; or, it can apply the normative rule "default to the highest privacy for everyone" and indicate a control state B. Which normative rule to apply is likely a function of the cultural values embedded in the current privacy context.

TABLE 1

Examples of normative priority analysis rules

| Example Rule | Applicability |
| --- | --- |
| Treat others like you would want to be treated | Universal (?) |
| Prefer one's family over strangers | National |
| Majority wins | Group, National |

TABLE 1-continued

Examples of normative priority analysis rules

| Example Rule | Applicability |
|---|---|
| Highest privacy setting for everyone | National |
| Set the highest privacy for the most people | Group, National |
| Least harm to the most people | Situational |
| Respect your father and mother | National, Cultural |
| Owner of a private space's PPD controls | Legal, Processing |
| Rule designated at the lowest level in the context hierarchy controls | Processing |

Some normative rules may identify an implicit or explicit hierarchy of priority based on the privacy identity from which the conflicting rules originate. Encoding the priority rights as normative constructs allows them to be exposed and analyzed. For example, does a PPD representing a private place of business, like a coffee shop, have priority over its customers such that the coffee shop "wins" rule conflicts? Do a parent's rules supersede those of her minor child? The principle of privacy identity priority can also be extended to the PCD itself, which in some circumstances may represent a privacy identity with its own privacy behavior expectations. For instance, does a law enforcement drone looking for a fugitive outrank conflicting privacy expectations of members of the public? Whether a coffee shop proprietor, parent, or law enforcement drone has these priority rights is likely based on cultural or legal understandings implicit in the context.

Other rules may resemble processing constructs more than cultural norms or precepts. The last rule in Table 1, "the rule designated at the lowest level in the context hierarchy controls," codifies the normative belief that individuals who designate their privacy behavior expectations at a more detailed or granular level should somehow be prioritized over those who set their privacy preferences less specifically. In practice, this normative rule means that rule conflicts may be resolved by looking at the level of the context hierarchy from which the conflicting rules originate, i.e., a preference rule set at the individual level of the context hierarchy by Alice supersedes a conflicting rule originating from Bob's "national" level. The rules in Table 1, including processing rules, are merely exemplary and contextually dependent—whether an instantiation of the privacy trust system would wish to enact any particular processing rule is another matter, to be discussed below.

Normative priority analysis may be assisted in some embodiments by techniques and systems that support processing of normative rules as part of the processing flow of autonomous merger, and that support the codification and vetting of new or modified normative rules.

These techniques may be supported in some embodiments by data structures in the privacy trust system, such as schema store 124 (FIG. 1A) or a schema element 182 of a privacy trust system element repository 180 (FIG. 1B). These "normative priority" data structures can contain a "normative taxonomy" containing normative rules and the contextual level to which they apply. These normative-priority-supporting data structures may be hierarchically arranged.

A normative rule's assigned place in the contextual hierarchy determines its applicability to a given collection of conflicting rules in much the same way as privacy-control rules' context governs their applicability. However, as normative priority rules are meta-rules operating to prefer or remove privacy-control rules inside a set of conflicting rules, once appropriate normative priority rules are selected, the normative priority rules' processing meta-logic must be applied. Each entry in the normative priority rule taxonomy is associated with normative priority processing logic that implements the rule's tenets in processing a conflicting ruleset in the automated merger protocol. For instance, processing logic for the normative priority rule "majority wins" might examine the conflicting rule set to determine the statistical "mode" (i.e., the value that appears the most often in a dataset) for a group of conflicting rule constraints.

Normative priority processing logic may be written in markup language, script, code, or any processing instruction language able to act on a set of entities, including in a Turing-complete language. In some embodiments, normative priority processing logic may be developed and deployed as a smart contract on a distributed application network. Thus, executing the smart contract for a particular normative priority processing logic may include transaction fees or other costs to be paid in one or more forms of cryptographic token (e.g., in cryptocurrency or specialized cryptographic token used in the privacy trust system). Deploying normative priority processing logic as a smart contract produces the technical effect of system transparency in autonomous processing, which may have the effect of improving trust in the privacy trust system.

Normative priority processing logic may be developed by participants in the privacy trust system, such as PCD or component manufacturers, or by third parties such as sociologists, systems researchers, or attorneys. When the processing logic is developed and deployed as a smart contract on the distributed application network, various mechanisms may be used to ensure both the validity of the underlying smart contract processing instructions and the applicability of the normative rule to the context to which it is assigned.

In some embodiments, to support validation of the processing logic, deploying a smart contract with new or modified normative priority processing logic may include transferring of a quantity of cryptographic token from the definer's (or a guarantor's) token repository to a receiver's token repository. The transfer of cryptographic token may be used as a "stake" used to guarantee the validity of the normative priority processing contract in the privacy trust system. The definer can be one of the participants or a third party as described above. The receiver's token repository can be, for example, a repository used to hold "stakes" in escrow until the new normative priority rule and associated processing logic can be verified by an auditor. If the auditor approves the new definition, the definer/guarantor receives the cryptographic token "stake" back (perhaps minus a small transaction fee to the auditor); but, if the auditor finds a flaw in the new definition, the definer/guarantor loses the stake and it is not returned: instead, all or part of the cryptographic token stake may instead be transferred to the auditor or to others. The amount of stake required to be posted by the definer/guarantor may be fixed or dynamically calculated system-wide for all definers, or it may vary according to the type of the definer (e.g., manufacturer, non-profit, university, a government, the owner), the prior record of the definer (for example, the number of successful definitions previously completed by the definer or the ratio of successful definitions to total attempted), the nature of the normative priority rule (e.g., it's position in the overall contextual hierarchy), or the complexity of the processing logic. Any or all of these operations may be supported by a smart contract executing one or more transactions.

Certain embodiments may support smart contract-based mechanisms for participants in the privacy trust system to assent to the applicability of the normative priority rule to the context to which it was assigned. Deploying a smart contract with new or modified normative priority processing logic may include activation mechanisms whereby participants in the privacy trust system can vote on or approve the new smart contract before it becomes usable in the system. For instance, a smart contract may contain voting or approval logic. Token repositories associated with participants such as registered PCDs, privacy identities, and others may receive (or be able to cast) a vote using a token or other mechanism to approve or disapprove the new smart contract normative priority processing logic. A smart contract may collect votes until a threshold number of affirmative votes are received before activating (e.g., unanimity, majority, or plurality of votes). In some cases, as subset of participants may be selected, such as only the PCDs and privacy identities who would be affected by the contextual level of the normative priority rule (e.g., a normative priority rule pertaining to the National contextual level "Italy" would apply only to participants located in Italy), or a trusted group of nodes, or a trusted group of administrators. In some cases, a smart contract activation may need to be "signed" by one or more participants, a miner, or some governing body of the privacy trust system instead of or in addition to a voting mechanism. Naturally, these mechanisms are not intended to be limiting, and a smart contract may be deployed with any voting/approval mechanism ranging from a privacy trust system-wide standard to a mechanism implemented on a per-contract basis by the definer.

In some cases, selecting and using an already-defined normative priority rule by a component of the privacy trust system may be performed in conjunction with the execution of a smart contract of the distributed application network. Executing the smart contract may include transferring of a quantity of cryptographic token from the selector's token repository to a receiver's token repository. All or part of the transfer of cryptographic may be used as a fee that is payable, for example, to a receiver repository belonging to the definer or to another participant in the privacy trust system. Any portion of the transferred cryptographic token may also be held in escrow to be used as a deposit against cryptographic token to be transferred from the selector to a receiver repository associated with a privacy identity having a suppressed privacy-control rule when another privacy-control rule is preferentially chosen on the basis of the normative priority rule. The amount of stake required to be posted by selectors may be fixed or dynamically calculated system-wide for all selectors, or it may vary according to the type (or sub-type) of the selector (e.g., manufacturer, non-profit, university, a government, the owner), the prior record of the selector (for example, the number of successful selections previously completed or the ratio of successful selections to total attempted), the nature of the normative rule (e.g., it's position in the overall context hierarchy), or the complexity of the processing logic. Any or all of these operations may be supported by a smart contract executing one or more transactions.

These techniques and systems for codifying normative priority analysis rules have the advantageous technical effect of supporting system transparency to expose system assumptions and biases, which at least allows them to be scrutinized and used in a contextually sensitive way. Thus, these mechanisms increase trust in the system in addition to improving the efficiency and accuracy of the privacy trust system's ability to satisfy the privacy behavior expectations of wide ranges of privacy identities in a wide range of contexts.

Returning now to FIG. 3B, in some embodiments, a type of autonomous merger protocol includes techniques for using weighting factors assigned to privacy-control rules to resolve conflicts between privacy control-rules. FIG. 3B shows an example sub-process flow 350 for using weighting factors to resolve conflicts. In embodiments, the privacy-control rule schema provides support by allowing weighting factors (sometimes called "resolution properties") to be associated as properties of individual privacy-control rules. This support may be provided, for example, by extending the privacy-control rule form with additional one or more attributes, tags, or mappings (e.g., by extending the rule tag in the example XML of FIG. 4 with an additional attribute).

These attributes can be used to indicate the quantitative "importance" of a privacy-control rule to an entity. For example, with weighting factors, entity P1 may indicate that a privacy-control rule constraining a device from recording video while at a friend's house is very important by assigning it a "5" on a scale of 1-5. Entity P1's friend, P2, indicates that she prefers video recording to be "on" at all times in her own home; she assigns it a moderate preference of "3." When the two friends get together at P2's home, P2's device(s) can autonomously resolve the rule conflict by turning off video recording based on P1's higher importance rating. It should be noted that this example is not intended to be limiting as to the operation or range of quantities that can be represented with weighting factors—they can be divisible in fractional or decimal units (e.g., 2½ or 2.51), representing any scale (e.g., 0-100, +5 to −5, showing a range from strong interest in the rule being applied to a strong disinterest in whether it is applied), and each incremental increase may not necessarily be based on a linear scale (e.g., the scale could be logarithmically proportional or obey a power-law).

An entity may set weighting factors directly through a user interface (e.g., FIG. 8A), such as at the time the rule is specified by the entity. Alternatively, when not directly set by the entity, the weighting factor might be associated with the privacy-control rule as a part of an automatic process or may be set using default weighting factor values associated with rules generally, with different types of rules, and with different kinds or subcategories of entity, context, or role (e.g., Italian-American male, teacher, attorney, doctor, child under 12 years old).

Weighting factors also can be assigned to various taxonomic attribute categories in the hierarchy—actor/identity, context, role, as well as to individual rules. The weighting factors possesses an expressed hierarchy of priority in that properties attached to the higher levels are more general, and also more overridable, than properties assigned to lower levels of the hierarchy. Individual rule weighting factors supersede role properties, which supersede context properties, which supersede those assigned to the overall privacy identity. In this way, weighting factors can be applied broadly to many control scenarios without losing the capability to target very specific situations when necessary.

In some cases, weighting factor values may be limited by a constraint value on the system, such as a total value or "not to exceed" value which all the separate weighting factor values must sum to or sum to less than. In addition to a constraint value on the complete privacy-control ruleset associated with a privacy identity, a separate constraint value may be applied to various levels in the privacy-control ruleset associated with the privacy identity, such as at different hierarchical levels of context, role, and activity group attributes.

In some embodiments, the weighting factor's value may represent a quantity of cryptographic token, or it may be proportional in value to a quantity of cryptographic token using a rate of exchange set globally by the privacy trust system in accordance with a fixed/static exchange rate or dynamically adjusted exchange rate. In some cases, the exchange rate between the weighting factor and cryptographic token may depend on (i.e., vary in accordance with) the privacy context in which the privacy-control rule is being selected, or it may vary in accordance with other characteristics specific to the particular privacy ruleset request. Sometimes, the exchange rate between the weighting factor and the cryptographic token value may vary in accordance with the level at which the weighting factor is assigned, such as at different hierarchical levels of context, role, and activity group attributes.

The weighting factors assigned to the various rules in conflicting subsets of privacy-control rules may be compared (351) to determine which privacy-control rule in a set of two or more conflicting rules have the highest value. The privacy-control rule having the highest weighting factors may be retained in the privacy-control ruleset, while the privacy-control rule or rules having lower weighting factors are removed from the privacy-control ruleset (352).

In certain embodiments, the selection of a chosen privacy-control rule and the suppression or removal of one or more conflicting privacy-control rules may include transmitting a quantity of cryptographic token from a payor repository to one or more receiver repositories, where the one or more receiver repositories may be associated with the privacy identities having the suppressed or removed privacy-control rules. A cryptographic token can be a known cryptocurrency (e.g., BTC or ETH) or it can be a specialized cryptographic token with a utility function on the privacy trust system. In some cases, the specialized token may be convertible or exchangeable with another token, such as ETH, on a value exchange.

Both the payor repository and receiver repository may be contained in separate accounts such as a cryptographic token storage account or "wallet" that is designated by a unique repository identifier on a distributed application network. This unique repository identifier may be assigned to metadata of the privacy identity during or after registration of the privacy identity by the entity. Transmitting the cryptographic token from one repository to one or more others can involve submitting payment transactions on the distributed application network through various methods, including the calling of a smart contract of the distributed application network.

In some cases, the payor repository may belong to or be associated with the privacy identity that achieves the dominant position by having its privacy-control rule selected or preferred. In some cases, the payor repository may belong to another participant in the privacy trust system, such as (but not limited to) the owner of the PCD or the owner or administrator of the space in which it resides, the manufacturer of the PCD or a component thereof, a governmental regulatory body, or an administrative body of the privacy trust system.

The amount of cryptographic token transferred may be computed in various ways: it may be a fixed amount or exchange rate value, or an amount or value that changes dynamically across the privacy trust system based on certain conditions. The amount may be related to properties of the suppressed rule, such as its context, role, or the position of its attributes in a hierarchy. The amount may be based on the specific entity or type of entity with whose privacy identity rule-base the rule is associated. In many scenarios, more than one conflicting privacy-control rule is removed or suppressed. Thus, cryptographic token is transmitted to more than one receiver repository. In such cases, the fixed or computed quantity may be transmitted to each suppressed privacy-control rule receiver repository, or the quantity may be apportioned equally to each suppressed rule-holder.

In embodiments where a weighting factor's value is representative of or has a value exchangeable to a quantity of cryptographic token, the quantity of cryptographic token transferred from the payor repository to the receiver repositories may be derived (either directly or using an exchange rate as described above) from the weighting factor value. Depending on embodiment, the amount of cryptographic token transferred may be derived from the specific weighting factor assigned to each suppressed privacy-control rule, an average of the weighting factors of a plurality of suppressed rules, the weighting factor of the lowest-value suppressed rule of a plurality of suppressed rules, the weighting factor of the highest-value suppressed rule of a plurality of suppressed rules, or the weighting factor assigned to the preferred or selected rule.

As a brief interlude, consider an example scenario involving an airport: In the airport, entities potentially have an interest in privacy with respect to sensor devices in several contexts, such as the airport security, the airport assistance, the stores belonging to shopkeepers and merchants, and the sensors possessed by various travelers who may themselves belong to many cultures with differing rules. With regard to airport security sensors, the security situational context may govern, allowing travelers to be recorded regardless of their individual preferences. This may entail a special weighting factor on the privacy-control rules of the airport security PCD. These privacy-control rules may always govern with respect to those PCDs and may or may not be associated with a transfer of cryptographic token. With regard to airport assistance, travelers may indicate they do not want to be approached by helpful robots that give directions, and these robots may defer to those travelers' settings. In stores belonging to shopkeepers, shopkeepers may have an elevated right to record certain activities on their own private property, and so may again override travelers' preferences due to an elevated weighting factor. However, unlike the airport security PCDs, they may be required to transfer cryptographic token to assert that right, depending on their locality or culture. Finally, various travelers may want to assert privacy with respect to other travelers' PCDs; weighting factors may be assigned which give them priority over other travelers PCDs, but they may need to use cryptographic token to assert their right in a public place.

In many cases, autonomous merger will fail to completely resolve conflicts between privacy identities' conflicting privacy-control rules either because ambiguities exist in certain information in the privacy ruleset request, such as the operating context data or privacy identity data, or because the rule conflict is unresolvable without additional input from the conflicting entities. Two techniques support a facilitated merger process: Clarification questions, which involve interactive communication between the PCD and at least one entity, and mediation processes, which involve the use of structured facilitative techniques provided by the privacy service and performed by the PCD to bring about consensus between the conflicting entities.

FIG. 3C shows an example process flow used in some embodiments to perform a facilitated merger process. This process flow may be a sub-process flow 360 of step 304 (FIG. 3A) in some embodiments. Some or all of the process flow in FIG. 3C may be implemented, for example, by a rule conflict merger unit 126 (FIG. 1A) or rule conflict merger contract 173 (FIG. 1B).

An ability to ask clarification questions allows the privacy trust system, via PCDs with communication modalities (e.g., robots or other autonomous agents), to request additional information about an entity's goals or priority of objectives. Further questions can be asked when the privacy service is having trouble discerning the current context from ambient conditions, or when it is uncertain which taxonomic context maps to the current context. Sometimes, a privacy identity's role in a given context may not be immediately apparent from the information that is obtainable. A PCD can vocalize a putative control action, and receive assent or a choice selection, when common knowledge assumptions seem to be violated in a given situation. Clarification questions can even enable an entity to spell out the modalities of resolution he, she, or it is willing to undertake to resolve conflicts.

Accordingly, in some embodiments, techniques and systems support processing of clarification questions as part of the processing flow of determining a privacy-control ruleset. Sub-process flow 361 of FIG. 3C depicts certain of these techniques. Additional techniques and systems (described subsequently) support the codification and vetting of new or modified clarification questions, which may be submitted by privacy trust system participants or third parties, in order to improve the transparency of system processing activities.

Initially in sub-process flow 361, an ambiguity may be detected in the privacy ruleset request (362). An ambiguity can take the form of insufficient or conflicting operating context data, such as when one or more elements of the operating context data (e.g., geolocation and purpose information) conflict or are insufficient to determine a privacy context, or when instant objectives or goals are ambiguous or conflicting; or, it can take the form of ambiguous privacy identity data, such as an ambiguous role selection by an entity in possession of the privacy identity.

A clarification question is formulated which is directed at a designated entity (363). (However, it should be noted that more than one clarification question can be directed at the same or multiple entities, or the same question can be directed at multiple entities). Formulation of clarification questions may be supported in some embodiments by data structures in the privacy trust system, such as schema store 124 (FIG. 1A) or a schema element 182 of a privacy trust system element repository 180 (FIG. 1B). These data structures may be hierarchically arranged. These "clarification question" data structures can contain a "clarification question taxonomy" containing clarification question forms and meta-structures that assist the processing flow of the privacy service components to formulate the question properly. New instances of clarification questions and modifications to existing clarification questions in these data structures may be performed by privacy trust system participants and may include staking and/or transfers of cryptographic token, as described subsequently.

For example, a clarification question for an ambiguity in the role of a privacy identity may contain the meta-structure and content: "Hello <privacy-identity-friendly-name>, are you at <operating-context-place> as a <conflicting-role-1> or <conflicting-role-2> right now?" As a further example, a clarification question for an indeterminate or ambiguous privacy context may contain the meta-structure and content: "Hello <privacy-identity-friendly-name>, are you at <operating-context place-1> or <operating-context-place 2> right now?"

The nature of the clarification needed determines the form of clarification question selected from the schema store 124 or element 182. Completing the formulation of the clarification question includes the privacy service substituting various choices of ambiguous data into the question form. For example, the final form of the first clarification question may be "Hello Cathy, are you at the hospital as a doctor or a patient right now?"

Returning to FIG. 3C, the clarification question may be sent to the to the PCD (364) using methods previously discussed for transferring structured data in response data from an API request (e.g., XML, JSON) or smart contract. The clarification question may be included in a data structure that communicates a processing state identifier that is used to match the clarification question to the clarification data and the privacy ruleset request data, when received. The PCD asks the designated entity for an answer to the clarification question using an appropriate and available user interface and sends clarification data back to the privacy service (see FIG. 2).

Clarification data is received from the PCD (365). Clarification data includes the answer to the clarification question and, in some cases, the processing state identifier. The original privacy ruleset request can be reconstructed for processing using the processing state identifier, then determination of the privacy-control ruleset may continue in light of the answer to the clarification data. Members of the privacy control-ruleset may be modified in accordance with the answer to the clarification question (366). Depending on the clarification question and answer, one or more elements of the process flow of FIGS. 3A-3C may be repeated (e.g., from element 302 onward) in order to determine a privacy-control ruleset in light of the answer.

Information about the clarification question and clarification data are stored so they can be recorded in the privacy rule access token associated with the privacy ruleset request (367). This privacy rule access token can then be submitted to the distributed ledger as described in 306. In some embodiments, a revised privacy rule access token may be created and a new privacy rule access token-storing transaction generated and submitted to the distributed ledger; in some cases, the revised privacy rule access token may store information relating to, for example, the ambiguity, clarification question, and answer, a referent to the prior related privacy rule access token (via the original unique privacy rule access token identifier or the address of the prior privacy rule access token-storing transaction), and/or an access token type (e.g., REVISED_RULESET).

In some embodiments, techniques and systems support mediation processes as part of the processing flow of determining a privacy-control ruleset as well as support the codification and vetting of new or modified mediation processes. Sub-process flow 371 of FIG. 3C depicts certain of these techniques.

Mediation processes involve the use of structured facilitative techniques provided by the privacy service and performed by the PCD to bring about consensus between conflicting entities when conflicting privacy-control rules are detected. The basic strategy of mediation processes is to facilitate a conversation between parties whose privacy behavior expectations have conflicts. Mediation processes can be considered to have two sub-stages: multi-party framing questions and consensus.

Initially in sub-process flow 371, a conflict may be detected between a plurality of privacy control rules (372). Conflicts between privacy-control rules may be detected as described in element 321 of FIG. 3B. As a result, a consensus communication is formulated from a mediation pattern which is directed at designated entities (373).

Formulation of consensus communications may be supported in some embodiments by data structures in the privacy trust system, such as schema store 124 (FIG. 1A) or a schema element 182 of a privacy trust system element repository 180 (FIG. 1B). These data structures may be hierarchically arranged. These "mediation pattern" data structures can contain mediation pattern forms and meta-structures that assist the processing flow of the privacy service components to formulate consensus communications properly. Mediation patterns may comprise one or more framing questions or statements aimed at framing the designated entities' understanding of the impasse. Mediation patterns may also comprise one or more mediation templates to encourage consensus between designated entities. The mediation patterns drive the parties toward a simply discernable "yielding option" that can be used to positively select a single rule from a set of conflicting rules.

In the first sub-stage, the privacy service, via the PCD, asks framing questions that require answers from multiple entities. These questions generally seek information that illuminates conflicting assumptions of the entities. These questions act to frame the mediation—that is, to make obvious to the entities the conflict their own underlying presuppositions about the context or other matters concerning the interaction. Some types of questions that could be asked include: clarifications about the priority of actors and rationale (e.g., "Do you think your preferences deserve priority here, and why?"); the importance of the specific conflicting preferences to each party ("How important is it to you not to be recorded while having lunch here, and why?"); the actors' willingness to subvert their own preferences for the sake of consensus. Thus, part of a mediation pattern may be structured as an initial group of framing questions that may be formulated similarly to clarification questions with meta-structure and content such as: "How important is it to you <activity-constraint> while <context>, and why?"

Questions may be in a compound form, having both a choice/rating query wherein the answer can be quantified and acted on, and a free-form explanation query wherein the answer is mostly intended for its framing effect on the other party and not for extensive linguistic parsing. Framing questions in themselves are sometimes sufficient to expose the disparity between positions so that conflicts can be resolved, but even if they are not sufficient they reveal any positional differences between the parties.

The second sub-stage is for the PCD to engage the conflicting parties and facilitate an interaction that obtains consensus from them about a course of action to resolve the conflicting rules. To do so, the PCD may engage in well-known and standard mediation techniques used, for example, in alternative dispute resolution proceedings for legal matters; or, the PCD may engage in softer forms of mediation based on other fields of study. The origin of the mediation techniques is less important than that the PCD is capable of conducting it so that simple assents to a yielding option can be achieved. Ultimately, when assent to a yielding option is reached by the entities, the yielding option can be returned to the privacy service in order to continue processing. Therefore, a second part of a mediation pattern may be structured as a group of mediation techniques or scripts to assist the conflicting entities.

The nature of the conflict between entities determines the form of clarification question selected from the schema store. Completing the formulation of the consensus communications from the mediation pattern may include the privacy service substituting various choices of ambiguous data into the questions or statements in the mediation pattern.

New instances of mediation patterns, as well as modifications to existing mediation patterns stored in these data structures may be performed by privacy trust system participants and may include staking and/or transfers of cryptographic token, as described subsequently.

Returning to FIG. 3C, the consensus communication may be sent to the PCD (374) using methods previously discussed for transferring structured data in the response to an API request (e.g., XML, JSON) or smart contract. The consensus communication may be included in a data structure that communicates a processing state identifier that is used to match the consensus communication to resolution data and the privacy ruleset request data, when received. The PCD conducts the consensus communication and asks the designated entities for assent to a yielding option using an appropriate and available user interface and sends resolution data back to the privacy service (see FIG. 2).

Resolution data is received from the PCD (375). Resolution data includes a yielding option and, in some cases, the processing state identifier. The original privacy ruleset request can be reconstructed for processing using the processing state identifier, then determination of the privacy-control ruleset may continue in light of the yielding option. Members of the privacy control-ruleset may be modified in accordance with the yielding option (376). Depending on the nature of the conflict and the yielding option, one or more elements of the process flow of FIGS. 3A-3C may be repeated (e.g., from element 302 onward) in order to determine a privacy-control ruleset in light of the yielding option.

Information about the consensus communication and yielding option are stored so they can be recorded in the privacy rule access token associated with the privacy ruleset request (377). Sometimes, the designated entities and their assent to or dissent with the yielding option may also be recorded. This privacy rule access token can then be submitted to the distributed ledger as described in 306. In some embodiments, a revised privacy rule access token may be created and a new privacy rule access token-storing transaction generated and submitted to the distributed ledger; in some cases, the revised privacy rule access token may store information relating to, for example, the conflict, consensus communication, yielding option, and a referent to the prior related privacy rule access token (via the original unique privacy rule access token identifier or the address of the prior privacy rule access token-storing transaction), and/or an access token type (e.g., REVISED_RULESET).

In some embodiments, data elements contained in the clarification question and mediation pattern data structures may be arranged on a data platform that provides transparency and/or other guarantees to increase trust among participants in the privacy trust system. For instance, in some implementations, the data elements may be reposed in clarification question or mediation pattern data structures on a distributed database of the distributed application network or as structured transaction data committed to a distributed ledger of the distributed application network.

Clarification questions and mediation pattern forms and processing logic may be written in markup language, script, code, or any processing instruction language able to act on a set of entities, including in a Turing-complete language. In some embodiments, clarification question and mediation pattern logic may be developed and deployed as a smart contract on a distributed application network. Executing the smart contract for a particular clarification question or mediation pattern logic may include transaction fees or other costs to be paid in one or more forms of cryptographic token (e.g., in cryptocurrency or specialized cryptographic token used in the privacy trust system). Deploying clarification question and mediation pattern processing logic as a smart contract produces the technical effect of system transparency in autonomous processing, which may have the effect of improving trust in the privacy trust system.

Clarification question and mediation pattern forms and processing logic may be developed by participants in the privacy trust system, such as PCD or component manufacturers, or by third parties such as sociologists, psychologists, linguists, systems researchers, mediators, or attorneys. When the processing logic is developed and deployed as a smart contract on the distributed application network, various mechanisms may be used to ensure both the validity of the underlying smart contract processing instructions and the applicability of the clarification question or mediation pattern.

In some embodiments, to support validation of the processing logic, deploying a smart contract with new or modified clarification question or mediation pattern processing logic may include transferring of a quantity of cryptographic token from a definer's (or guarantor's) token repository to a receiver's token repository. The transfer of cryptographic token may be used as a "stake" used to guarantee the validity of the clarification question or mediation pattern processing contract in the privacy trust system. The definer can be one of the participants or a third party as described above. The receiver's token repository can be, for example, a repository used to hold "stakes" in escrow until the clarification question or mediation pattern forms and associated processing logic can be verified by an auditor. If the auditor approves the new definition, the definer/guarantor token repository receives the cryptographic token "stake" back (perhaps minus a small transaction fee to the auditor). However, if the auditor finds a flaw in the new definition, the definer/guarantor loses the stake and it is not returned; instead, all or part of the cryptographic token stake may instead be transferred to the auditor (or others). The amount of stake required to be posted by the definer/guarantor may be fixed or dynamically calculated system-wide for all definers, or it may vary according to the type of the definer (e.g., manufacturer, non-profit, university, a government, the owner), the prior record of the definer (for example, the number of successful definitions previously completed by the definer or the ratio of successful definitions to total attempted), the nature of the clarification question or mediation pattern (e.g., it's position in the overall contextual hierarchy), or the complexity of the processing logic. Any or all of these operations may be supported by a smart contract executing one or more transactions.

Certain embodiments may support smart contract-based mechanisms for participants in the privacy trust system to assent to the applicability of the newly deployed clarification question or mediation pattern to the context or other function for which it was assigned. Deploying a smart contract with new or modified clarification question or mediation pattern processing logic may include activation mechanisms whereby participants in the privacy trust system can vote on or approve the new smart contract before it becomes usable in the system. For instance, a smart contract may contain voting or approval logic. Token repositories associated with participants such as registered PCDs, privacy identities, and others may receive (or be able to cast) a vote using a token or other mechanism to approve or disapprove the new smart contract processing logic. A smart contract may collect votes until a threshold number of affirmative votes are received before activating (e.g., unanimity, majority, or plurality of votes). In some cases, a subset of participants may be selected to assent to the new smart contract's applicability, such as only the PCDs and privacy identities who would be affected by the new clarification question or mediation pattern, a trusted group of nodes, or a trusted group of administrators. In some cases, a smart contract activation may need to be "signed" by one or more participants, a miner, or some governing body of the privacy trust system instead of or in addition to a voting mechanism. Naturally, these mechanisms are not intended to be limiting, and a smart contract may be deployed with any voting/approval mechanism ranging from a privacy trust system-wide standard to a mechanism implemented on a per-contract basis by the definer.

In some cases, selecting and using an already-defined clarification question or mediation pattern by a component of the privacy trust system may be performed in conjunction with the execution a smart contract of the distributed application network. Executing the smart contract (or executing a transaction involving or against the smart contract) may include transferring a quantity of cryptographic token from the selector's token repository to a receiver's token repository. All or part of the transfer of cryptographic may be used as a fee that is payable, for example, to a receiver repository belonging to the definer or to another participant in the privacy trust system. Any portion of the transferred cryptographic token may also be held in escrow to be used as a deposit against cryptographic token to be transferred from the selector to a receiver repository associated with a privacy identity having a suppressed privacy-control rule when another privacy-control rule is preferentially chosen on the basis of the selected clarification question or mediation pattern. The amount of stake required to be posted by selectors may be fixed or dynamically calculated system-wide for all selectors, or it may vary according to the type (or sub-type) of the selector (e.g., manufacturer, non-profit, university, a government, the owner), the prior record of the selector (for example, the number of successful selections previously completed or the ratio of successful selections to total attempted), the nature of the clarification question or mediation pattern (e.g., it's position in the overall context hierarchy), or the complexity of the processing logic. Any or all of these operations may be supported by a smart contract executing one or more transactions.

Returning now to FIG. 3A, a privacy rule access token is created (305). A privacy rule access token is a data structure used to describe various aspects of the privacy ruleset request sent by the device and the results of consequent processing. Generally, the privacy rule access token is provided to record certain operating conditions and contextual information surrounding the request and the outputs of certain processes in transforming that information into a privacy-control ruleset. Assembling this information into a data structure and then submitting it to the distributed ledger for permanent recordation has the advantageous technical effects of (1) allowing more efficient processing in that a series of ruleset requests can be "chained" so that privacy ruleset requests and resulting privacy-control rulesets can represent "CHANGE ONLY states"; (2) allowing the privacy ruleset request to be associated with outcome states (see control state verification data, subsequently) so that PCDs can be audited for compliance with privacy identities' privacy behavior expectations; (3) recording conditions in structured form so that machine learning can be applied to improve the effectiveness of retrieval and other processing functions over time; and (4) improving privacy trust system transparency of processing.

A privacy rule access token may contain the following: A unique privacy rule access token identifier; the operating context data sent with the privacy ruleset request (operating context data may be structured similarly or identically using the data structures in which the information was originally transmitted); the privacy identity data sent with the privacy ruleset request; the privacy context that was ultimately selected as a result of processing element 302; a set of privacy-control rule identifiers (see, e.g., 402, 407, 412) of the privacy-control rules that were retrieved as a result of processing element 303; a set of privacy-control rule identifiers in the final privacy-control ruleset being returned to the PCD that were determined as a result of processing element 304 and, if applicable, subprocess 320; if subprocesses 320 or 360 were used, outcomes of those processing elements including a purpose outcome, a normative priority outcome, a rule weighting factor outcome, a clarification question outcome, and a mediation process outcome including a yielding option. In various embodiments, different subsets or all of these elements may be recorded in the privacy rule access token, as well as other elements.

When generating the privacy rule access token associated with a privacy ruleset request, a unique identifier is generated. This unique identifier may be a GUID or other designator that represents a unique tag possessed only by the particular privacy rule access token. The unique identifier associated with and/or stored within the privacy rule access token may be generated before or during the creation of the privacy rule access token data structure. A privacy rule access token data structure can be formatted in any suitable structured data language, such as XML or JSON, as will be appreciated by an ordinarily skilled practitioner.

To maintain privacy of certain data recorded on a distributed ledger (whether permissioned or permission-less), the privacy rule access token may include a cryptographically encoded version of one or more data elements stored within the token. For example, the privacy rule access token may include cryptographically encoded privacy identity data. Data elements may be encoded using one or more cryptographic hash functions, such as one or more variants of the secure hash algorithm such as SHA-2 and SHA-3. In some cases, symmetric encryption may be used to encode all or part of the data elements; data encrypted with symmetric encryption may require a reader of the privacy rule access token data, such as an auditor, to share a private key with the privacy service. In some cases, asymmetric encryption (such as public-private key pairs) may be used to encode all or part of the data elements; the data may be encoded using the public key of a reader or accessible to a class of readers (e.g., auditors), and decoded by the reader using the private key of the reader. In some embodiments, an amount of cryptographic token may be required by a reader as a stake to obtain a symmetric or public/private key pair within the privacy trust system.

A privacy rule access token-storing transaction is generated and submitted to store the privacy rule access token in a data structure on a distributed ledger of the distributed application network (306). Storing the privacy rule access token may include invoking a function to create/store a privacy rule access token within a distributed ledger 165 of the distributed privacy trust system element repository 180. In embodiments in which the distributed ledger or the distributed application network includes a distributed blockchain ledger or distributed smart contract system, storing the privacy rule access token on the blockchain may include storing the token within a data structure on a blockchain, such as by generating a transaction to store the token on the blockchain or invoking a privacy rule access token storing/recordation function of a privacy trust system contract or smart contract published to the blockchain (see, e.g., privacy ruleset contract 171 of FIG. 1B). Functions of a privacy trust system contract published to the blockchain and designed for execution may be executed by transactions invoking such functions. To invoke the privacy rule access token-storing function, a transaction including a call to invoke the function may be generated.

The generated privacy rule access token-storing transaction may be transmitted to at least one of the nodes (e.g., 131) of the distributed application network 130 having a full or partial copy of the distributed privacy trust system element repository. The transaction may be sent to the at least one node by one of the distributed application network nodes directly connected to (e.g., local to) the privacy trust system, such as the node embodied in distributed application unit 125. As with other steps of sending transactions to a node, sending the transaction may trigger the transaction to be included in a process by one or more of the nodes 131 of the distributed application network 130 to incorporate the privacy rule access token-storing transaction into a block of the blockchain distributed ledger (e.g., 165) stored by the nodes 131. Once incorporated into a block, the transaction has been executed. An address of the location of the privacy rule access token-storing transaction on the blockchain may be received, such as by the privacy identity rule unit 121 or by a distributed application network node connected to this unit.

Figure 7:
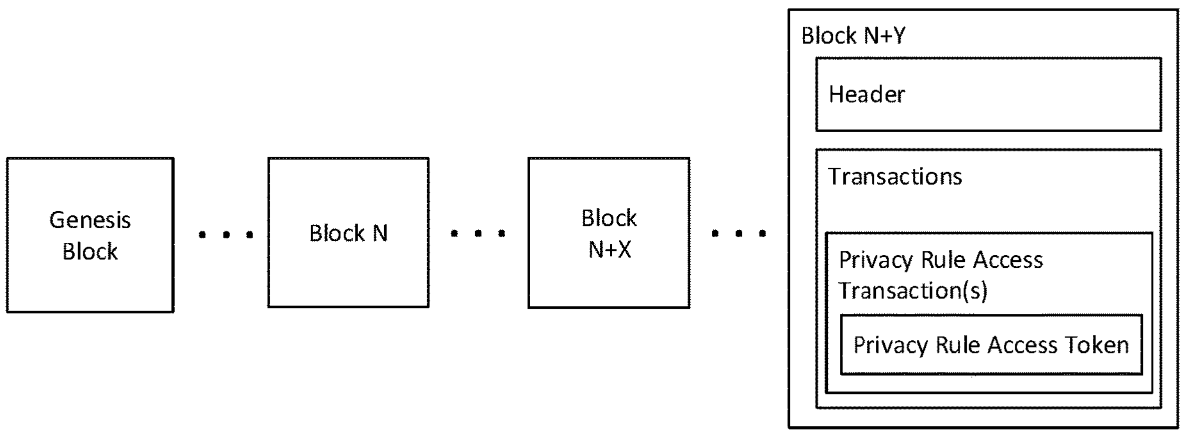
FIG. 7 depicts an example of a blockchain of the distributed privacy trust system element repository after incorporation of a transaction to store a privacy rule access token.

FIG. 7 depicts an example of a blockchain of the distributed privacy trust system element repository after incorporation of a transaction to store a privacy rule access token. The blockchain may include a genesis block, followed by any number of subsequent blocks N up to a preceding block N+X, that is followed by a subsequent portion leading to a block, such as the N+Yth block, that may incorporate the transaction to store a privacy rule access token. Depending on embodiment, implementation, and operating conditions, however, any subsequent block may incorporate the transaction.

The unique privacy rule access token identifier and privacy-control ruleset are returned to the PCD (307), for example via an API response data container such as XML or JSON or other technique. In some embodiments, the unique privacy rule access token identifier may be an address of the location of the privacy rule access transaction after recordation on the blockchain. In some embodiments, the full privacy rule access token may be returned to the PCD.

FIG. 3D shows an example process flow for storing a permanent record of control state verification data associated with a privacy ruleset request. The process flow of FIG. 3D may be performed by privacy service, privacy trust system, privacy control component, or any component thereof, depending on the nature of the embodiment.

Control state verification data pertaining to a PCD may be received (381). The control state verification data may be received in various embodiments from a software-based privacy control component module residing on the PCD, from a privacy control component device (e.g., FIGS. 6A-6C) installed within or coupled to a PCD, or from a PPD/PCC combination device (e.g., 600D of FIG. 6D) in communication with a PCD having a certain subset of privacy control component features and device interpretation component (e.g., 500C of FIG. 6D)

The content of control state verification data is discussed at length in regard to FIG. 2. However, the control state verification data includes at least the unique privacy rule access token identifier that indicates the request from which it was derived, and one or more PI module control states determined from the privacy ruleset request.

A control state verification transaction is generated and submitted to store the control state verification data on the distributed ledger (382). To maintain privacy of certain data recorded on a distributed ledger (whether permissioned or permission-less), the control state verification data may include a cryptographically encoded version of one or more data elements stored within the control state verification data, using techniques substantially described above in regard to cryptographic encoding of privacy rule access tokens. Storing the control state verification data may include invoking a function to create/store control state verification data within a distributed ledger 165 of the distributed privacy trust system element repository 180. In embodiments in which the distributed ledger or the distributed application network includes a distributed blockchain ledger or distributed smart contract system, storing the control state verification data on the blockchain may include storing the control state verification data within a data structure on a blockchain, such as by generating a transaction to store the control state verification data on the blockchain or invoking a control state verification data storing/recordation function of a privacy trust system contract or smart contract published to the blockchain (see, e.g., control state verification contract 175 of FIG. 1B). Functions of a privacy trust system contract published to the blockchain and designed for execution may be executed by transactions invoking such functions. To invoke the control state verification data storing function, a transaction including a call to invoke the function may be generated.

The generated control state verification transaction may be transmitted to at least one of the nodes (e.g., 131) of the distributed application network 130 having a full or partial copy of the distributed privacy trust system element repository. The transaction may be sent to the at least one node by one of the distributed application network nodes directly connected to (e.g., local to) the privacy trust system, such as the node embodied in distributed application unit 125. As with other steps of sending transactions to a node, sending the transaction may trigger the transaction to be included in a process by one or more of the nodes 131 of the distributed application network 130 to incorporate the control state verification transaction into a block of the blockchain distributed ledger (e.g., 165) stored by the nodes 131. Once incorporated into a block, the transaction has been executed. An address of the location of the control state verification transaction on the blockchain may be received, such as by the control state verification unit 155 or by a distributed application network node connected to this unit.

In some embodiments, in conjunction with the control state verification data, a guarantee for quantity of cryptographic token may be received as a stake of accuracy of the control state verification data. As noted, in some cases, submitting a control state verification transaction may be performed (wholly or in part) in conjunction with the execution of a smart contract (e.g., 175) of the distributed application network. Executing the smart contract may include transferring of a quantity of cryptographic token from a guarantor's token repository to a receiver's token repository. A guarantor can be, for example, a manufacturer of the PCD or a component thereof, the owner/administrator of the PCD, a certification body, or other participant in the privacy trust system. The entity that executes the smart contract can execute the contract on behalf of a guarantor, for example by generating the transaction and applying the guarantor's signature or having the transaction signed by the guarantor. The stake may be transferred to an escrow account at the time of execution of the smart contract, or it may be committed, and the transfer performed later, in conjunction with a guarantor's signature, or after an audit process has been performed.

All or part of the transfer of cryptographic token may be used as a fee that is payable, for example, to a receiver repository belonging to an auditor, miner, or other participant in the privacy trust system or third party. Any portion of the transferred cryptographic token may also be used as a stake of accuracy used to guarantee that the PCD is setting its control states in accordance with the privacy-control rules in the privacy-control ruleset indicated by the privacy trust system. The receiver's token repository can be, for example, a repository used to hold stakes of accuracy in escrow until the PCD's control state can be verified against its indicated state. The control state can be verified by an auditor. (Systems and techniques for auditing are described in regard to FIG. 9.) Over time, as an auditor (including a consensus of multiple auditors) reviews the control state verification data by processing the control state verification transactions on the distributed ledger, the guarantor may receive all or part of the cryptographic token stake of accuracy back (perhaps minus a small transaction fee to the auditor), or it may receive portions of the stake back incrementally as trust milestones are met. The guarantor may also lose all or part of the stake if the actual control state and the expected control state do not align, and all or part of the cryptographic token stake may instead be transferred to the auditor (or others). Any or all of these operations may be supported by a smart contract executing one or more transactions.

The amount of stake required to be posted by guarantors may be, for example, fixed or dynamically calculated system-wide for all guarantors, or it may vary according to the type (or sub-type) of the guarantor (e.g., manufacturer, non-profit, university, a government, the owner), the prior record of the guarantor (e.g., the number of successful audits of control state previously completed or the ratio of successful audits to total control states submitted), or the complexity of the processing required to verify the control state against the privacy-control ruleset and privacy ruleset request data.

As previously noted, a privacy control component (PCC) implementing techniques herein (such as the process flow of FIG. 2) may be software or firmware-based modules that are installed onto a PCD without a PCC-specific hardware component. However, in some embodiments, a PCC may be a device that combines hardware and software/firmware aspects.

FIGS. 5A-5B show block diagrams illustrating privacy control component devices that implement methods for controlling and verifying privacy behaviors in PCDs. Privacy control component device 500A and 500B from FIGS. 5A-5B may be specific implementations of computing device 1000 in FIG. 10. Both 500A and 500B may be operative to implement process flows such as those described in FIG. 2 for performing privacy control and verification of PCDs.

In FIG. 5A, PCC device 500A may interact with off-device technologies, such as a GPS network 531 for determining a location of the PCC 500A. PCC device 500A may have networking module 521 which is an example of communications interface 1005. Networking module may allow communications with privacy service 120 ((as described, e.g., in variants 120A & 120B of FIG. 1A-1B) via a Wi-Fi or mobile network carrier. PCC device 500A may also have a device-to-device communication module 522 to interact with other devices 530 via a device-to-device communication method such as BLE or near-field communication (NFC), as described in FIGS. 1A and 2. Other devices 530 include both privacy enunciator devices (PPDs) and other PCDs. PCC device 500A may contain sensors 520 such as a location-sensing component (e.g., GPS) or biometric detection sensor (e.g., camera, sound/audio sensor) for determining privacy identity data as described in FIG. 2.

PCC 500A also may contain a device coupling module/interface 523 for coupling the PCC 500A with a specific PCD 100. A device coupling module/interface 523 may include a hardware connector or port on the PCC, a connector cable, and/or the supporting software implementation to implement the device coupling interface protocol. A device coupling module 523 on the PCC 500A matches to a similar interface technology on the PCD 100. Examples of device coupling interfaces include PCI, a parallel port, a serial port such as IEEE 1394 serial port, a game port, a USB port (or micro-USB or lighting connector), an IR interface, or any other device-to-device coupling interface known to skilled practitioners. When PCC 500A is coupled with PCD 100 by installing within, inserting, or otherwise affixing the PCC 500A to PCD 100 via the device coupling 523 interface, additional software (e.g., applications, frameworks, device drivers, or other code modules or packages) may be installed on PCD 100 to support its interaction with PCC 500A.

PCC device 500A may also contain software or firmware modules stored as program instructions on a storage system of the device. One such module, the privacy control component 510A, implements process flows for privacy control and verification, and performs interactions with the privacy service 120 and other devices 530 and the PCD 100 (e.g., as described in FIG. 2). Another such module, device interpretation component 515, may perform functions such as assisting in setting control states on the specific type of PCD 100 (again as described in FIG. 2).

In FIG. 5B, another example embodiment of a privacy control component device (500B) is shown. PCC 500B shows many components that are similar to those of FIG. 5A, such as sensors 520 that may interact with GPS network 531, device-to-device communication 522 for interacting with other devices 530, device coupling interface 523 for coupling with PCD 100, and device interpretation component 515. However, PCC device 500B may have a distributed application unit 511 capable of using networking interface 521 to interact with a distributed application network 130 (as described in FIG. 1B). Distributed application unit 511 may comprise software modules and data storage that enables it to be a "node" on the distributed application network 130, again as described in FIGS. 1A-1B. PCC device 500B may also have a variation of privacy control component (510B) that utilizes distributed application unit 511 to directly communicate with or invoke one or more privacy trust system components (e.g., privacy trust system element repository, rule store, schema store, privacy trust system and other smart contracts) forming a distributed application or DApp on the distributed application network 130. Further, it should be noted that, while FIGS. 5A-5B show separate embodiments of a PCC device for clarity, their separation should not be interpreted as meaning that one or the other must exclusively access either the privacy service 120 or the distributed application network 130; an embodiment of a PCC device is also contemplated that is capable of accessing both a privacy service 120 (e.g., through an API) for certain functions, and the distributed application network 130 for certain functions available to nodes of that network.

FIGS. 6A-6D show block diagrams illustrating various example embodiments of a privacy enunciator device, or "PPD," for making known the presence of an entity with a privacy identity to nearby PCDs, as well as for interacting with PCDs and configuring privacy identity rules and metadata. PPD devices 600A-600D may be specific implementations of computing device 1000 in FIG. 10. PPDs 600A-600D may be operative to implement process flows or user interfaces such as those described in FIGS. 9A-9B, or to implement certain features of a privacy control process flow as described in FIG. 2. A PPD may be a device that is highly portable (e.g., in a form factor that is able to be carried by an individual or moving entity), or it may be stationary, as could be the case when a PPD designates a privacy identity of a collective or place (e.g., an office building or home).

Figure 6A:
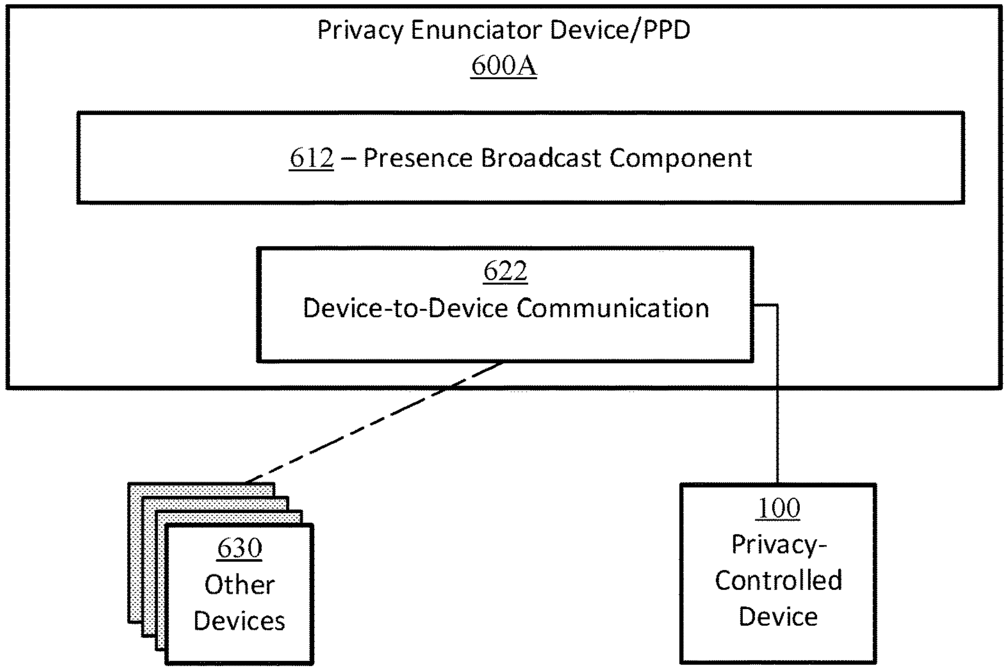
FIGS. 6A-6D show block diagrams illustrating various example embodiments of a privacy enunciator device, or PPD.

In FIG. 6A, PPD device 600A shows a basic embodiment of a privacy enunciator technology operable to transmit privacy identity data, including a unique identifier of the PPD, to a PCD 100 when in its detection zone. Device 600A may be appropriate for implementation of certain form factors of PPD that are low-space and low-power consuming, such as smart jewelry, smart clothing, or a specialized "privacy pod" device. PPD device 600A may have a device-to-device communication module 622 to interact with PCD 100, as well as other devices 630, via a device-to-device communication method such as BLE or near-field communication (NFC), as described in FIGS. 1A-2. Other devices 630 can include both other PCDs and other PPDs. Presence broadcast component 612 may be a specialized software, hardware, or firmware module that broadcasts the presence of privacy identity data to a PCD 100 and other nearby devices 630 via the device-to-device communication module 622. The privacy identity data includes a unique identifier of the PPD, which is sufficient to uniquely identify a privacy identity on the privacy trust system.

Figure 6B:
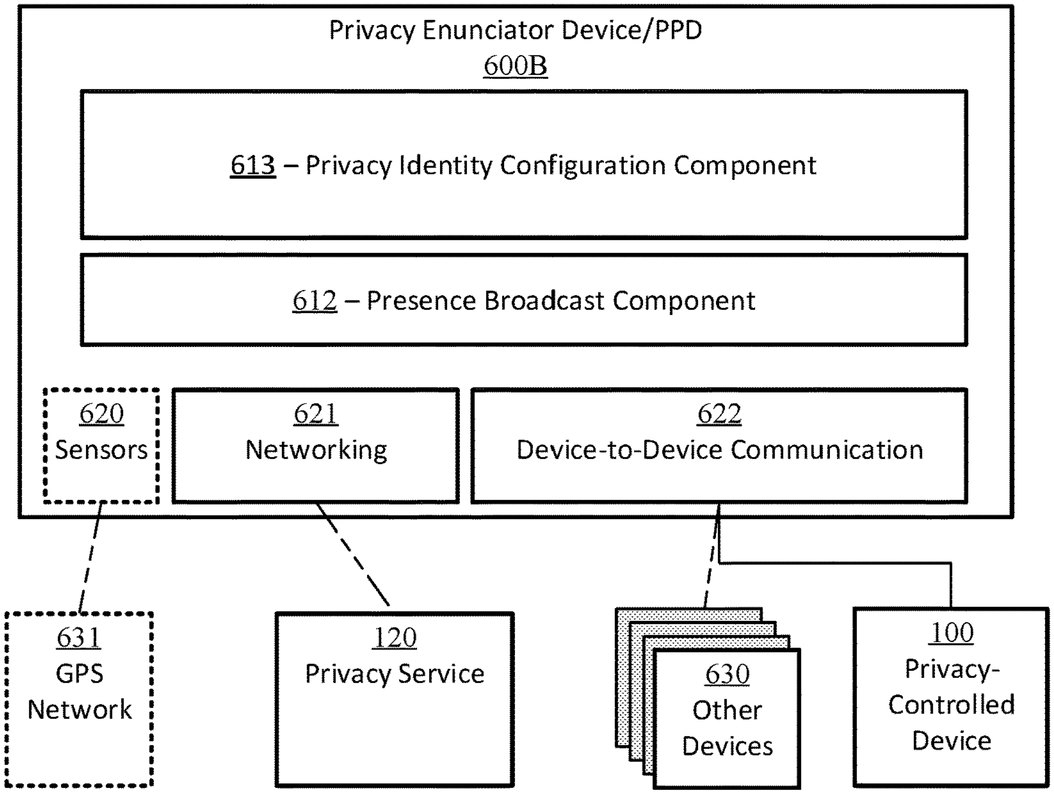

FIG. 6B shows a PPD 600B with some of the same components and types of interaction as 600A (i.e., 612, 622, 630, 100), but with some additional components for additional capabilities. In FIG. 6B, PPD device 600B may have networking module 621 which is an example of communications interface 1005. Networking module may allow communications with privacy service 120 (as described, e.g., in variants 120A & 120B of FIG. 1A-1B) via a Wi-Fi or mobile network carrier. PPD 600B may contain optional sensors 620 such as a location-sensing component (e.g., GPS) for determining privacy identity data such as location of the PPD so that a privacy identity role can be automatically selected (see FIG. 2). PPD device 600B may interact with off-device technologies, such as a GPS network 631, for determining a location of the PPD 600B.

The PPD 600B in FIG. 6B also shows a privacy identity configuration component 613, which may implement specific user interface elements and perform process flows for an entity to create a new privacy identity on the privacy service or update or modify the privacy identity rule-base of the entity. A PPD 600B may be implemented, for example, on a device 1000 with certain forms of user interface components, such as displays, touch-screen panels, or the ability to receive and interpret commands from natural language. The initialization and/or update of a privacy identity is described with regard to the user interface example of FIG. 8A and the example process flow of FIG. 8B.

Figure 6C:
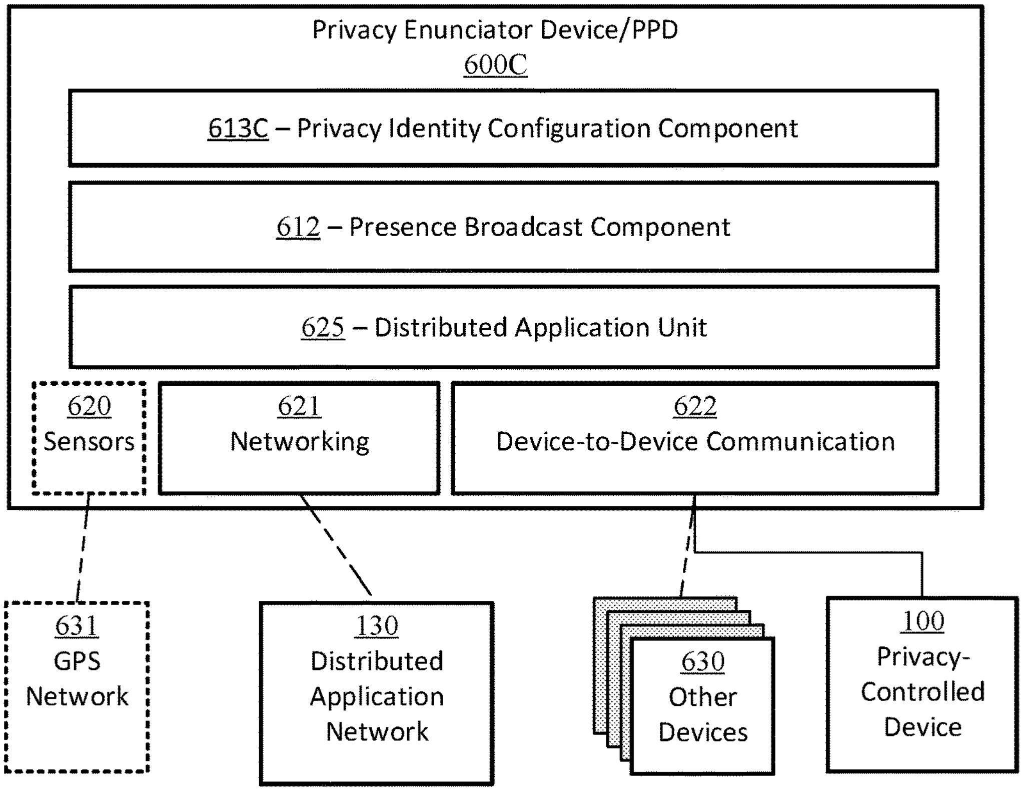

FIG. 6C. shows a PPD 600C that varies from 600B in that it provides a facility for communication, via the networking interface 621, to a distributed application network 130 (in addition to or instead of communication with privacy service 120). PPD device 600C may have a distributed application unit 625 capable of using networking interface 621 to interact with a distributed application network 130 (as described in FIG. 1B). Distributed application unit 625 may comprise software modules and data storage that enables it to be a "node" on the distributed application network 130, again as described in FIGS. 1A-1B. PPD 600C may also have a variation of privacy identity configuration component (613C) that utilizes distributed application unit 625 to directly communicate with or invoke one or more privacy trust system components, such as privacy trust system element repository, rule store, schema store, privacy trust system smart contracts (e.g., privacy identity rule contract 172) and other smart contracts, that form a distributed application or DApp on the distributed application network 130.

Figure 6D:
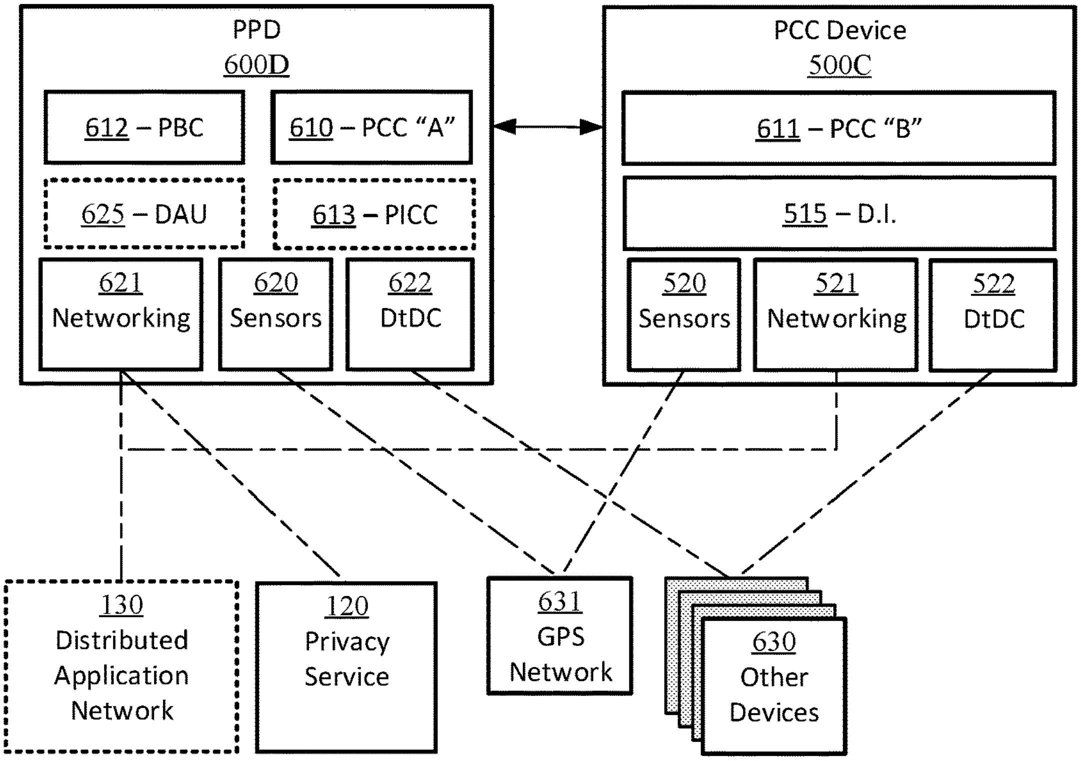

FIG. 6D shows an example embodiment with a combined configuration having a PPD and a PCC device with a shared privacy control component capability. In FIG. 6D, PPD 600D is substantially the same as 600C, but has a privacy control component part "A" (or PCC "A") 610 that performs a certain set of the privacy control component functions described in FIG. 2. PCC device 500C is substantially the same as the PCC device in 500A of FIG. 5A, except that component 510A from that figure has been replaced with privacy control component part "B" (PCC "B") 611 that performs certain privacy control component functions described in FIG. 2 as operable on a PCC device that is installed on a PCD.

The configuration in FIG. 6D may be used, for example, to provide certain kinds of PCDs with the capability to offload certain functions such as communications to the privacy service (or distributed application network, depending on the configuration of the privacy trust system). Such a configuration shifts such communication and associated processing to the PPD 600D of an entity. Offloading of these functions to a PCC "A" 610 on the PPD 600D may enhance the privacy and security of the privacy identity's privacy rule-base and other privacy identity data, thus improving trust in the privacy trust system. Alternatively, certain functions may be useful to offload from more limited PCDs, such as those that have more limited networking, storage, or processing power. PPD 600D and PCC device 500C may communicate via networking interfaces (e.g., 621 and 521) or device to device communication interfaces (e.g., 622, 522).

A process flow that may be performed by the PCC "A" 610 component can include:

(S1) Sending, to the privacy service, a privacy ruleset request comprising the privacy identity data and operating context data, wherein the operating context data is determined by a PCD in communication with the apparatus via a device-to-device communication interface or networking interface. Aspects of obtaining the operating context data and, in some cases, the privacy identity data of other devices are performed by the PCC "B" (e.g., 611), which may be implemented on PCC device 500C coupled to the PCD or directly installed on a PCD. Sending the privacy ruleset request was described in detail with respect to element 203 of FIG. 2.

(S2) Receiving response data from the privacy service including at least a unique privacy rule access token identifier and a privacy-control ruleset associated with the privacy ruleset request. These processes were described in detail with respect to element 204 of FIG. 2.

(S3) Sending the response data to the PCD via the device-to-device communication module or networking interface. The PCD, via PCC "B" (and perhaps in conjunction with a device interpretation component 515), may perform, e.g., process flow elements 205-206 to determine and apply an appropriate control set to its PI modules.

(S4) Receiving control state verification data from the PCD and submitting the control state verification data including the unique privacy rule access token identifier to the privacy service. These processes were described in detail with respect to element 207 of FIG. 2.

In some embodiments, wherein the PPD 600D has a distributed application unit ("DAU") 625 for accessing a distributed application network 130 over networking interface 621, the privacy ruleset request and/or the control state verification data may be sent using a smart contract of the privacy service distributed application utilizing the DAU 625 on the PPD 600D.

It should be noted a PCD implementing a PCC "B" functionality need not implement that functionality via a coupled PCC device such as 500C, but instead the PCD may install PCC "B" functionality as software or firmware of the PCD, such as shown in 102A of FIG. 1A. Further, it should be noted that, while FIGS. 6B-6D show separate embodiments of a PPD device for clarity, their separation should not be interpreted as meaning that one or the other must exclusively access either the privacy service 120 or the distributed application network 130; an embodiment of a PPD device is also contemplated that is capable of accessing both a privacy service 120 (e.g., through an API) for certain functions, and the distributed application network 130 for certain functions available to nodes of that network.

Despite the potential for default rules, some assistance may be needed from entities to configure information relating to a privacy identity, such as privacy identity metadata and the privacy behavior preferences for determining the rule-base. It will be incumbent upon the entities to enumerate and configure their roles/contexts adequately both during initial privacy identity setup and as new contexts arise.

Figure 8A:
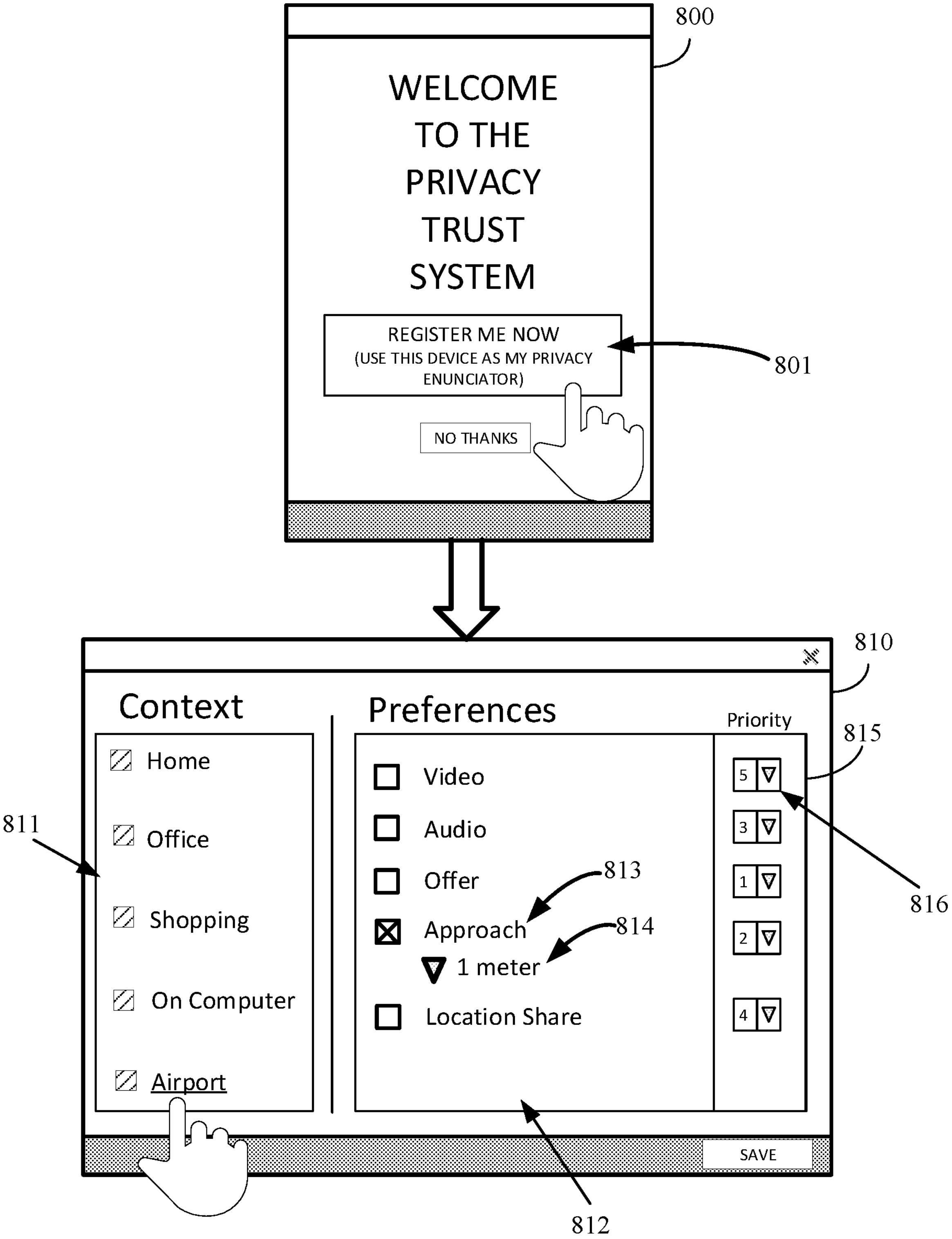
FIG. 8A shows an example interface for registering a privacy identity and modifying privacy-control rules of a privacy identity on a privacy trust system.
Figure 8B:
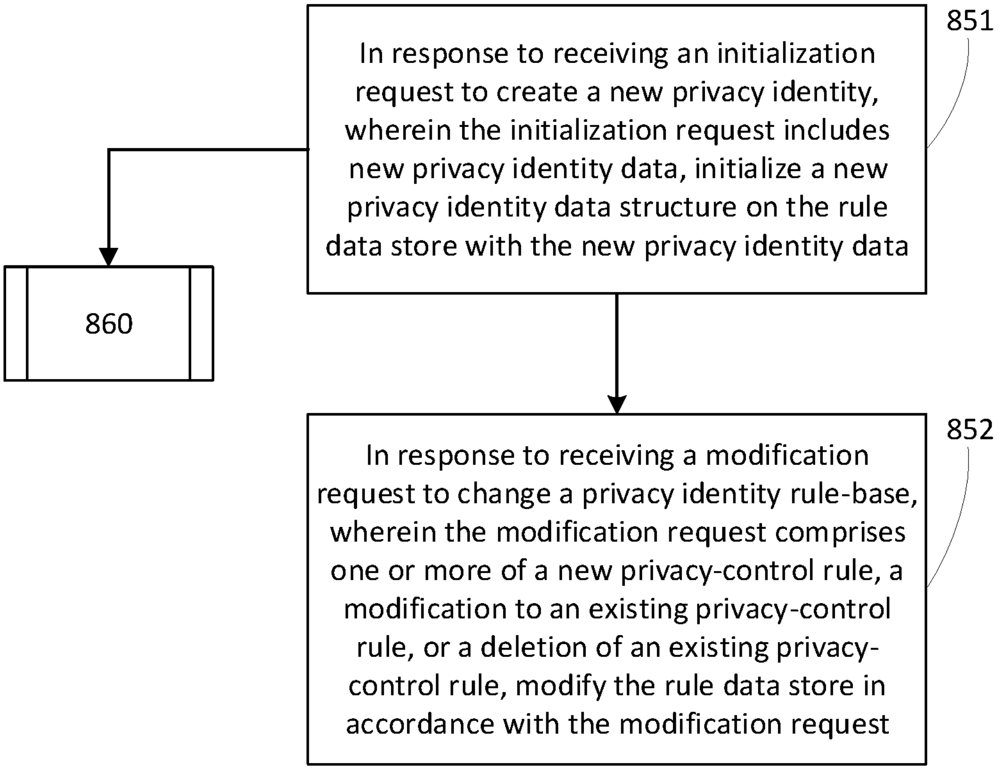
FIG. 8B shows an example process flow that may be performed by embodiments for creating or modifying privacy identity data structures on a privacy trust system.

FIGS. 8A-8B show techniques and example interfaces for entities to create and interact with their privacy identity information.

FIG. 8A shows an example interface for registering a privacy identity and modifying privacy-control rules of a privacy identity on a privacy trust system. User interface screens such as 800 and 810 may be presented as part of an application that runs on a PPD (e.g., 600B-600D), or as part of a privacy identity configuration component (e.g., 613, 613C) on the PPD, as in FIGS. 6B-6D. Interfaces 800 and 810 may be presented on a specialized PPD, or on a standard device, such as a mobile device, for example through a mobile "app". Interfaces 800 and 810 may be part of, or separate from, the "app" that provides PPD enunciation capabilities. Interfaces 800 and 810 may be available via a web browser application on a mobile device or desktop computer independently from the PPD enunciation capabilities, which may allow the entity to configure a privacy identity from various device types. It should be noted that the example user interface screens in FIG. 8A are merely one way of interacting with a privacy identity using visual and/or touch screen-related user interaction motifs; others are possible. For instance, in some cases, a button or other autoconfiguration option on a specialized hardware PPD may be used to initialize the PPD to a new privacy identity. After creation of the privacy identity account, voice commands and other natural language processing may be used to control the privacy identity, perhaps by connecting the device to a conversation/assistant agent such as Amazon Echo®.

FIG. 8B shows an example process flow that may be performed by embodiments for creating or modifying privacy identity data structures on a privacy trust system. A process flow such as that of FIG. 8B can be used to implement the creation and modification of the privacy identity data structures in response to an indication from a user interface such as that depicted in FIG. 8A. The process flow of FIG. 8B may be implemented by a privacy service 120A (e.g., via an API), or a privacy service 120B, implemented by a smart contract (e.g., 172) via a distributed application unit, as well as other configurations described or suggested herein.

For example, by interacting with a user interface screen 800 of FIG. 8A, a user may generate an initialization request to create a new privacy identity on a privacy service. User interface screen 800 allows the user to press a user element 801 (a touch button) to generate the initialization request and send it to the privacy service, associating the device on which the user interface 800 application is being rendered with the privacy identity as a PPD or sender of privacy identity data (e.g., via a unique identifier generated by the application or component thereof, such as a BLE-type device-to-device communication module). Alternatively, or in addition, the application rendering the user interface may allow privacy identity data to be generated from an image of the entity taken from the device's camera sensor, or a voice sample taken from the device's microphone. Other privacy identity data could include location coordinates obtained from a GPS sensor, which may be indicative of a role or context the entity may want to associate with the new privacy identity.

Transitioning to FIG. 8B, an initialization request is received to create a new privacy identity using new privacy identity data, and the receiver (e.g., privacy service via API or smart contract) initializes a new privacy identity data structure on the rule data store with the new privacy identity data (851). The manner of creating the new privacy identity data structure is dependent on the implementation of the rule data store (e.g., on a distributed ledger or other type of data store) and the implementation of the manner of interacting with it, such as via an API or smart contract. However, generally at least a new privacy identity unique identifier (e.g., "Owner_Identity" of FIG. 4) is assigned and placed in a distributed ledger transaction or DBMS. Privacy identity data, such as the unique identifier of the registering device (see 800) or an image of the entity, may be associated to the new privacy identity unique identifier, along with additional metadata about the entity.

In some cases, for example, when the setup of the new privacy identity uses a smart contract, the creation of a privacy identity data structure may be associated with a transfer of cryptographic token from a sender token repository to a receiver token repository. For example, the entity may send cryptographic token to set up the account or to pay a transaction fee for having an account. Alternatively, the privacy trust system may award the new privacy identity with an amount of a specialized privacy trust system cryptographic token to use in various ways in the privacy trust system, including to allocate among the weighting factors of various privacy-control rules. Many variations of sender-receiver token transfers are possible. In some cases, the new privacy identity data may include a token repository identifier (e.g., wallet address) of a token repository of the entity.

In some embodiments, for new privacy identity initialization, a default rule-base may be assigned to the new privacy identity rule-base by the privacy service (e.g., 120A-B) based on certain privacy identity data, metadata, or indications of the entity. A default-rule base may create standard default rules that have been selected to widely apply to entities of the type being registered. The selection process may be based, for example, on the entity's answer to questions posed to the entity during registration, entity address information, or geolocation data from the device being used to register the new account. For example, a resident of India may receive a default rule-base appropriate to that country, which may differ from the default rule-base assigned to a resident of Germany.

User interface screen 810 of FIG. 8A allows a user to configure certain information pertaining to an entity's privacy identity rule-base or to privacy behavior preferences affecting the rule-base; it is merely exemplary. Element grouping 811 shows a list of contexts that pertain to a privacy identity, and element grouping 812 shows privacy behavior preferences/expectations associated with that context when a particular context (e.g., "Airport") is selected. Within element grouping 812, several privacy behavior preferences are shown as examples (for video, audio, location sharing, and the like). One of the privacy behaviors in group 812 has been allowed—"Approach" 813, which selection enables the user to indicate a constraint associated with the behavior (e.g., a proximity of "1 meter" 814) at which a PCD in the airport, such as a direction assistance robot, can approach the entity. Element grouping 815 shows "priority" settings that indicate the importance the entity places on that particular privacy behavior preference being adhered to in an ambiguous environment or an environment with many entities present (e.g., 816 a "5" priority assigned to not being video recorded in the airport). These may be associated with weighting factors discussed with respect to subprocess flow 350 of FIG. 3B. Other interface capabilities (not shown) may allow the user to configure or select new privacy behaviors, remove privacy behaviors, or select or create contexts, roles, and other privacy identity metadata.

Transitioning again back to FIG. 8B, a modification request is received to change a privacy identity rule-base, and the receiver (e.g., privacy service via API or smart contract) modifies the rule data store in accordance with the modification request (852). A modification request can include a new privacy-control rule, a modification to an existing privacy-control rule, or a deletion of an existing privacy-control rule, which may have been performed by a user interaction with a user interface screen (e.g., 810). A modification of a rule can include changing a preference or weighting factor of the privacy-control rule. It can also include setting up a new, or modifying or deleting an existing, context, role, or privacy identity data or metadata. The manner of modifying the rule data store is dependent on the implementation of the rule data store (e.g., on a distributed ledger or other type of data store) and the implementation of the manner of interacting with it, such as via an API or smart contract. However, it generally means associating or dissociating rule data with the privacy identity unique identifier. It should be noted that a user interface, such as the one presented in 810, may show interaction with privacy behavior preferences on a higher, more generalized, or more simplified level than the privacy-control rules are stored in the data store. Thus, a modification request may result in one or more privacy-control rules being modified, removed, or added in response to a user interaction to modify a privacy behavior preference.

In some embodiments, the burden to a user to configure a privacy identity may be eased by configuration devices present in certain locations or group environments to be used to assist in the configuration of individual privacy identities with defaults related to those contexts. For example, a "hospital" configuration device (which may be a PPD or PCD located at a hospital) could imprint one or more default rules on patients' privacy identities when they first enter the hospital or assent to the hospital patient privacy policy. The hospital's configuration device might also imprint "doctor" rules on doctors' privacy identities during their new employee orientation process.

Thus, some embodiments may support an "auto-context" request to update a privacy identity rule-base on the rule store. This request may be sent from a configuration device as described above and the receiver (e.g., privacy service via API or smart contract) updates the rule data store in accordance with the auto-context request. The request may consist of a set of default privacy-control rules, and/or new context(s) or role(s), to be assigned to the privacy identity's rule-base or rule data. Optionally, the auto-context request may be assented to by the privacy identity via a user interface on a PPD of the entity before the privacy identity's rule-base is modified. In some embodiments, the sending of an auto-context request to add a new context/rules to the privacy identity rule-base may be performed in conjunction with or as a result of the purchase/signup process for buying or otherwise utilizing a good or service (for example, commissioning of legal services or representation may add legal auto-context defaults, purchase of an airline ticket may add airport and airplane auto-context defaults, purchase of a conference ticket may provide an auto-context default associated with the venue, and signing up as a user on a website may add an auto-context default related to that website or information source, e.g., in accordance with the site's privacy policy.)

Figure 9:
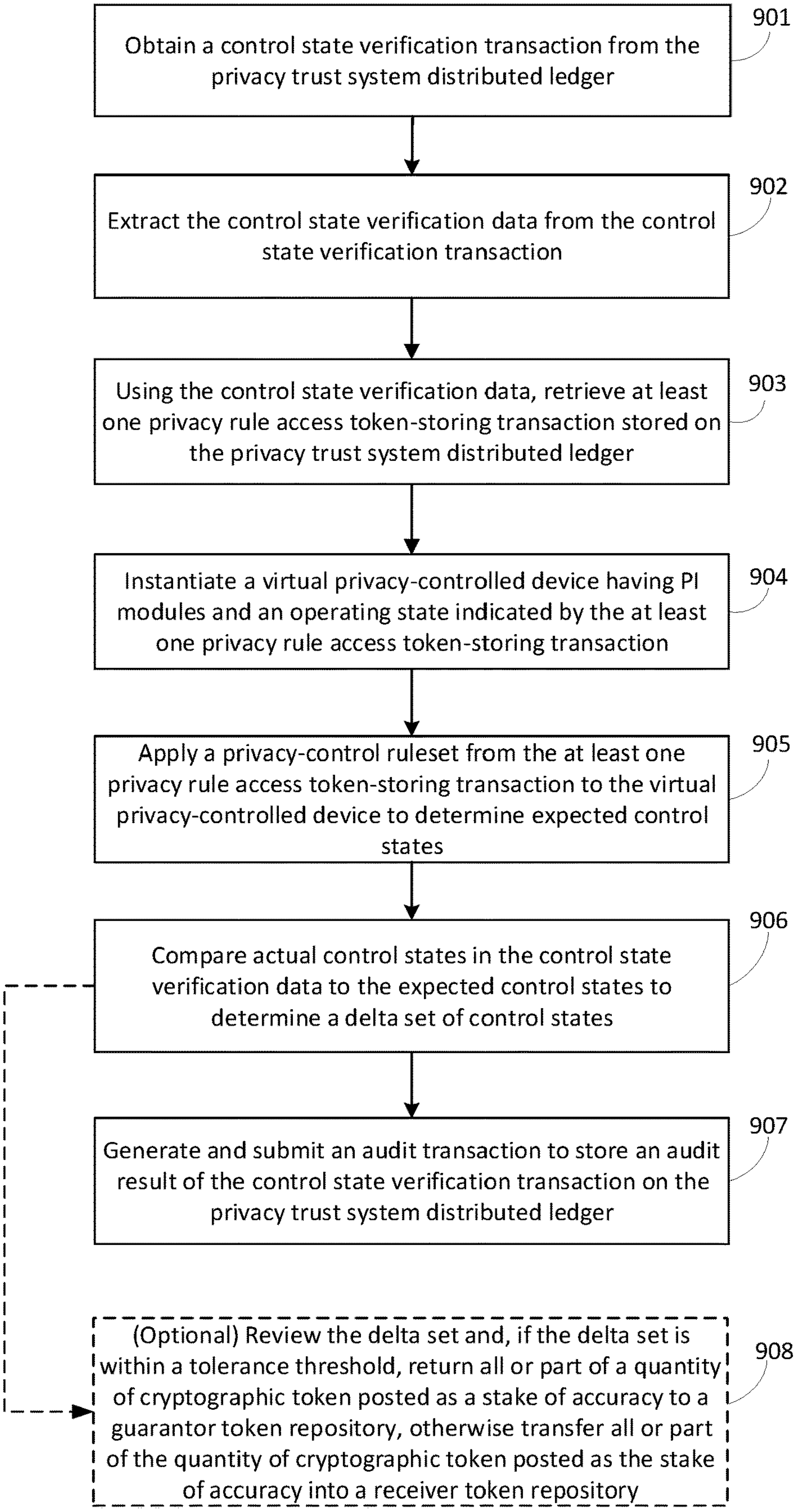
FIG. 9 shows an example process flow that may be performed by a system for auditing a privacy trust system control state verification transaction.

FIG. 9 shows an example process flow that may be performed by a system for auditing a privacy trust system control state verification transaction. The process flow of FIG. 9 may be performed, for example, by a computing device or system (e.g., 1000 in FIG. 10) running node software so that it can act as a node (as described in element 160 of FIGS. 1A-1B) on a distributed application network 130. An auditor, or auditor "node," (i.e., a device embodying an auditing system) may be a participant in the privacy trust system with additional or specialized privileges, such as having certain access privileges on a permissioned distributed application network.

In FIG. 9, a control state verification transaction is obtained from the privacy trust system distributed ledger (901). The control state verification transaction may be obtained via a distributed application unit (DAU) acting as a node on the distributed application network storing the privacy trust system distributed ledger, as described with respect to element 125 in FIG. 1A and elsewhere. The control state verification transaction may be selected using a random selection process, a first-in-first-out method, by accessing a queue of unverified transactions, or any other means. A selected control state verification transaction may first be checked to see if it has already been audited, in which case another transaction may be selected.

Control state verification data may be extracted from the control state verification transaction (902). Decrypting data.

A privacy rule access token-storing transaction associated with the control state verification transaction that is stored on the privacy trust system distributed ledger can be retrieved (903). The transaction may be accessed via a DAU 125 as described previously. To retrieve the privacy rule access token-storing transaction, a unique privacy rule access token identifier can be extracted from the control state verification data, which included a unique privacy rule access token identifier to which it was associated. In some cases, for instance when the privacy rule access token records a partial update state (e.g., a "CHANGE ONLY" request type) additional privacy rule access token-storing transactions may be retrieved in order to determine a full operating state for the PCD.

A virtual PCD can be instantiated that has PI modules and an operating state determined from privacy rule access token data obtained from the one or more privacy rule access token-storing transactions (904). A "virtual" PCD ("VPCD") is a software or virtual machine-based model of a PCD. In some embodiments, a VPCD can be a state machine implemented within a state machine modeling tool, or Universal Modeling Language. An instance of a VPCD may be created from a generic VPCD class representing many possible different kinds of PI modules available to PCDs; the possible kinds of PI modules may be retrieved, for instance, from taxonomy of sensor models or other capabilities stored in the schema store as described previously. In some embodiments, an auditor may receive privileged access to an API of a privacy service that creates a VPCD model; and, in some embodiments, a VPCD may instantiated using program instructions provided by the privacy service as a code module after an auditor registration process.

When a particular VPCD is instantiated, its PI module set is initialized based on the particular collection of sensor modules, actuator modules, communication capabilities, module data persistence capabilities, and data sharing modalities (represented in both hardware, software, and firmware) that are associated with the particular PCD identity that sent the privacy ruleset request. This identity may be retrieved from the privacy rule access token data. Recall that the particular collection of PI modules and other device properties (i.e., its manifest or inventory of capabilities and components) may have been stored on the privacy trust system during the registration of the PCD and updated periodically. Thus, when the VPCD is instantiated from the generic VPCD class, it may be virtually configured with the collection of PI modules from that manifest/inventory and contain only those PI modules.

With a suitable VPCD instance initialized, the operating state of the VPCD can be set using operating context data and privacy identity data that is stored in privacy rule access token data obtained from the one or more privacy rule access token-storing transactions. For example, location, environmental conditions, as well as the location and distance of specific privacy identities can be set as the initialization state of the VPCD state machine.

Having been initialized with a virtual replica of the PCD and instant operating state at the time when the privacy-control ruleset was delivered to the PCD, the privacy-control ruleset (obtained from privacy rule access token data from the one or more privacy rule access token-storing transactions) can be applied to the VPCD to determine the expected control states of the original PCD (905). Techniques for determining and applying a privacy-control ruleset to obtain a control set of control states are discussed in elements 205-206 of FIG. 2, and such techniques work similarly in a VPCD.

Expected control states can then be compared to the actual control states retrieved from the control state verification data to determine a delta set of control states (906) between the expected and the actual. An audit transaction to store an audit result of the control state verification transaction on the privacy trust system distributed ledger may be generated and submitted (907). The audit transaction may contain data linking audit data (such as the delta set of control states) to the control state verification transaction that was audited. Generating and submitting an audit transaction to the distributed ledger may be conducted using techniques similar to those used to generate a control state verification transaction (e.g., element 382 of FIG. 3D).

In some embodiments, the delta set may be reviewed and, if the delta set is within a tolerance threshold, all or part of a quantity of cryptographic token posted as a stake of accuracy to a guarantor token repository may be returned, otherwise all or part of the quantity of cryptographic token posted as the stake of accuracy may be transferred into a receiver token repository (optional element 908). The tolerance threshold may be set in several ways, including but not limited to: a count of members in the delta set (e.g., 0, 1, 2, or any whole number); there may not be any members of the delta set of a certain type (e.g., video sensors); there may only be members of the delta set in which there is a difference because an expected control state is a less privacy protective setting than the actual control state. Sometimes, the tolerance threshold may not be the same determination method or the same count for every audit; e.g., each PCD or type of PCD may be set with different tolerance thresholds. Additional information about stake of accuracy is described in the text relating to FIG. 3D.

FIG. 10 shows a block diagram illustrating components of a computing device or system used in some embodiments of techniques, systems, and apparatuses for facilitating the selection, definition, control, verification, and auditing of privacy behaviors of devices in alignment with privacy identities' expectations. Any component of the privacy trust system, including privacy service (and components and subcomponents thereof), PCC device, PPD device, distributed application network node, auditor node, device for configuring or registering a privacy identity, PCD, or any other device or system herein may be implemented on one or more systems as described with respect to system 1000.

System 1000 can be used to implement myriad computing devices, including but not limited to a personal computer, a tablet computer, a reader, a mobile device, a personal digital assistant, a wearable computer, a smartphone, a laptop computer (notebook or netbook), a gaming device or console, a desktop computer, or a smart television. Accordingly, more or fewer elements described with respect to system 1000 may be incorporated to implement a particular computing device. System 1000 can itself include one or more computing systems or devices or be distributed across multiple computing devices or sub-systems that cooperate in executing program instructions. The hardware can be configured according to any suitable computer architectures such as a Symmetric Multi-Processing (SMP) architecture or a Non-Uniform Memory Access (NUMA) architecture.

The system 1000 can include a processing system 1001, which may include a processor or processing device such as a central processing unit (CPU) or microprocessor and other circuitry that retrieves and executes software 1002 from storage system 1003. Processing system 1001 may be implemented within a single processing device but may also be distributed across multiple processing devices or sub-systems that cooperate in executing program instructions.

Examples of processing system 1001 include general purpose central processing units, application specific processors, and logic devices, as well as any other type of processing device, combinations, or variations thereof. The one or more processing devices may include multiprocessors or multi-core processors and may operate according to one or more suitable instruction sets including, but not limited to, a Reduced Instruction Set Computing (RISC) instruction set, a Complex Instruction Set Computing (CISC) instruction set, or a combination thereof. In certain embodiments, one or more digital signal processors (DSPs) may be included as part of the computer hardware of the system in place of or in addition to a general-purpose CPU.

Storage system 1003 may comprise any computer-readable storage media readable by processing system 1001 and capable of storing software 1002 including, e.g., processing instructions, for facilitating the selection, control, verification, and auditing of privacy behaviors of devices in alignment with privacy identities' expectations. Storage system 1003 may include volatile and nonvolatile, removable and non-removable media implemented in any method or technology for storage of information, such as computer readable instructions, data structures, program modules, or other data.

Examples of storage media include random access memory (RAM), read only memory (ROM), magnetic disks, optical disks, write-once-read-many disks, CDs, DVDs, flash memory, solid state memory, phase change memory, 3D-XPoint memory, or any other suitable storage media. Certain implementations may involve either or both virtual memory and non-virtual memory. In no case do storage media consist of a transitory propagated signal. In addition to storage media, in some implementations, storage system 1003 may also include communication media over which software 1002 may be communicated internally or externally.

Storage system 1003 may be implemented as a single storage device but may also be implemented across multiple storage devices or sub-systems co-located or distributed relative to each other. Storage system 1003 may include additional elements capable of communicating with processing system 1001.

Software 1002 may be implemented in program instructions and, among other functions, may, when executed by system 1000 in general or processing system 1001 in particular, direct system 1000 or processing system 1001 to operate as described herein. Software 1002 may provide program instructions 1004 that implement components for facilitating the selection, control, verification, and auditing of privacy behaviors of devices in alignment with privacy identities' expectations. Software 1002 may implement on system 1000 components, programs, agents, or layers that implement in machine-readable processing instructions 1004 the methods and techniques described herein.

Application programs 1010, OS 1015 and other software may be loaded into and stored in the storage system 1003. Device operating systems 1015 generally control and coordinate the functions of the various components in the computing device, providing an easier way for applications to connect with lower level interfaces like the networking interface. Non-limiting examples of operating systems include Windows® from Microsoft Corp., IOS™ from Apple, Inc., Android® OS from Google, Inc., Windows® RT from Microsoft, and different types of the Linux OS, such as Ubuntu® from Canonical or the Raspberry Pi OS. It should be noted that the OS 1015 may be implemented both natively on the computing device and on software virtualization layers running atop the native Device OS. Virtualized OS layers, while not depicted in FIG. 10, can be thought of as additional, nested groupings within the OS 1015 space, each containing an OS, application programs, and APIs.

In general, software 1002 may, when loaded into processing system 1001 and executed, transform system 1000 overall from a general-purpose computing system into a special-purpose computing system customized to facilitate the selection, control, verification, and auditing of privacy behaviors of devices in alignment with privacy identities' expectations as described in various devices, systems, apparatuses, and services herein. Indeed, encoding software 1002 on storage system 1003 may transform the physical structure of storage system 1003. The specific transformation of the physical structure may depend on various factors in different implementations of this description. Examples of such factors may include, but are not limited to, the technology used to implement the storage media of storage system 1003 and whether the computer-storage media are characterized as primary or secondary storage. Software 1002 may also include firmware or some other form of machine-readable processing instructions executable by processing system 1001. Software 1002 may also include additional processes, programs, or components, such as operating system software and other application software.

System 1000 may represent any computing system on which software 1002 may be staged and from where software 1002 may be distributed, transported, downloaded, or otherwise provided to yet another computing system for deployment and execution, or yet additional distribution. System 1000 may also represent other computing systems that may form a necessary or optional part of an operating environment for the disclosed techniques and systems.

A communication interface 1005 may be included, providing communication connections and devices that allow for communication between system 1000 and other computing systems (not shown) over a communication network or collection of networks (not shown) or the air. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here. Transmissions to and from the communications interface may be controlled by the OS 1015, which informs applications and APIs of communications events when necessary.

It should be noted that many elements of system 1000 may be included in a system-on-a-chip (SoC) device. These elements may include, but are not limited to, the processing system 1001, a communications interface 1005, an audio interface 1040, a video interface 1045, and even elements of the storage system 1003 and software 1002.

Interface devices 1050 may include input devices such as a mouse 1051, track pad, keyboard 1052, microphone 1053, a touch device 1054 for receiving a touch gesture from a user, a motion input device 1055 for detecting non-touch gestures and other motions by a user, and other types of input devices and their associated processing elements capable of receiving user input.

The interface devices 1050 may also include output devices such as display screens 1056, speakers 1057, haptic devices for tactile feedback, and other types of output devices. In certain cases, the input and output devices may be combined in a single device, such as a touchscreen display which both depicts images and receives touch gesture input from the user. Visual output may be depicted on the display 1056 in myriad ways, presenting graphical user interface elements, text, images, video, notifications, virtual buttons, virtual keyboards, or any other type of information capable of being depicted in visual form. Other kinds of user interface are possible. User interface 1050 may also include associated user interface software executed by the OS 1015 in support of the various user input and output devices. Such software assists the OS in communicating user interface hardware events to application programs 1010 using defined mechanisms.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

It should be understood that the examples and embodiments described herein are for illustrative purposes only and that various modifications or changes in light thereof will be suggested to persons skilled in the art and are to be included within the spirit and purview of this application.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

Certain features that are described in this disclosure in the context of separate embodiments can also be implemented in combination in a single embodiment. Conversely, various features that are described in the context of a single embodiment can be implemented in multiple embodiments separately or in various suitable subcombinations. Also, features described in connection with one combination can be excised from that combination and can be combined with other features in various combinations and subcombinations. Various features can be added to the example embodiments disclosed herein. Also, various features can be omitted from the example embodiments disclosed herein.

Similarly, while operations are depicted in the drawings or described in a particular order, the operations can be performed in a different order than shown or described. Other operations not depicted can be incorporated before, after, or simultaneously with the operations shown or described. In certain circumstances, parallel processing or multitasking can be used. Also, in some cases, the operations shown or discussed can be omitted or recombined to form various combinations and subcombinations.

What is claimed is:

1. A method of controlling and verifying a privacy behavior of a privacy-controlled device (PCD), the method comprising:

detecting, at a PCD, privacy identity data of one or more entities within range of the PCD;

determining operating context data of the PCD;

sending, to a privacy service, a privacy ruleset request comprising the privacy identity data and the operating context data;

receiving response data comprising at least a unique privacy rule access token identifier and privacy-control ruleset associated with the privacy ruleset request;

determining a control set of the PCD in accordance with the privacy-control ruleset, the control set having one or more privacy-impacting (PI) module control states;

applying the one or more PI module control states in the control set to the PCD; and submitting control state verification data including the unique privacy rule access token identifier for recordation on a distributed ledger of a distributed application network, wherein the control state verification data is based on applying of the one or more PI module control states to the PCD.

2. The method of claim 1, wherein the PCD is one of the following:

a robot;

an Internet of Things (IoT) device;

a mobile device;

a telemetric device that enacts a privacy behavior.

3. The method of claim 1, wherein the privacy identity data comprises a privacy enunciator device identifier, detected by receiving a broadcast signal from a privacy enunciator device of an entity within receiving range of the PCD, wherein the broadcast signal encodes the privacy enunciator device identifier.

4. The method of claim 1, wherein the privacy identity data comprises biometric data of an entity gathered by a sensor of the PCD.

5. The method of claim 1, further comprising:

receiving, in response to privacy ruleset request, a clarification question directed at a designated entity;

conveying the clarification question to the designated entity via a user interface of the PCD; and upon receiving an answer to the clarification question from the designated entity via the user interface, sending clarification data including the answer to the clarification question to the privacy service.

6. The method of claim 1, further comprising:

receiving, in response to privacy ruleset request, a consensus communication directed at one or more designated entities;

conveying the consensus communication to the one or more designated entities via a user interface of the PCD; and upon receiving, from the one or more designated entities, an assent to a yielding option, sending resolution data including the yielding option to the privacy service.

7. The method of claim 1, wherein a PI module control state is one of a sensor module state, an actuator module state, a communication modality state, a module data persistence state, and a data sharing behavior state of the PCD.

8. A privacy control component apparatus comprising:

a communications interface;

a device-to-device communication module operable to detect other devices;

a device coupling module operable to couple the apparatus with a PCD;

computer-readable storage media comprising program instructions that, when executed by a processor, direct the processor to:

detect, using the device-to-device communication module, privacy identity data of one or more entities within range of the PCD, determine, via the device coupling module, operating context data of the PCD, send, to a privacy service using the communications interface, a privacy ruleset request comprising the privacy identity data and the operating context data, receive, from the privacy service using the communications interface, response data comprising at least a unique privacy rule access token identifier and privacy-control ruleset associated with the privacy ruleset request, determine a control set of the PCD in accordance with the privacy-control ruleset, the control set having one or more privacy-impacting (PI) module control states, apply the one or more PI module control states in the control set to the PCD using the device coupling module, and submit, to the privacy service using the communications interface, control state verification data including the unique privacy rule access token identifier for recordation on a distributed ledger of a distributed application network, wherein the control state verification data is based on applying of the one or more PI module control states to the PCD.

9. The privacy control component apparatus of claim 8, further comprising:

a distributed application unit operable to attach, via the communications interface, the apparatus as a node on the distributed application network, wherein the node enables the apparatus to execute transactions on the distributed ledger and to invoke smart contracts of the privacy service.

* * * * *